US008628071B2

(12) United States Patent
Fiedler et al.

(10) Patent No.: US 8,628,071 B2
(45) Date of Patent: Jan. 14, 2014

(54) DEVICE FOR FINISH-MACHINING OF OPTICALLY EFFECTIVE SURFACES OF WORKPIECES, IN PARTICULAR SPECTACLE LENSES

(75) Inventors: Udo Fiedler, Lahnau/Dorlar (DE); Holger Schäfer, Weilmünster (DE); Steffen Wallendorf, Wetzlar-Dutenhofen (DE)

(73) Assignee: Satisloh AG, Baar (CH)

( * ) Notice: Subject to any disclaimer, the term of this patent is extended or adjusted under 35 U.S.C. 154(b) by 505 days.

(21) Appl. No.: 12/899,060

(22) Filed: Oct. 6, 2010

(65) Prior Publication Data
US 2011/0084433 A1 Apr. 14, 2011

(30) Foreign Application Priority Data

Oct. 8, 2009 (DE) .......................... 10 2009 048 757

(51) Int. Cl.
*B23Q 1/44* (2006.01)
(52) U.S. Cl.
USPC ........................................... 269/56; 29/281.1
(58) Field of Classification Search
CPC ....................................................... B25B 1/20
USPC ........... 269/56, 60, 289 MR, 289 R; 29/281.1
See application file for complete search history.

(56) References Cited

U.S. PATENT DOCUMENTS

| 5,725,205 | A | * | 3/1998 | O'Berg ............................. 269/37 |
|---|---|---|---|---|
| 6,065,372 | A | * | 5/2000 | Rauch ........................... 81/57.15 |
| 6,431,964 | B1 | * | 8/2002 | Ishikawa et al. ................. 451/65 |
| 6,582,287 | B2 | * | 6/2003 | Sasayama ...................... 451/285 |
| 6,910,943 | B2 | * | 6/2005 | Ishikawa et al. ................... 451/5 |
| 7,066,794 | B2 | | 6/2006 | Granziera et al. |
| 7,278,908 | B2 | | 10/2007 | Urban et al. |
| 7,396,275 | B2 | | 7/2008 | Drain et al. |
| 7,422,510 | B2 | | 9/2008 | Schneider et al. |
| 7,448,120 | B2 | * | 11/2008 | Ohmori et al. ................. 29/27 C |
| 7,591,710 | B2 | | 9/2009 | Drain et al. |
| 8,240,019 | B2 | * | 8/2012 | Helmers ....................... 29/281.1 |
| 2008/0305723 | A1 | | 12/2008 | Philipps et al. |
| 2011/0084433 | A1 | * | 4/2011 | Fiedler et al. .................... 269/56 |

FOREIGN PATENT DOCUMENTS

| DE | 197 51 750 A1 | 6/1999 |
|---|---|---|
| DE | 102 48 104 A1 | 5/2003 |

OTHER PUBLICATIONS

U.S. Appl. No. 12/881,738, filed Sep. 14, 2010, B. Schussler et al.

* cited by examiner

*Primary Examiner* — Lee D Wilson
(74) *Attorney, Agent, or Firm* — Reising Ethington P.C.

(57) ABSTRACT

A device (10) for finish-machining of optically effective surfaces of workpieces, in particular spectacle lenses (L, L'), is disclosed, comprising at least one workpiece spindle (30, 30'), to which a workpiece can be clamped, at least one tool spindle (28, 28'), which is movable relative to the workpiece spindle and at which a tool (46) for machining the workpiece can be mounted, and a loading system (22) for bringing a workpiece to and taking it away from the workpiece spindle and bringing a tool to and taking it away from the tool spindle. The loading system comprises a loading head (82), which is separate from workpiece spindle and tool spindle, with at least one loading section (102, 102') equipped with at least one mount (106, 106') for a workpiece and at least one mount (104, 104') for a tool, so that both the tool and the workpiece can be loaded in a time-saving single loading process.

12 Claims, 49 Drawing Sheets

DEVICE FOR FINISH-MACHINING OF OPTICALLY EFFECTIVE SURFACES OF WORKPIECES, IN PARTICULAR SPECTACLE LENSES

FIELD OF THE INVENTION

The present invention relates in general to a device for finish-machining of optically effective surfaces and has particular reference to a device for finish-machining of the optically effective surfaces of spectacle lenses, such as a device of the kind used in 'RX workshops', i.e. production facilities for producing individual spectacle lenses according to prescription within a wide range, for example in order to polish the spectacle lenses.

If, in the following, for workpieces with optically effective surfaces there is mention of, by way of example, "spectacle lenses" there is to be understood by that expression not only spectacle lenses of mineral glass, but also spectacle lenses of all other usual materials, such as polycarbonate, CR 39, HI index, etc., thus also synthetic materials.

DESCRIPTION OF THE PRIOR ART

The machining of optically effective surfaces of spectacle lenses by cutting can be roughly divided into two machining phases, in particular initially pre-machining of the optically effective surface for generation of the macro-geometry in accordance with the prescription and then finish-machining of the optically effective surface in order to eliminate pre-machining tracks and to obtain the desired micro-geometry. Whereas the pre-machining of the optically effective surfaces of spectacle lenses is carried out, inter alia, in dependence on the material of the spectacle lenses by grinding, milling and/or turning, the optically effective surfaces of spectacle lenses during finish-machining are usually subjected to a finish-grinding, lapping and/or polishing process, for which purpose use is made of an appropriate machine.

Polishing machines, which mostly are manually loaded, in RX workshops are usually constructed as 'twin machines' so that the two spectacle lenses of an 'RX job'—a spectacles lens prescription always consists of a pair of spectacle lenses—can be simultaneously finish-machined. Such a 'twin' polishing machine is known from, for example, documents U.S. Pat. Nos. 7,591,710 B2 and 7,396,275 B2.

It has also been proposed to automate 'twin machines' of that kind. Thus, U.S. Pat. No. 7,422,510 B2, which defines the generic prior art, discloses (FIG. 1) a lens machining machine with two parallel arranged workpiece spindles which not only serve for machining the lenses, but also take over the function of workpiece transport. The two workpiece spindles, which are rotationally driven independently of one another (rotation axes $c_1$, $c_2$), are for this purpose arranged adjacent to one another on a horizontal cross slide (displacement axes $x_1$, $x_2$) and, in particular in such a manner that they are pivotable in angle at right angles to their rotation axes $c_1$, $c_2$ (pivot axes $b_1$, $b_2$). The cross slide is in turn mounted on a stroke/pivot column, by which the workpiece spindles can be pivoted (rotational axis k) and lowered (stroke axis w) over different processing and loading stations arranged in a lower region of the machine on a common pitch circle. For loading the lenses into and unloading the lenses from prescription boxes two further stroke and turn devices are provided (lowering axes $n_1$, $n_2$ and pivot axis s). For changing the polishing tools the machine further comprises two rotationally indexable, wheel-shaped tool magazines, from which the tools can be inserted with the help of two parallel grippers, which are arranged on a gripper arm, into two mutually parallel tool spindles (polishing axes $p_1$, $p_2$), which spindles are in turn reciprocatingly movable (telescopic axes $z_1$, $z_2$). The gripper arm is for this purpose linearly movable in vertical and horizontal direction (exchange axis $a_1$, transport axis $t_1$).

A disadvantage of this known lens machining machine is that the described combined use of the workpiece spindles for transport and machining of the lenses causes a relatively lengthy loading time, which significantly limits the throughput of this machine.

What is needed is a device, which is constructed as simply and economically as possible, for finish-machining of the optically effective surfaces of workpieces, particularly spectacle lenses, which makes possible a comparatively high productivity.

SUMMARY OF THE INVENTION

According to the invention, a device for processing of optically effective surfaces of workpieces, particularly spectacle lenses, comprises at least one workpiece spindle, to which a workpiece can be clamped, at least one tool spindle, which is movable relative to the workpiece spindle and at which a tool for machining the workpiece can be mounted, and a loading system, which serves the purpose of bringing a workpiece to or taking it away from the workpiece spindle and/or bringing a tool to or taking it away from the tool spindle. The loading system comprises a loading head, which is separate from the workpiece spindle and tool spindle, with at least one loading section which is equipped not only with at least one mount for a workpiece, but also with at least one mount for a tool so that both the tool and the workpiece are loadable in one loading process.

Due to the fact that the loading head is separate not only from the workpiece spindle, but also from the tool spindle, and consequently represents an independent subassembly, it is not necessary to use the spindles for transport tasks, but rather the spindles can be used for a longer period of time for the actual processing of the workpieces by comparison with the prior art, and loading or transport tasks are taken over by the loading head. The processing function and the handling functions can thus be strictly separated and—with the exception of a very fast workpiece and tool change—take place in parallel. In addition, one and the same loading section of the loading head has mounts for the workpiece and tool, so that separate loading devices for the workpiece and tool are superfluous, which also reduces the outlay on the device. The tool and workpiece can advantageously be loaded or unloaded in a single loading process or movement sequence, i.e. simultaneously. As a result, very short clamping-to-clamping times and thus a high workpiece throughput/high productivity of the device with very manageable outlay are made possible.

In a preferred design of the loading head the loading section of the head can comprise two mounts for workpieces, so that by the loading head a workpiece already machined in the device can be exchanged in one loading process for a workpiece still to be machined in the device. Accordingly, it is not necessary to initially take away and deposit a machined workpiece, which has been removed from the workpiece spindle, in order to bring up and clamp a workpiece to be machined, but rather the workpiece change can be carried out very quickly in one working step near the workpiece spindle. Alternatively or additionally thereto the loading section of the loading head can have two mounts for tools, so that by the loading head a tool already used in the device can be exchanged in one loading process for a tool still to be used in the device. This also allows a very quick change, this time of the tool, which advantageously minimizes standstill times in the actual machining.

In further pursuance of another aspect of the invention it is possible to provide, for simultaneous machining of a workpiece pair, particularly spectacle lenses for one and the same spectacles, two workpiece spindles and two tool spindles ('twin machine'), wherein the loading head can then have two of the aforedescribed loading sections for simultaneous serving of two workpiece spindles and two tool spindles in parallel arrangement.

It is further preferred if, as the mount for the tool at the loading head, one or more four-finger grippers is or are used, which advantageously makes or make it possible to grip workpieces of any circumferential shape without displacing the axis of rotation of the workpiece when gripping or during holding of the workpiece. The mount for the workpiece is, thereagainst, preferably a parallel gripper, such as is readily and economically available on the market.

For the movement of the entire loading head relative to the tool or workpiece spindles various kinds of mechanisms corresponding with the respective handling requirements are workable. However, it is preferred if the loading system has a loading arm at which the loading head is mounted to be pivotable about a pivot axis. In addition, the loading arm together with loading head can be pivotable about a further pivot axis perpendicular to the said pivot axis. In a further constructional stage it is possible for the loading arm together with loading head to be linearly displaceable in a direction extending parallel to the further pivot axis.

If in this connection the finish-machining device comprises a transport system for the workpieces, a washing station for the workpieces, a working space for the machining of the workpieces by the tools and a tool magazine for reception of a plurality of tools, then these systems and stations can, in a construction simple in terms of layout, lie on a common pivot circle about the further pivot axis so that through pivoting of the loading arm about the further pivot axis the systems and stations can be easily reached by the loading head.

According to a further aspect of the invention a device for finish-machining of optically effective surfaces of workpiece, particularly spectacle lenses, in twin mode of construction has two workpiece spindles for rotational driving of two workpieces about workpiece axes of rotation and two tool spindles for rotational driving of two tools about tool axes of rotation, wherein the workpiece spindles are additionally movable in at least two different movement directions relative to the tool spindles, wherein the device has in each instance only one drive for the rotational driving of the two workpieces and for the rotational driving of the two tools and, in addition, in each instance only one drive is provided for generating the relative movements between the workpiece spindles and the tool spindles for each of the at least two movement directions. Through this utilization of common drives the finish-machining device can overall be of very economic construction.

Finally, in the case of such a device the tool spindles can be movable, for example pivotable, relative to the workpiece spindles additionally in a third movement direction different from the aforesaid at least two movement directions, wherein also only one drive is provided for generating the relative movement in the third movement direction. This is similarly beneficial to a simple and economic construction of the device.

BRIEF DESCRIPTION OF THE DRAWINGS

Embodiments of the present invention will now be more particularly described with reference to the accompanying, partly simplified or schematic drawings, in which.

Figure 1:
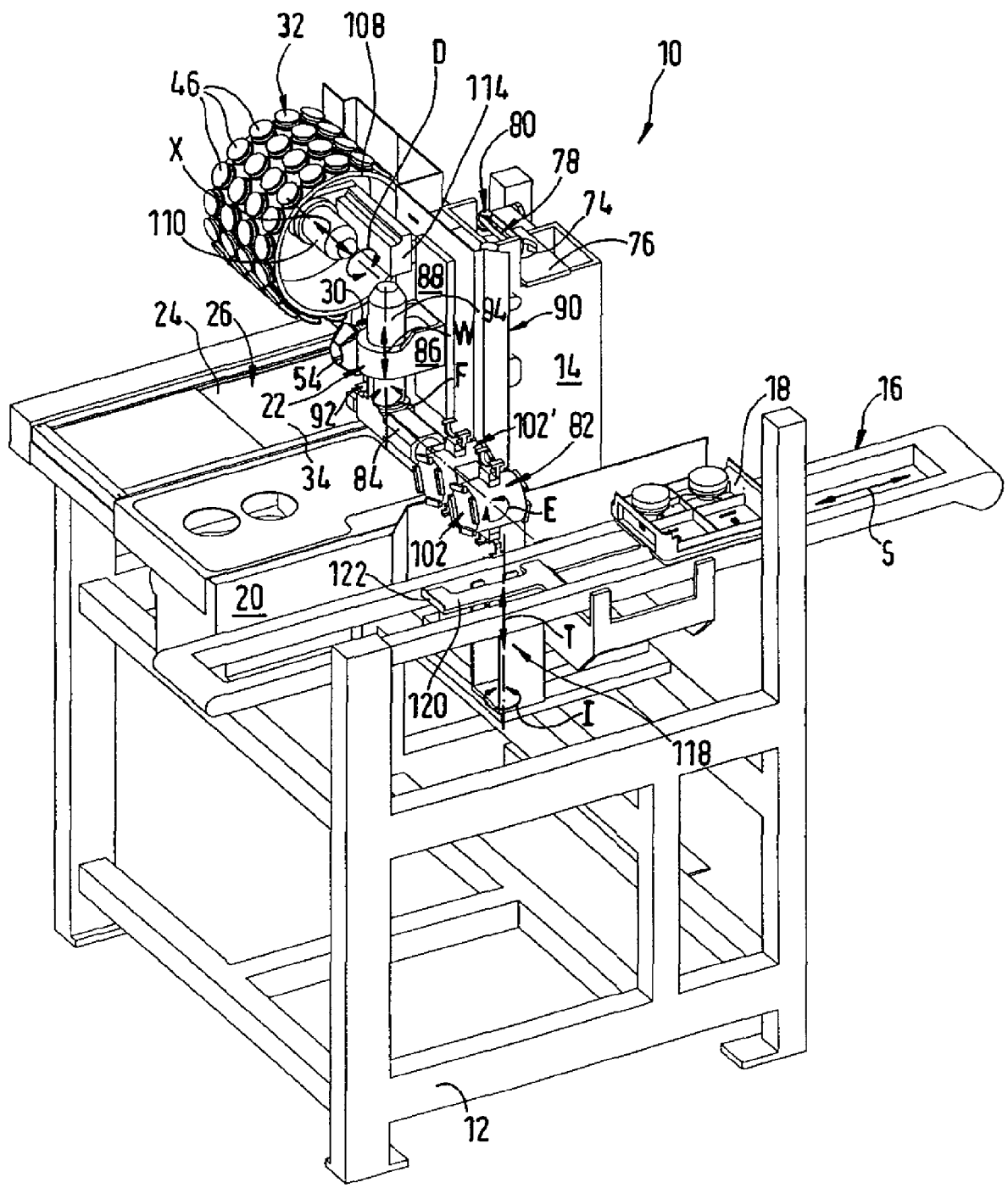
FIG. 1 is a perspective view of a finish-machining device embodying the invention for spectacle lenses obliquely from above and front right, wherein in order to reveal principal components or subassemblies of the device and to simplify the illustration an operating unit and control, parts of the cladding, supply devices (including lines, hoses and pipes) for power, compressed air and polishing medium, a polishing medium return, an inlet and outlet for cleaning liquid, and measuring, maintenance and safety devices—including those at CNC axes—have been omitted.
Figure 2:
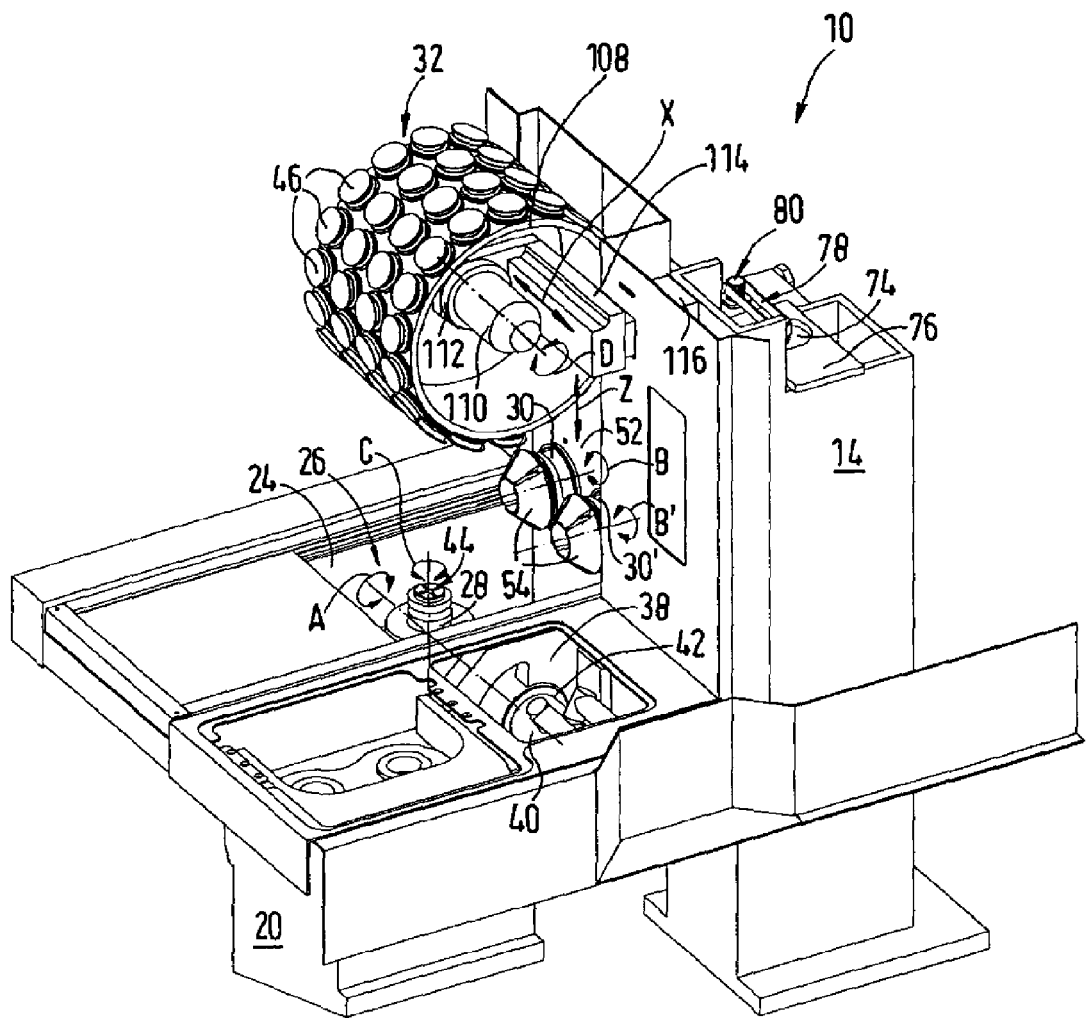
FIG. 2 is a perspective view, which is enlarged in scale by comparison with FIG. 1, of the device of FIG. 1 obliquely from above and front right, wherein by comparison with FIG. 1 a machine frame, a transport system for the prescription boxes, a loading system for workpieces and tools and further parts of the cladding have been omitted.

When reference is made in the following to "horizontal" and "vertical", this means two mutually perpendicularly extending directions. In addition, if by these terms directions are described which in reality extend substantially horizontally or substantially vertical, this is not to be understood in the restrictive sense that the corresponding directions could not also lie in whatever manner in space, as long as "horizontal" and "vertical" extend perpendicularly to one another.

DETAILED DESCRIPTION OF THE PREFERRED EMBODIMENTS

Referring now to the drawings there is shown a finish-machining device 10 particularly for simultaneous polishing of two spectacle lenses L. The device 10 includes a machine frame 12 and a vertical column 14, which is connected therewith, as a carrier for all subassemblies. A transport system 16 for prescription boxes 18 is fastened to the machine frame 12 in a region of device 10 at the front in FIG. 1. The prescription boxes 18 are, in a manner known per se, constructed for reception of a pair of blocked lenses L and serve in an RX workshop for the purpose of transporting the lenses L from one working station to the next working station. In the present case blocked lenses L are fed by the prescription boxes 18 in an unpolished state to the device 10. After the finish-machining the prescription boxes 18 receive back the blocked lenses L then in a polished state, whereupon the lenses L can be transported to further working stations.

In a region of the device 10 at the middle in FIG. 1 a washing station 20 for the lenses 11 can be seen on the left and on the right thereof a loading system 22 for workpieces and tools, which is flange-mounted on the vertical column 14 and will be described in more detail.

Figure 3:
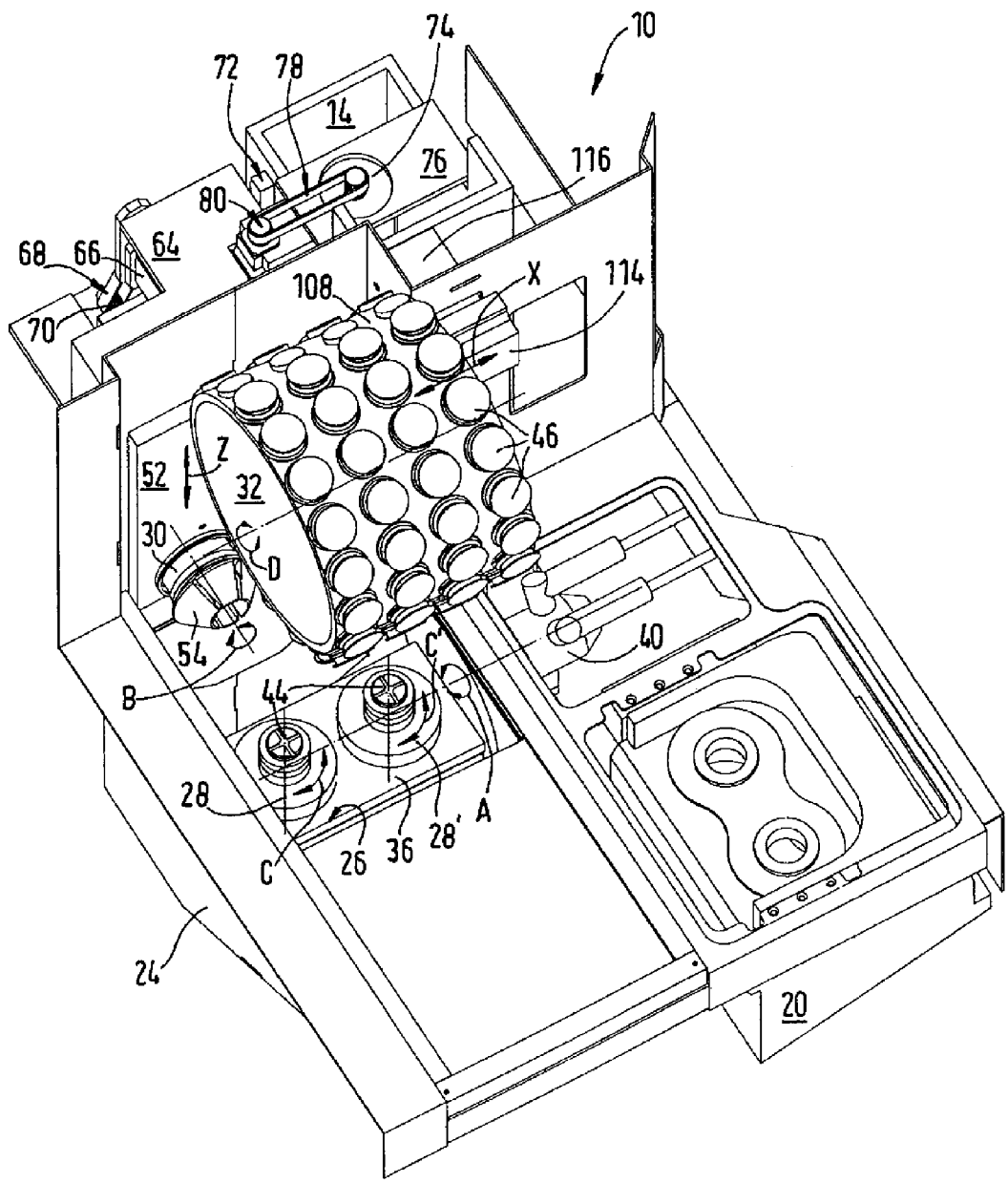
FIG. 3 is a perspective view, which is further enlarged in scale by comparison with FIG. 2, of the device of FIG. 1 obliquely from above and front left, with the simplifications of FIG. 2.

In a region at the back in FIG. 1 a sheet-metal housing 24 mounted on the vertical column 14 is shown on the left, which housing bounds a working space 26 of the finish-machining device 10 and is fastened to the washing station 20. The housing 24 and the washing station 20 are, in addition, mounted on the machine frame 12. Disposed in the region of the working space 26 at the bottom are two parallel arranged tool spindles 28, 28' (cf. FIG. 3). Two workpiece spindles 30, 30' associated with the tool spindles 28, 28' and similarly arranged in parallel are provided therebehind in FIG. 3. Not only the tool spindles 28, 28', but also the workpiece spindles 30, 30' are movably fastened to the vertical column 14, as will be explained in more detail.

In addition, a tool magazine 32 which is similarly mounted on the vertical column 14 to be movable is arranged above the housing 24 in the region at the back in FIG. 1. In the state shown in FIG. 1 the working space 26 is closed or covered at the top by a horizontally movable slide 34 (working space door) guided at the housing 24. The further encapsulation of the working space 26 by trough-like sump, telescopic covers and bellows is shown only partly in the figures and will not be described in more detail here, since these measures are familiar to one ordinarily skilled in this art.

Further details with respect to the tool spindles 28, 28' can be inferred from, in particular, FIGS. 5 to 9. The tool spindles 28, 28' are mounted in a pivot yoke 36 which is pivotable about a pivot axis A with CNC closed-loop control in rotational angle. For this purpose the pivot yoke 36 is rotatably mounted on a bracket 38 (see FIGS. 8 and 9) which in turn is flange-mounted on the vertical column 14. In order to generate the pivot movement about the pivot axis A a pivot drive 40 flange-mounted on the bracket 38 and operatively connected with the pivot yoke 36 by way of a harmonic drive transmission 42 is provided. The pivot yoke 36 and thereby the tool spindles 28, 28' are pivotable by the pivot drive 40 from a rest position, which is illustrated in FIGS. 2 to 9, through 60° to 90° in counter-clockwise sense in FIGS. 3, 4, 6 and 7 about the pivot axis A into a machining position which is inclined in the direction of the workpiece spindles 30, 30' and in which the spindles remain during the actual polishing processing.

The tool spindles 28, 28' each carry at the ends thereof projecting into the working space 26 a respective tool interface 44. With respect to construction and function of the tool interface 44 incorporation by reference is made to German Patent Application 10 2009 036 981.3. Each tool interface 44 can be pneumatically adjusted in a manner, which is known per se, in the axial direction of the tool spindles 28, 28'. To that extent reference may be made, by way of example, to the documents U.S. Pat. Nos. 7,066,794 B2, 7,278,908 B2 and U.S. Patent Application Publication 2008/0305723 A1, which also disclose the construction and function of suitable polishing plates or tools 46.

Figure 9:
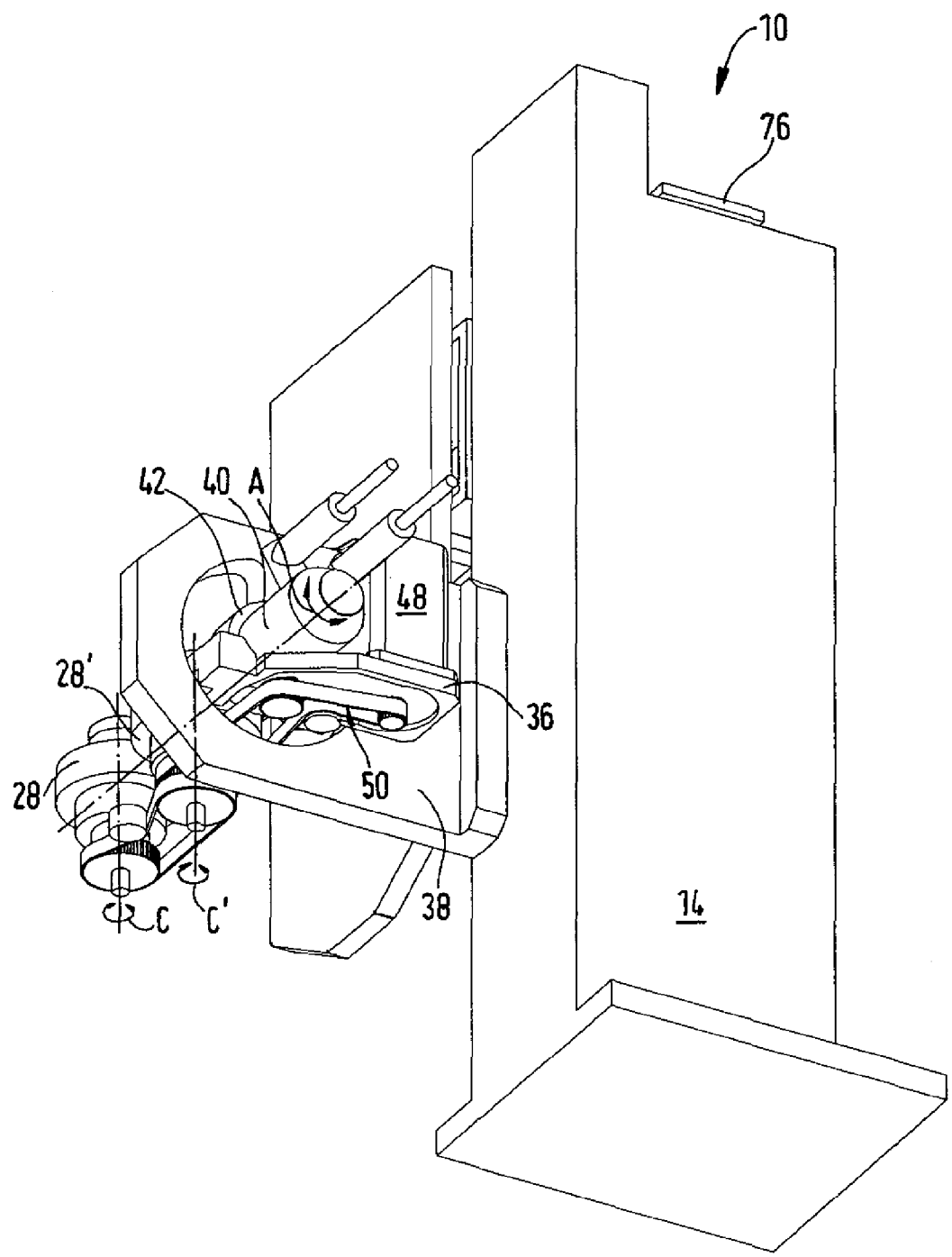
FIG. 9 is a perspective view of the device of FIG. 1 obliquely from below and front right, with the simplifications of FIG. 8.

Moreover, the tool interfaces 44 are rotationally drivable by the tool spindles 28, 28' about the tool rotational axes C, C' with CNC closed-loop control in rotational angle. In order to generate this rotational movement a rotary drive 48 (cf. FIGS. 8 and 9) is provided in common for the two tool spindles 28, 28', which drive is flange-mounted on the pivot yoke 36 outside the working space 26 and disposed in operative connection with the tool spindles 28, 28' by way of a belt drive 50 received in the pivot yoke 36. This belt drive 50 is shown in FIG. 9, for which purpose the pivot yoke 36 has been illustrated broken away.

Figure 4:
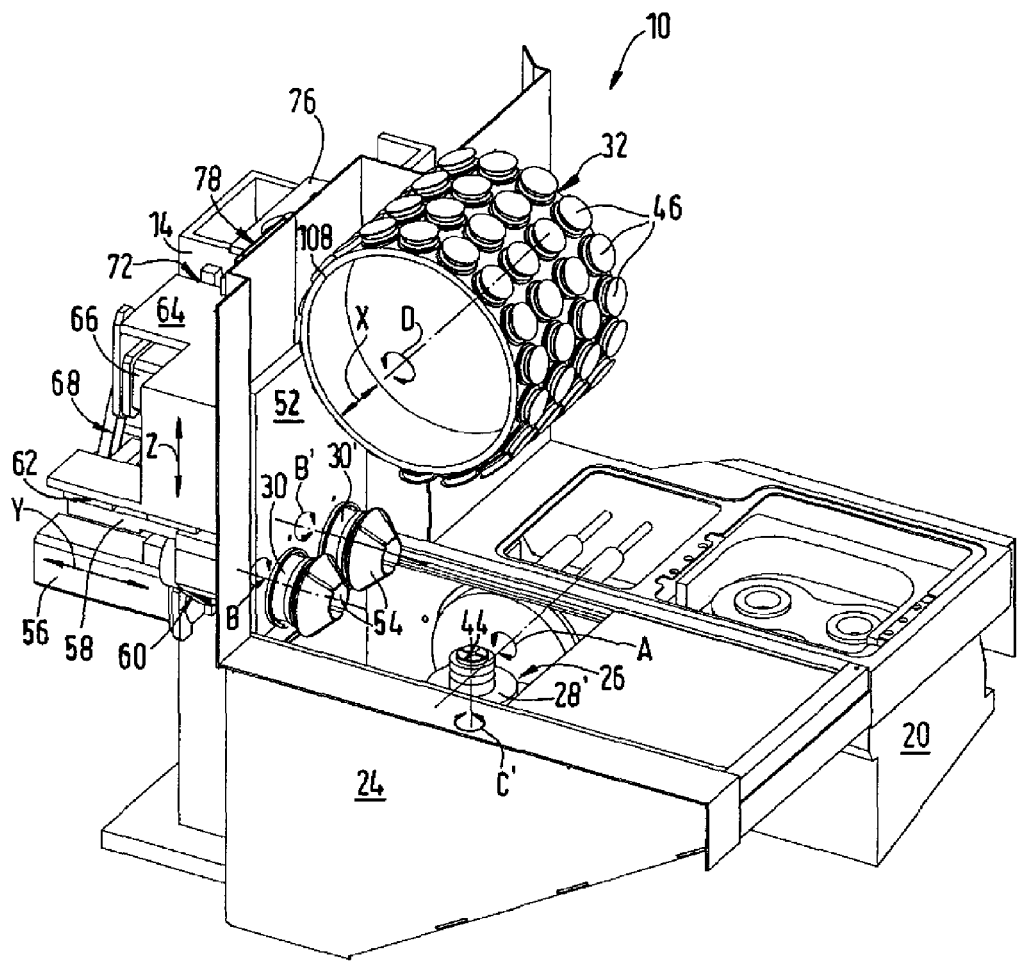
FIG. 4 is a perspective view of the device of FIG. 1 in similar manner to FIG. 3, but by comparison with the latter from further to the left and further from below, again with the simplifications of FIG. 2.
Figure 5:
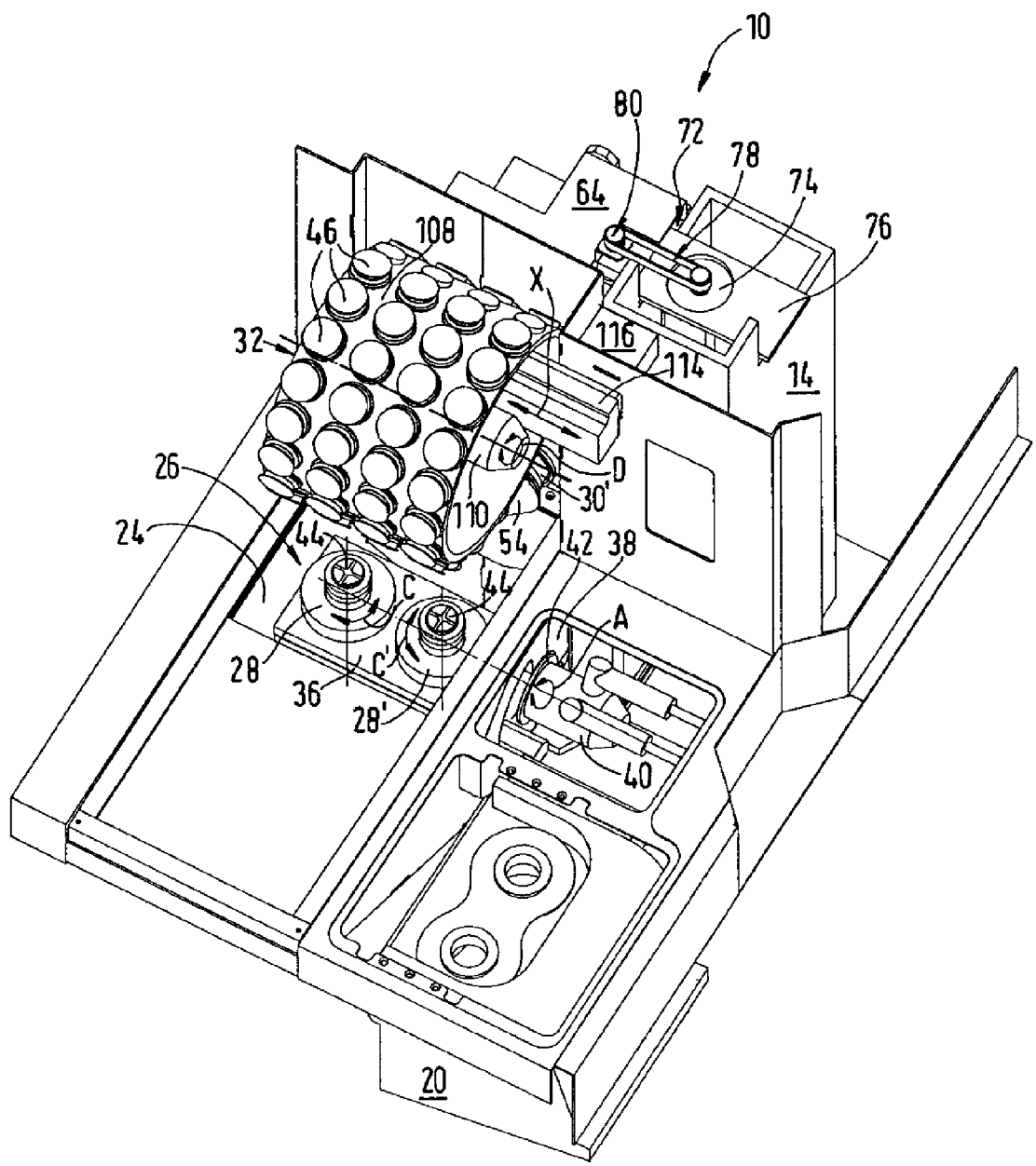
FIG. 5 is a perspective view of the device of FIG. 1 obliquely from above and front right, again with the simplifications of FIG. 2.
Figure 6:
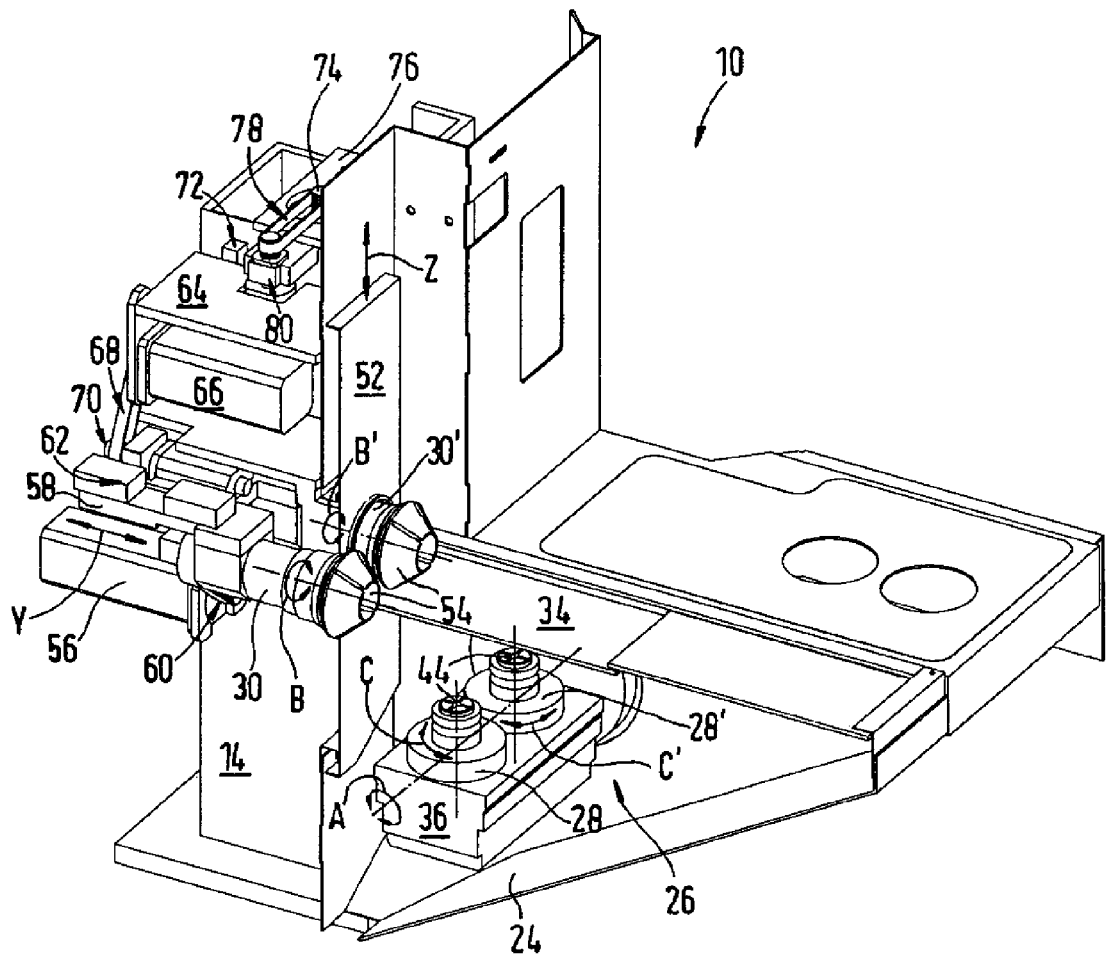
FIG. 6 is a perspective view of the device of FIG. 1 in similar manner to FIG. 4 and again with the simplifications of FIG. 2 (as far as a covering of the washing station), wherein additionally a tool magazine and a washing station have been omitted and the device is shown broken away in the region of a working space and carriage for workpiece spindles.
Figure 7:
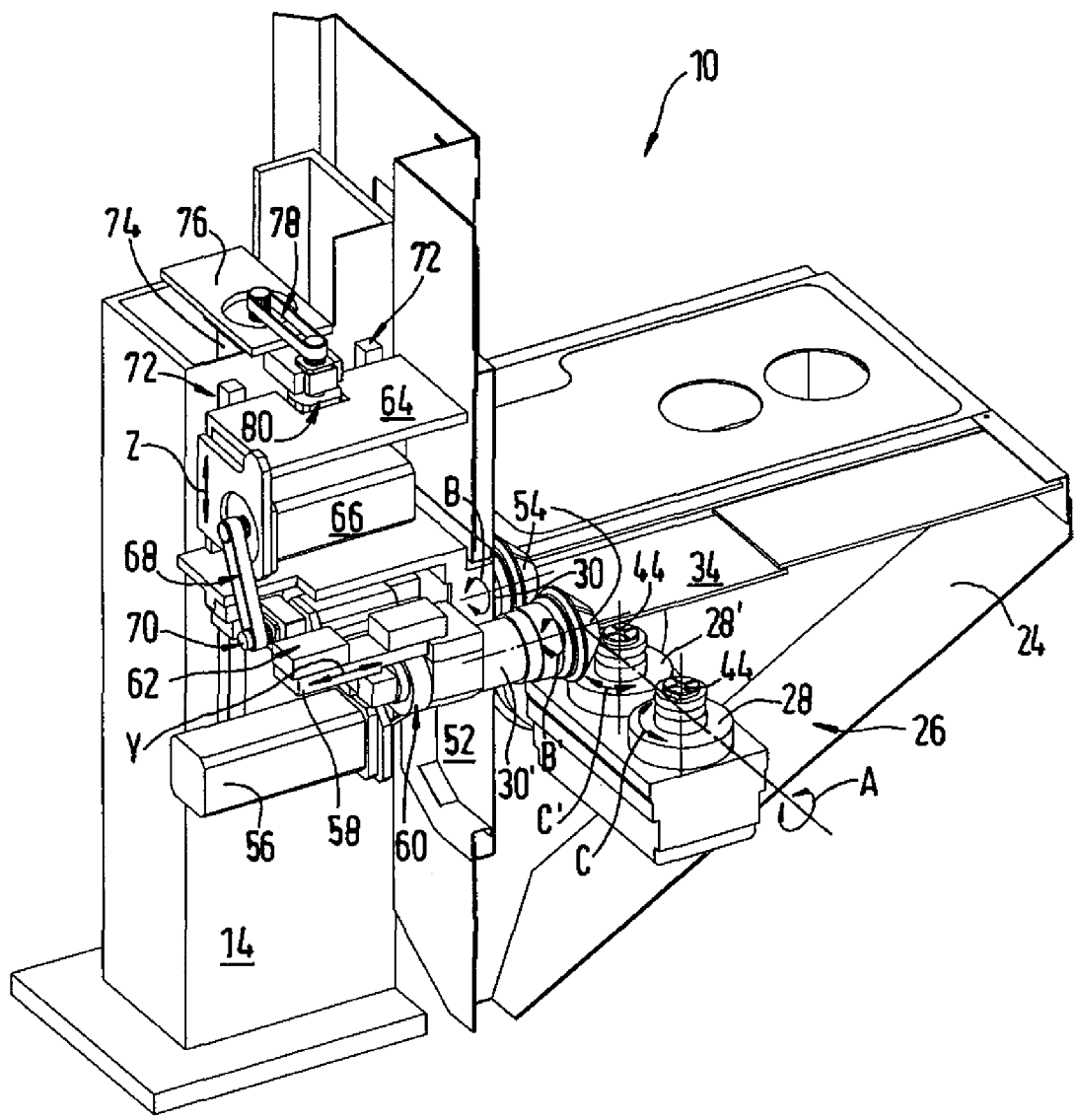
FIG. 7 is a perspective view of the device of FIG. 1 obliquely from above and back right, with the simplifications of FIG. 6.
Figure 8:
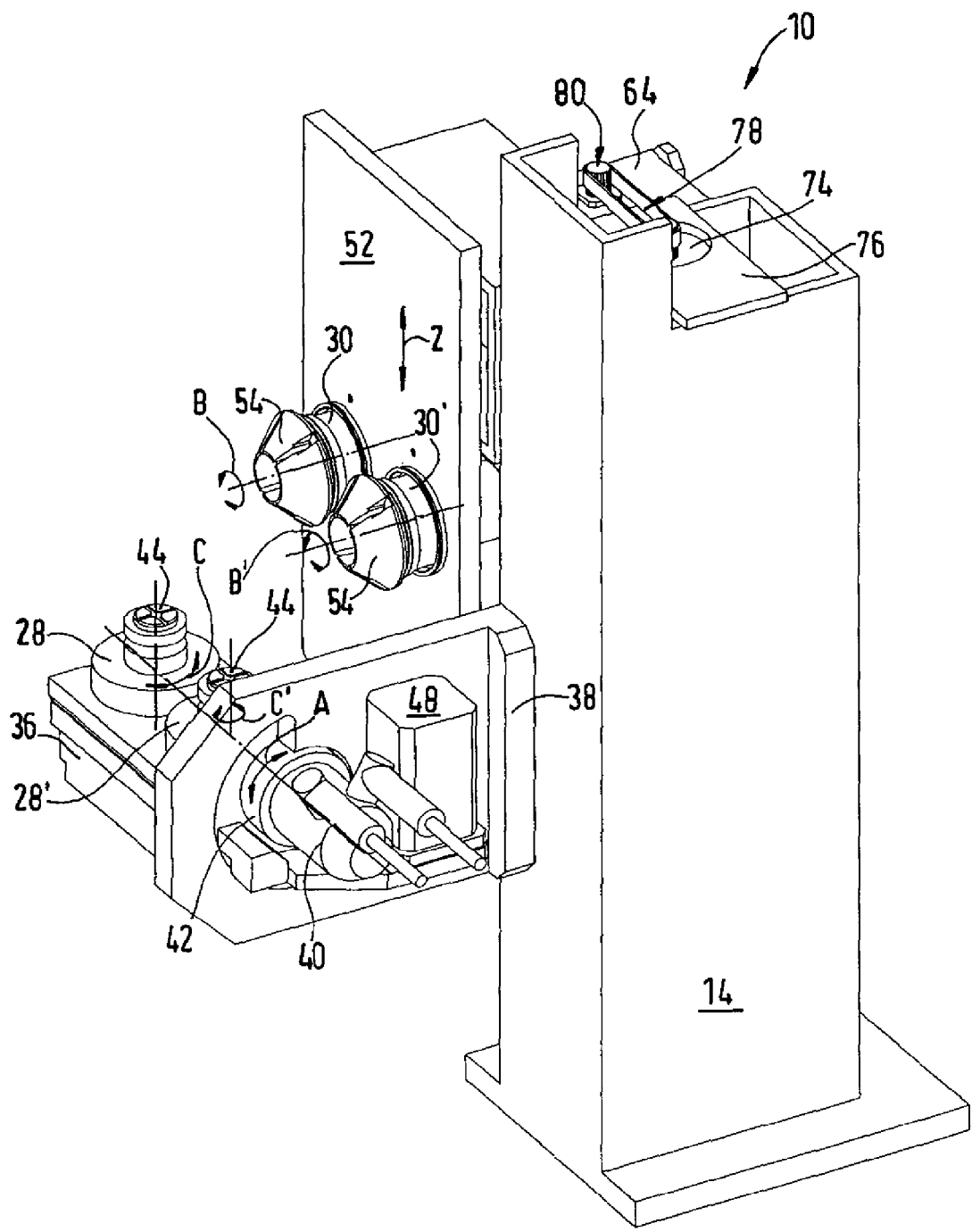
FIG. 8 is a perspective view of the device of FIG. 1 in similar manner to FIG. 2, but by comparison with the latter to an enlarged scale, wherein in addition the washing station, the tool magazine, a housing bounding the working space and further parts of the cladding have been omitted.

Details with respect to the workpiece spindles 30, 30' are evident particularly from FIGS. 4, 6 and 7. The horizontally disposed workpiece spindles 30, 30' engage through a Z slide 52, which bounds the working space 26 in FIGS. 4, 6 and 7 on the left, and project by the ends thereof into the working space 26. At the end, each workpiece spindle 30, 30' is provided with a preferably pneumatically actuable, spring-loaded chuck 54 which serves the purpose of holding the spectacles lens L mounted on a blocking member.

The chucks 54 are rotationally drivable about workpiece axes B, B' of rotation by the workpiece spindles 30, 30' with CNC closed-loop control in rotational angle. A rotary drive 56, which together with the workpiece spindles 30, 30' is fastened to a Y carriage 58 and in accordance with, in particular, FIGS. 6 and 7 is operatively connected with the workpiece spindles 30, 30' by way of a further belt drive 60, is provided in common for the two workpiece spindles 30, 30' in order to generate this rotary movement.

The workpiece spindles 30, 30' can move in common back and forth with respect to the working space 26 along a horizontal Y axis with CNC positional closed-loop control. For this purpose the Y carriage 58 is mounted by linear guides 62 (see FIGS. 4, 6 and 7) on a Z carriage 64 to be longitudinally displaceable. A rotary drive 66, which according to, in particular, FIGS. 6 and 7 is mounted in the Z carriage 64 and operatively connected by way of a belt drive 68 with a spindle drive 70 for the Y carriage 58, is again provided in order to generate this linear movement.

Moreover, the workpiece spindles 30, 30' can move in common up and down with respect to the working space 26 along a vertical Z axis with CNC positional closed-loop control. For this purpose, the Z carriage 64 is mounted on the vertical column 14 by linear guides 72 (cf. FIGS. 3 to 7 and 12) to be longitudinally displaceable. A rotary drive 74, which is mounted by way of a flange plate 76 in the vertical column 14 at the end thereof which is upper in the figures, is again provided in order to generate this linear movement. The rotary drive 74 is operatively connected by way of a further belt drive 78 with a further spindle drive 80 for the Z carriage 64.

To that extent it is apparent that the finish-machining device 10 can operate during polishing with, for example, a so-termed 'tangential process' in which a fixed angle of the tool spindles 28, 28' is set by the pivot axis A, whereupon the workpiece spindles 30, 30' after adjustment in the Y and Z axes are moved up and down by the Z axis, whereas the polishing tools 46, which are rotationally driven about the tool rotational axes C, C', are disposed in machining engagement with the spectacle lenses L rotationally driven about the workpiece rotational axes B, B' preferably in the same sense and synchronously. Such a polishing process is described in detail in U.S. patent application Ser. No. 12/881,738, to which incorporation by reference is accordingly made with respect thereto.

Figure 10:
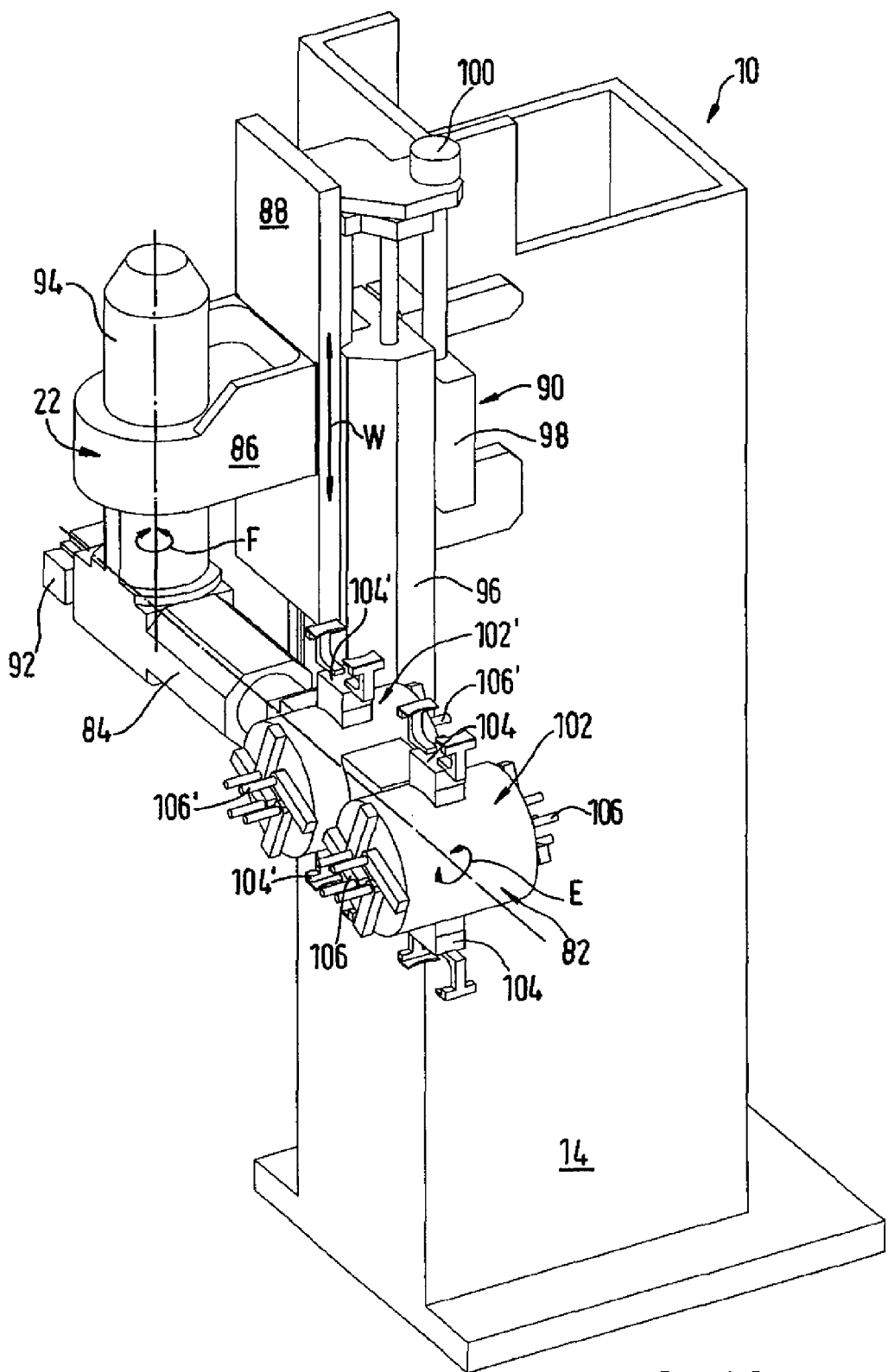
FIG. 10 is a perspective view of the device of FIG. 1 in similar manner to FIG. 1, but to enlarged scale, wherein merely a vertical column and a loading system mounted thereon for workpieces and tools have been illustrated.
Figure 11:
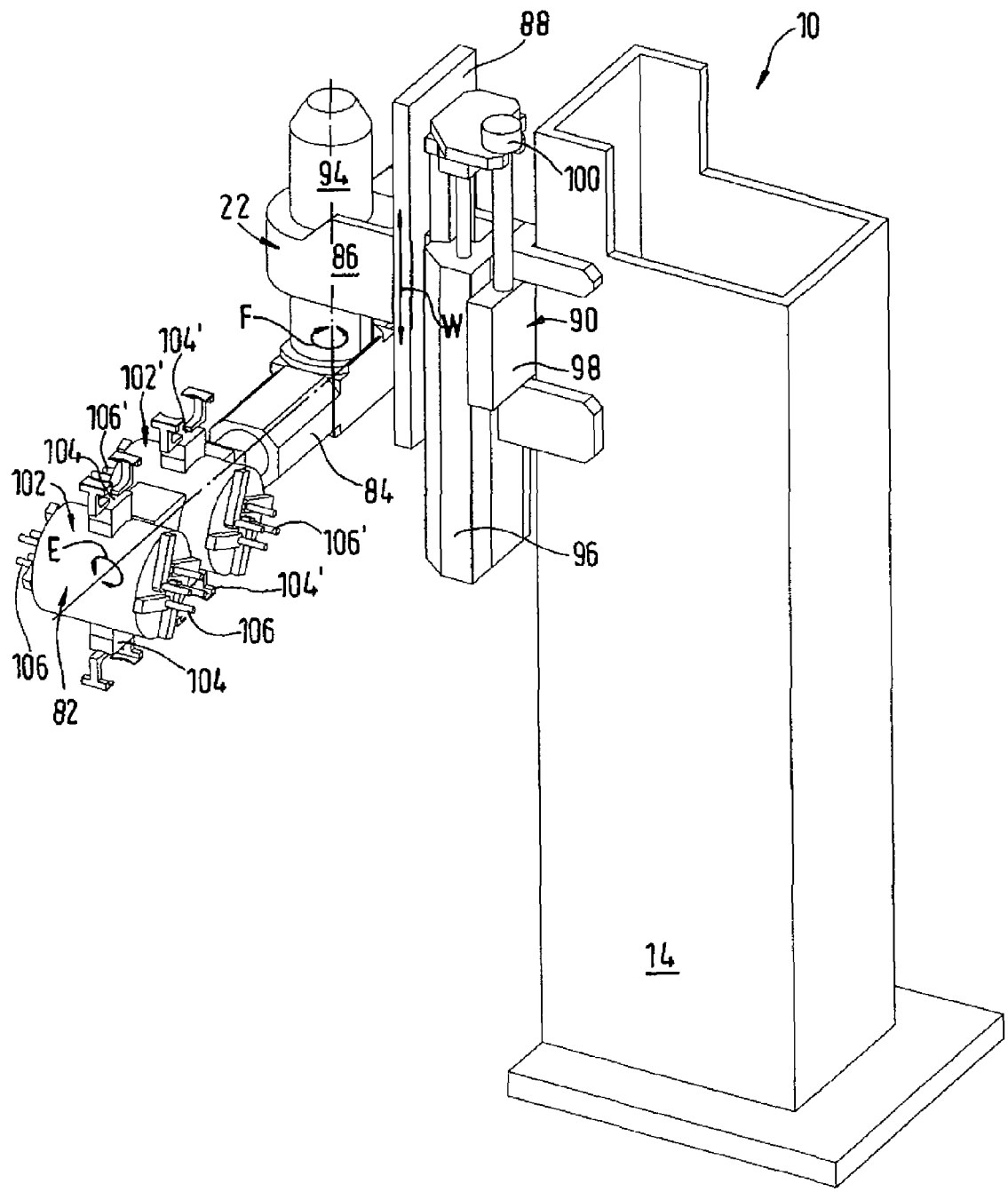
FIG. 11 is a perspective view of the device of FIG. 1 obliquely from above and back left, with the simplifications of FIG. 10.
Figure 12:
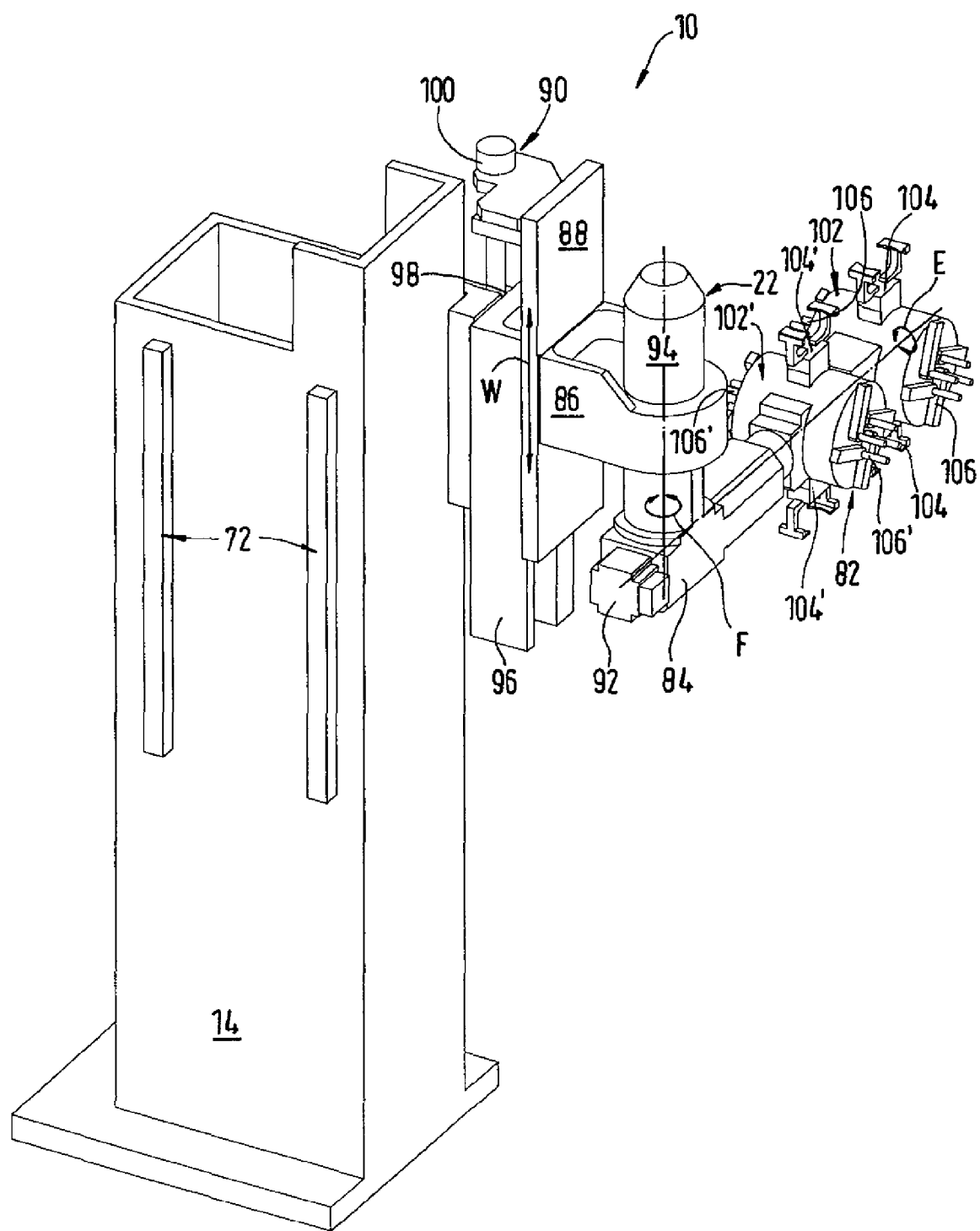
FIG. 12 is a perspective view of the device of FIG. 1 obliquely from above and front left, again with the simplifications of FIG. 10.

Further details with regard to the loading system 22 are evident from, especially, FIGS. 10 to 12. The loading system 22 comprises in general a loading head 82, a loading arm 84, a pivot bracket 86, a W carriage 88 and an actuator arrangement 90 for the W carriage 88. The loading head 82 is mounted on the loading arm 84 to be pivotable about a horizontal pivot axis E with CNC closed-loop control in rotational angle. A rotary drive 92 (for example a hollow-shaft AC servomotor), which is operatively connected with the loading head 82 by way of a harmonic drive transmission (not shown) in the loading arm 84, for generating the pivot movement about the horizontal pivot axis E is flange-mounted on the end of the loading arm 84 remote from the loading head 82.

The loading arm 84 is mounted on the pivot bracket 86 to be pivotable and, specifically, about a vertical pivot axis F, which extends perpendicularly to the pivot axis E, with CNC closed-loop control in rotational angle. A rotary drive 94 (for example an AC servomotor), which is flange-mounted at the top on the pivot bracket 86 and disposed in operative connection with the loading arm 84 by way of a further harmonic drive transmission (not illustrated) in the pivot bracket 86, is provided for generating the pivot movement about the vertical pivot axis F. Through pivoting of the loading arm 84 about the vertical pivot axis F the loading head 82 can be selectably brought above the transport system 16, the washing station 20 or the working space 26.

The pivot bracket 86 is fastened on the W carriage 88, which can be moved up and down in vertical movement direction W by the actuator arrangement 90—which is flange-mounted on the vertical column 14—in order to adopt one of in total three possible vertical positions. For this purpose the actuator arrangement 90 has a pneumatically actuated main actuator 96 with guides which move the W carriage 88 either upwardly or downwardly. In addition, the actuator arrangement 90 has a pneumatically actuated auxiliary actuator 98 serving the purpose of moving an abutment 100 for the W carriage 88 up or down between two end settings. If the abutment 100 actuated by the auxiliary actuator 98 is disposed in its upper end setting, then the main actuator 96 can move the W carriage 88 from a lower vertical position of the loading system 22 to an upper vertical position of the loading system 22 or conversely. If, on the other hand, the abutment 100 is displaced by the actuator 98 into its lower end setting, then the main actuator 96 can move the W carriage 88 merely from the lower vertical position of the loading system to a middle vertical position or intermediate position of the loading system 22 or conversely. As will be described in more detail in the following, the loading system 22 in its upper vertical position co-operates with the tool magazine 32 in order to remove polishing tools 46 from the tool magazine 32 or deposit them therein. In the lower vertical position of the loading system 22 this can transfer polishing tools 46 and/or spectacle lenses L to the tool spindles 28, 28' or the workpiece spindles 30, 30', respectively, or pick them up from the respective spindles. The middle vertical position of the loading system 22 is provided for the pivot movement thereof about the vertical pivot axis F.

In the illustrated embodiment the loading head 82 consists of two loading sections 102, 102', which are arranged adjacent to one another or, as seen in the direction of the horizontal pivot axis E, one behind the other and are of identical construction and of which in the machining of spectacles lens pair one loading section 102 is associated with, for example, machining of the left-hand lens L and the other loading section 102' is associated with the machining of the right-hand lens L. Each loading section 102, 102' has two pneumatically actuable parallel grippers 104 or 104', which are of identical construction, for the polishing tools 46 and two pneumatically actuable four-finger grippers 106 or 106', which are of identical construction, for the lenses L, the fingers of which engage the spectacle lenses L at the circumference and can adapt to any circumferential contours of the spectacle lenses L. As seen in circumferential direction around the horizontal pivot axis E a first parallel gripper 104 or 104', a first four-finger gripper 106 or 106', a second parallel gripper 104 or 104' and a second four-finger gripper 106 or 106' follow one another at each loading section 102, 102' and, in particular, are respectively angularly spaced by 90° in cruciform arrangement. As seen along the horizontal pivot axis E, all grippers 104, 106 or 104', 106' of each loading section 102 or 102' are so arranged that the gripping center points thereof lie at one level. In other words, all gripping center points of the respective loading section 102 or 102' lie in a notional plane extending perpendicularly to the horizontal pivot axis E.

Further details of the tool magazine 32 arranged above the working space 26 are evident particularly from FIGS. 2 to 5. The tool magazine 32 comprises a tool receiving drum 108 provided on its outer circumference with receiving projections (not shown in more detail) for the polishing tools 46. In the illustrated embodiment in each instance four receiving projections form a row, which is parallel to the center axis of the tool receiving drum 108, of equidistantly spaced receiving projections, wherein in total eighteen such rows are distributed around the circumference of the tool receiving drum 108 to be angularly spaced uniformly about the center axis of the tool receiving drum 108. Individual receiving projections on the tool receiving drum 108 are in this regard so constructed that they are capable of holding a polishing tool 46 such as is described in, for example, German Patent Application 10 2009 036 981.3. The spacing between the first and the third or the second and the fourth receiving projections of each row corresponds with the axial spacing of the planes, which are formed by the gripping center points of the respective loading section 102, 102', of the loading sections 102, 102' of the loading system 22 along the horizontal pivot axis E, which in turn correspond with the spacing of the tool rotational axes C, C' of the tool spindles 28, 28' from one another and the spacing of the workpiece rotational axes B, B' of the workpiece spindles 30, 30' from one another.

The tool receiving drum 108 is rotatable about a tool magazine rotational axis D with CNC closed-loop control in rotational angle. A rotary drive 110 (for example an AC servomotor), which is operatively connected with the tool receiving drum 108 by way of a harmonic drive transmission 112 (see FIG. 2), is provided in the interior of the tool receiving drum 108 in order to generate this rotational movement. The tool receiving drum 108 together with rotary drive 110 and harmonic drive transmission 112 is mounted on a pneumatically actuable linear actuator 114, which is in turn fastened to the vertical column 14 by way of a mount 116. The linear actuator 114 serves the purpose of moving the tool magazine 32 in a horizontal direction X and, in particular, between two end settings, wherein in an end setting, which is at the right in FIG. 3, of the tool magazine 32 the center axes of the receiving projections, which are first and third as seen in direction towards the right, of each row of receiving projections respectively lie in a vertical plane C-B or C'-B' formed by the tool and workpiece rotational axes C, B or C', B', while in an end setting, which is at the left in FIG. 3, of the tool magazine 32 the center axes of the second and fourth receiving projections respectively lie in the vertical plane C-B or C'-B'.

Finally, with respect to the transport system 16 it is still to be noted that this comprises a belt conveyor (not shown in more detail), by which the prescription boxes 18 can be moved to the left or right in a horizontal direction S in FIG. 1. Moreover, the transport system 16 comprises, as transfer point for the lenses L, a pneumatically actuated stroke/pivot device 118 serving the purpose of selectably raising or lowering a plate 120 for the prescription boxes 18 in a vertical direction T and/or pivoting it through 90° about a vertical pivot axis I. As can be seen in FIG. 1, the plate 120 has an upwardly angled abutment 122 for the prescription boxes 18. More precisely, the plate 120 can be moved vertically into three different height settings (linear movement T) by the stroke/pivot device 118, namely a lower setting in which the abutment 122 does not protrude into the movement path of the prescription boxes 18 in the direction S, a middle setting in which the abutment 122 protrudes into the movement path of the prescription boxes 18 and thus can stop the movement thereof in the direction S, and finally an upper setting in which the plate 120 is disposed so far above the transport system 16 that it can be pivoted through 90° about the pivot axis I by the stroke/pivot device 118.

Although the use of harmonic drive transmissions was mentioned several times above, it is obviously also possible to use, instead thereof, planetary transmissions or other step-down transmissions at the described points.

One possible fully-automated polishing process with the finish-machining device 10 constructed as described in the foregoing will be explained in its time sequence in the following on the basis of FIGS. 13 to 49, wherein in the figures for the sake of improved clarity merely the reference numerals mentioned for the respective figure have been shown.

Figure 13:
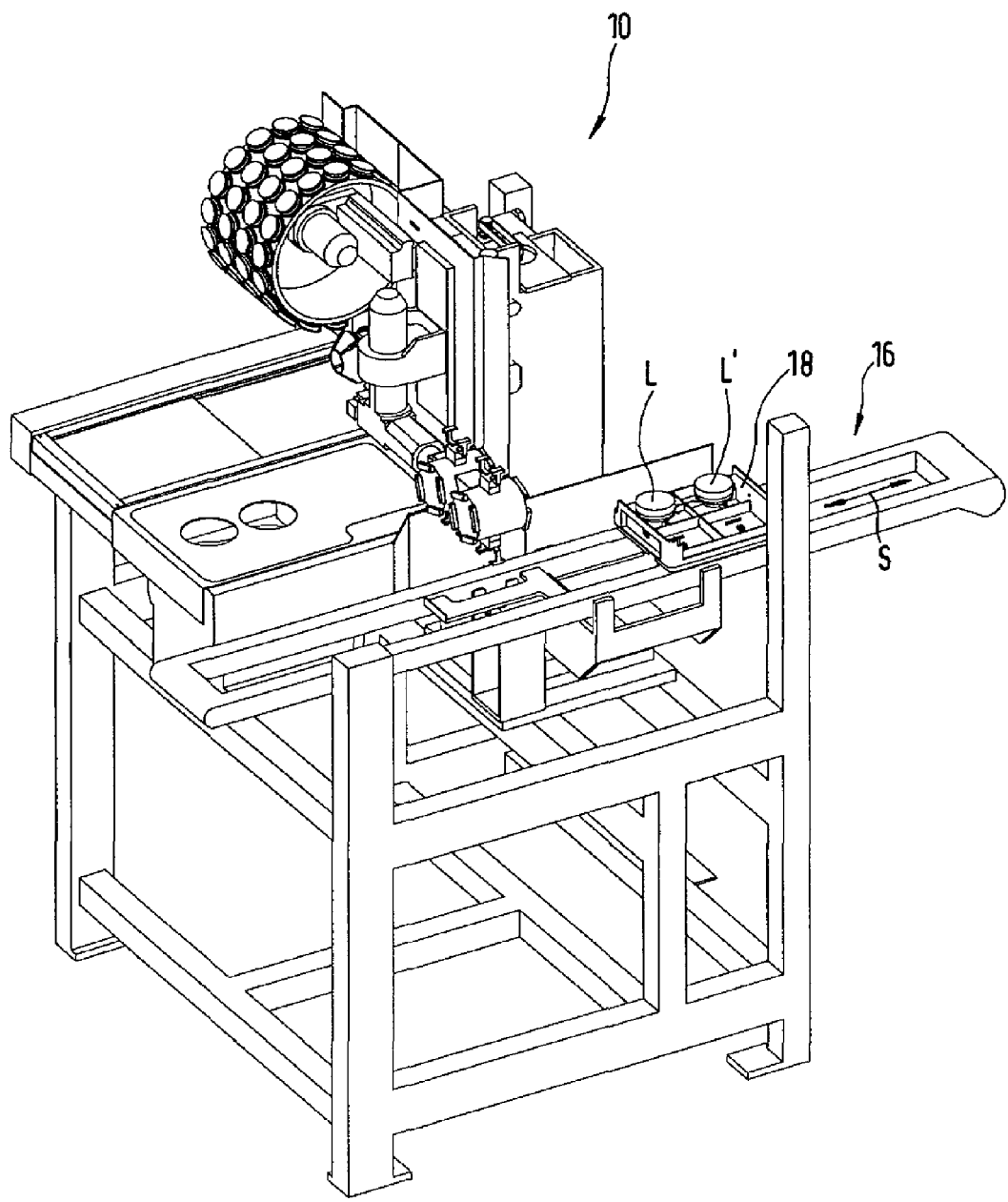
FIGS. 13 to 49 are perspective views of the device of FIG. 1, which illustrate one possible fully-automated polishing process in the time sequence thereof.

FIG. 13: The transport system 16 moves a prescription box 18 with a pair, received therein, of blocked spectacle lenses L, L' in horizontal direction (linear movement S) into a horizontal loading position on the transport system 16.

Figure 14:
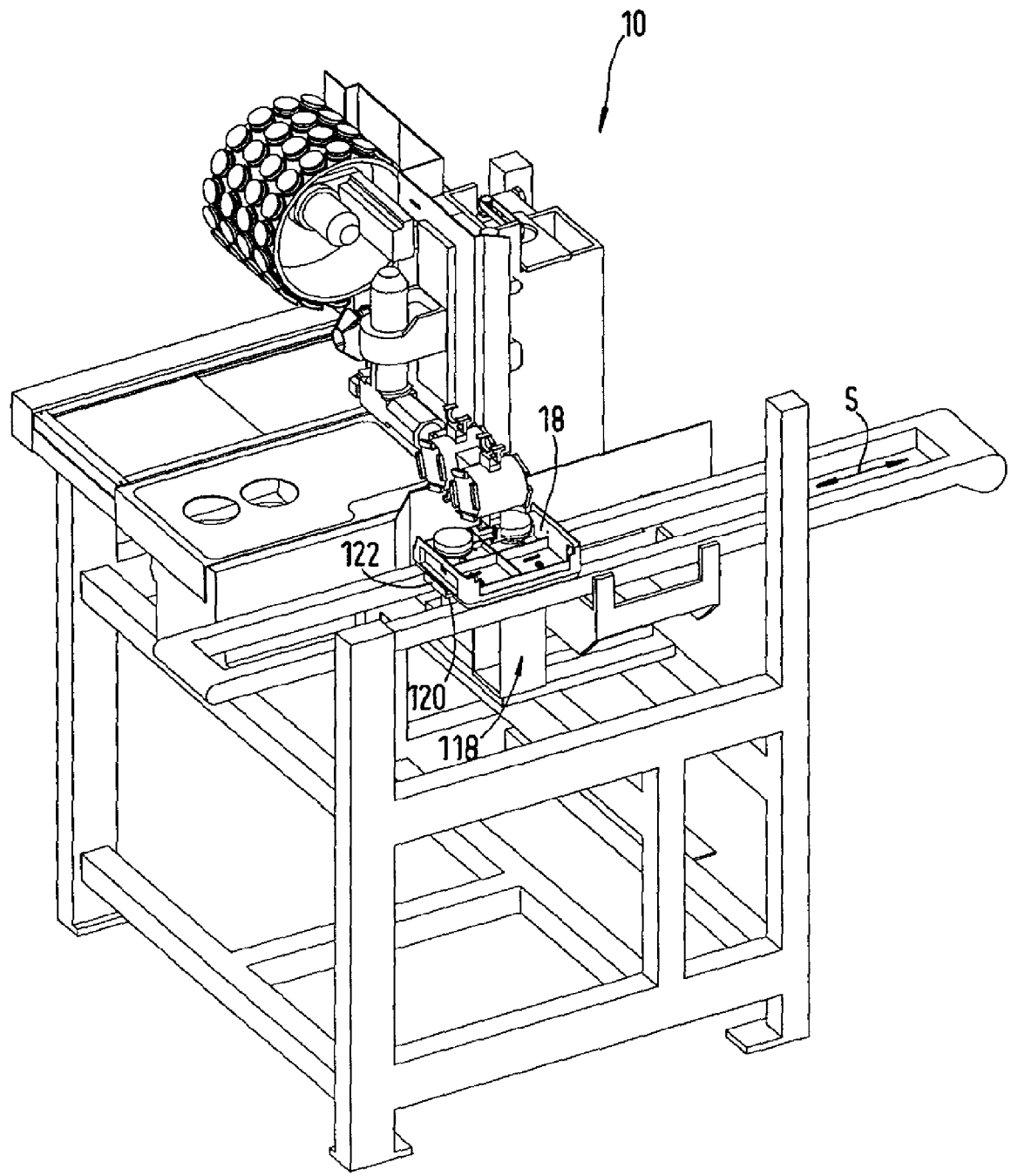

FIG. 14: The stroke/pivot device 118 holds the plate 120 in its middle height setting in which the abutment 122 protrudes into the horizontal movement path of the prescription box 18, as a consequence of which the prescription box 18 abuts against the abutment 122. The horizontal linear movement S thereupon stops.

Figure 15:
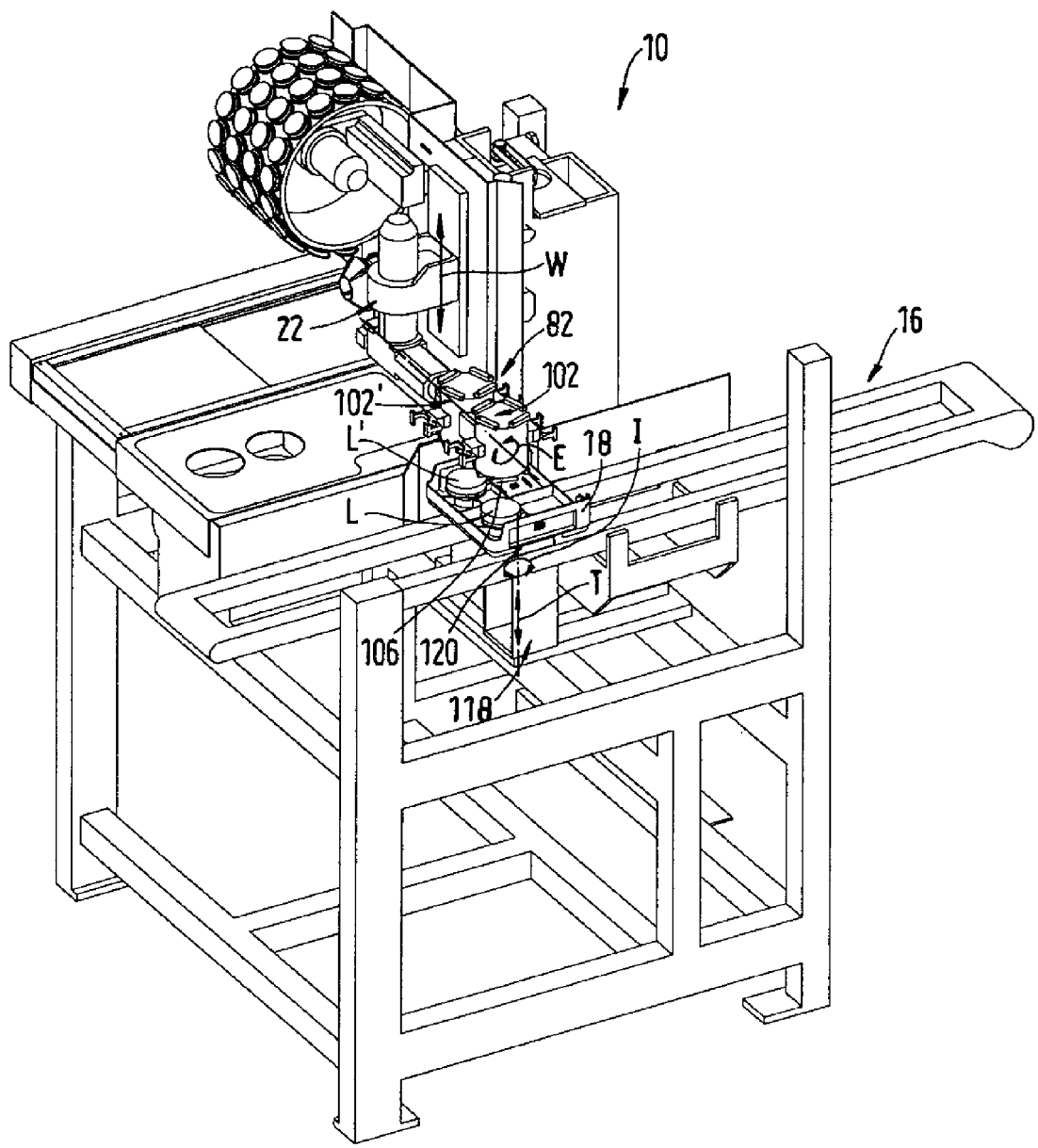

FIG. 15: The stroke/pivot device 118 has raised the plate 120 into its upper height setting (vertical linear movement T at the transport system 16) and rotated it through 90° in counter-clockwise sense (pivot movement I at the transport system 16), so that the blocked lenses L, L' in the prescription box 18 stand transversely to the transport system 16. In addition, the loading head 82 was pivoted through 90° about the horizontal pivot axis E of the loading system 22 so that the loading sections 102, 102' are each disposed by a four-finger gripper 106, 106' opposite the blocked lenses L, L'. In this connection, the loading system 22 is disposed in its center vertical position (vertical linear movement W at the loading system 22).

Figure 16:
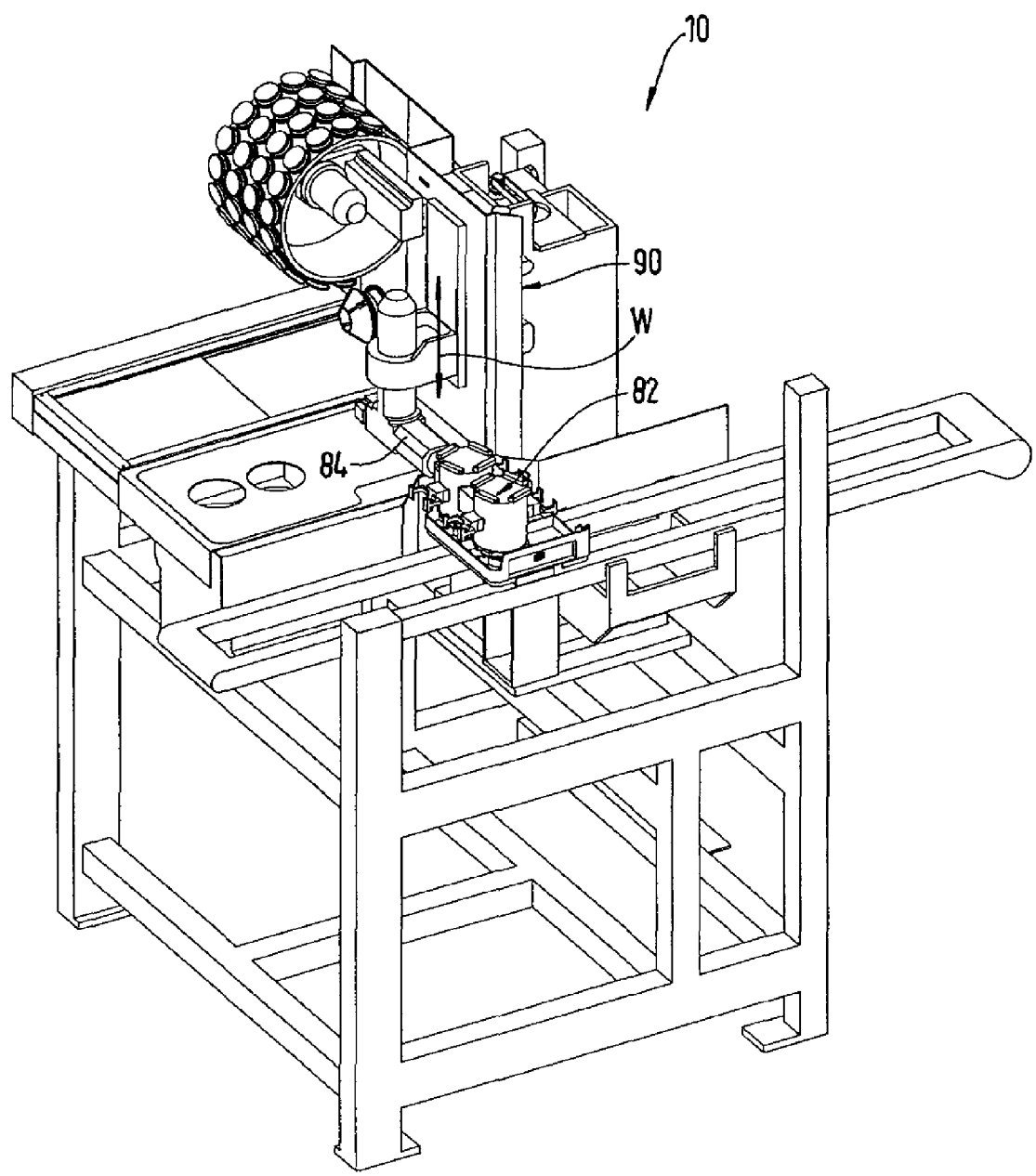

FIG. 16: The loading arm 84 together with loading head 82 was brought by the actuator arrangement 90 into its lower vertical position (vertical linear movement W at the loading system 22). The lower four-finger grippers 106, 106' at the loading head 82 grip the blocked lenses L, L' (not specifically able to be seen in FIG. 16).

Figure 17:
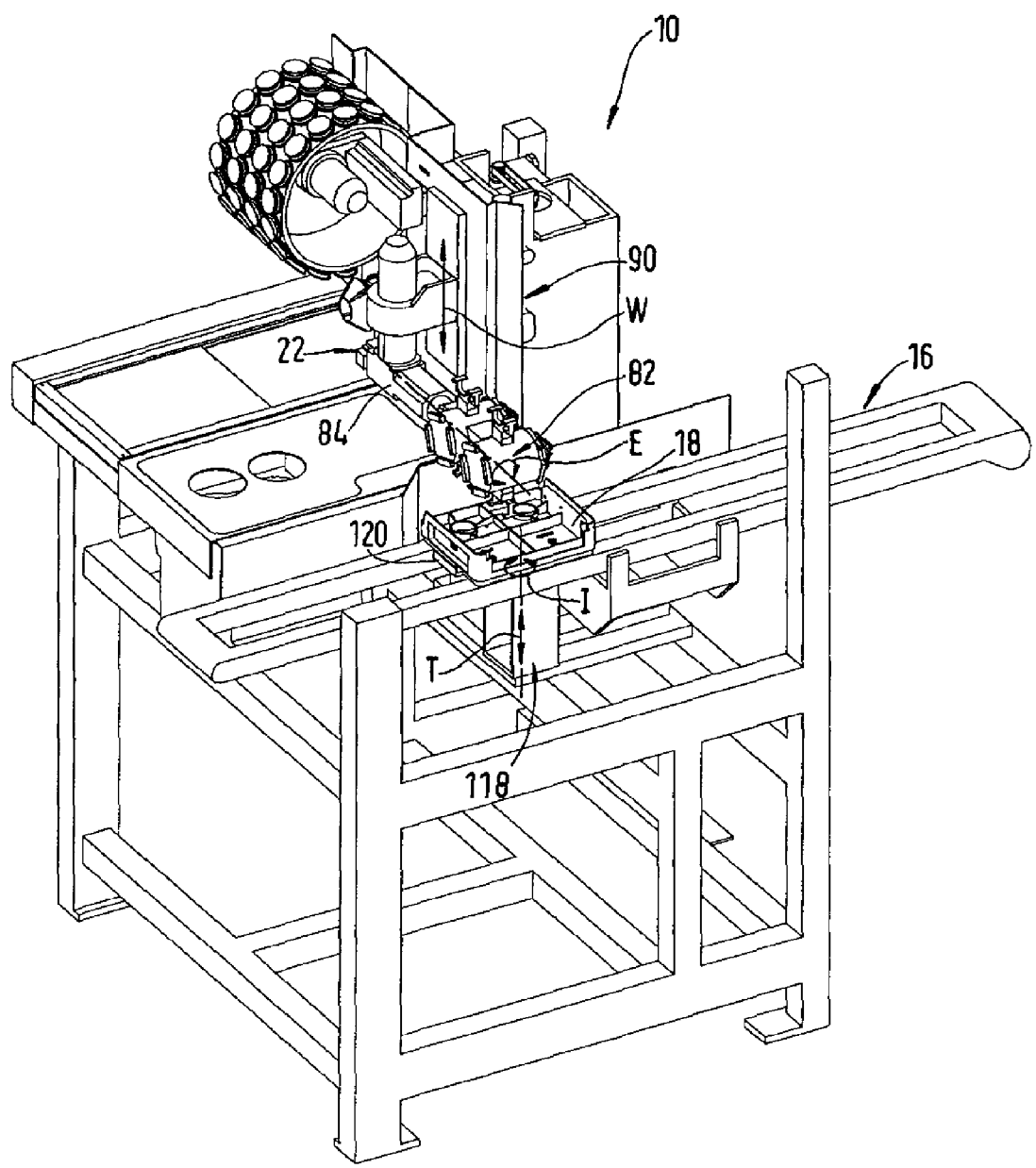

FIG. 17: The loading arm 84 together with loading head 82 was raised by the actuator arrangement 90 into its middle vertical position (vertical linear movement W at the loading system 22) and the loading head 82 was rotated with respect to the loading arm 84 through 90° in counter-clockwise sense (horizontal pivot axis E of the loading system 22). In addition, the prescription box 18 sitting on the plate 120 was rotated and lowered back into its position according to FIG. 14 by the stroke/pivot device 118 (pivot movement I and vertical linear movement T at the transport system 16). The blocked lenses L, L' are now no longer disposed in the prescription box 18, but are carried by the loading head 82.

Figure 18:
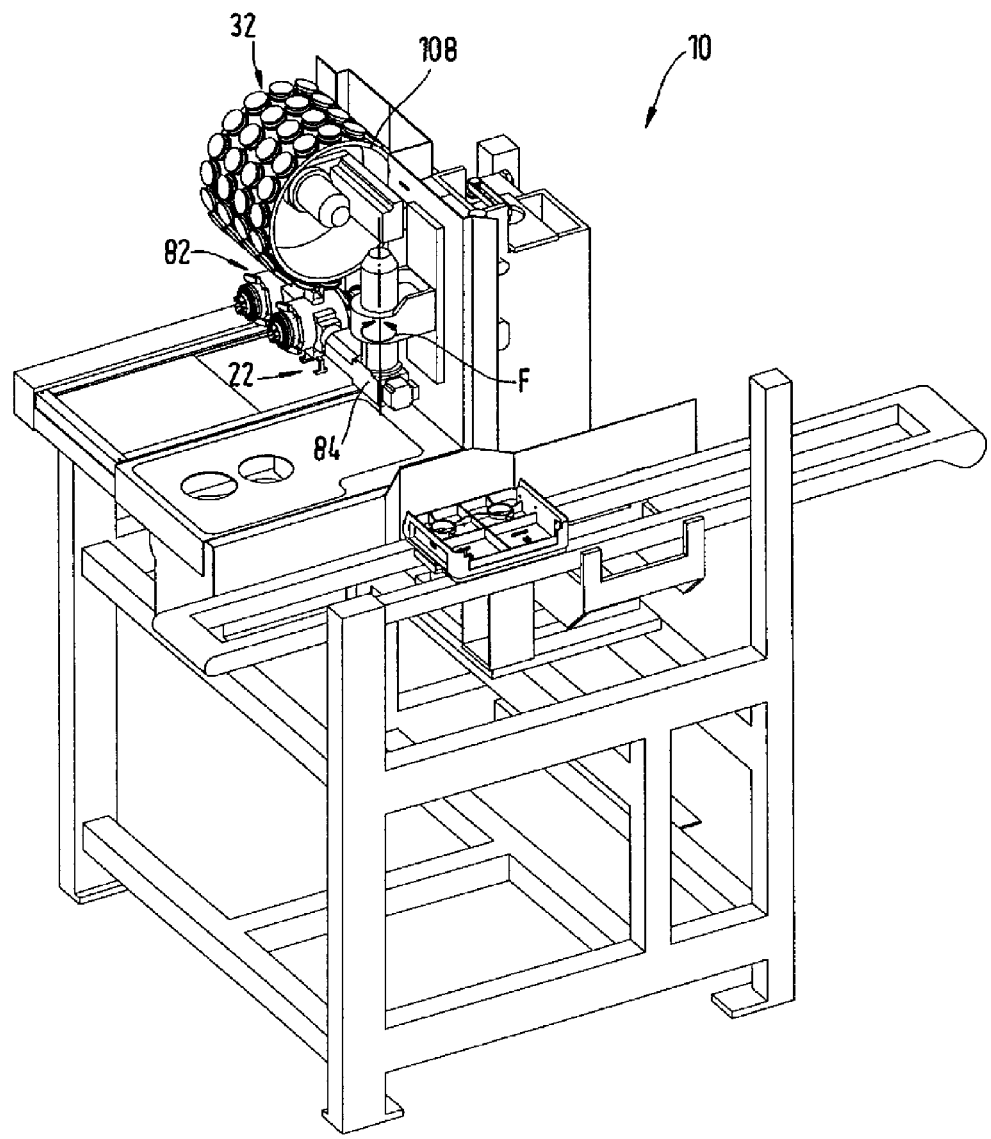

FIG. 18: The loading arm 84 together with loading head 82 was pivoted through 180° about the vertical pivot axis F of the loading system 22, so that the loading head 82 is disposed below the tool receiving drum 108 of the tool magazine 32. The loading system 22 now stands, as before, in its middle vertical position.

Figure 19:
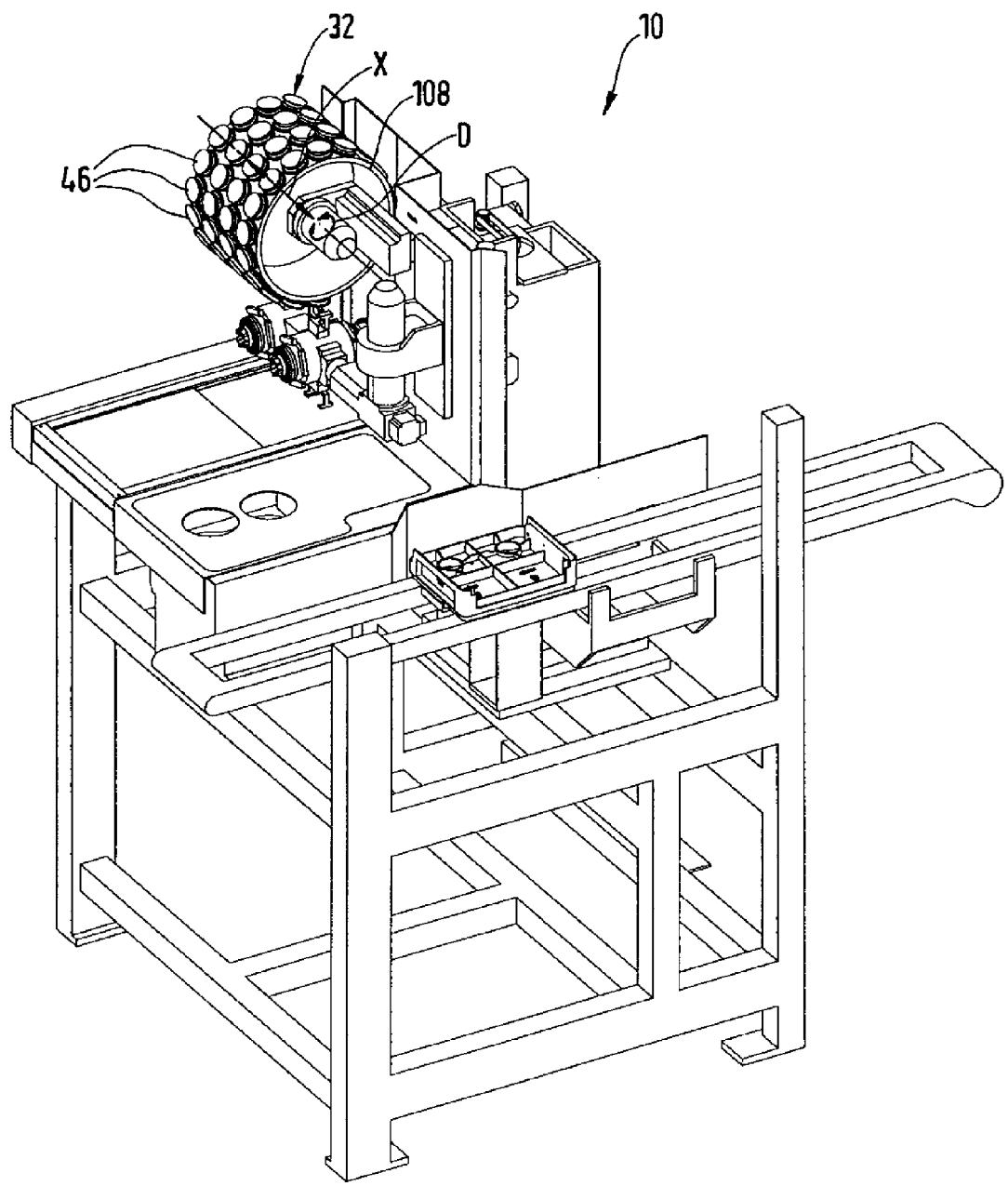

FIG. 19: The tool receiving drum 108 of the tool magazine 32 has rotated in defined manner about the horizontal tool magazine rotational axis D and was—in this case—horizontally displaced (linear movement X of the tool magazine 32) so as to ready a predetermined pair of polishing tools 46 (at the bottom or at the deepest point of the tool receiving drum 108).

Figure 20:
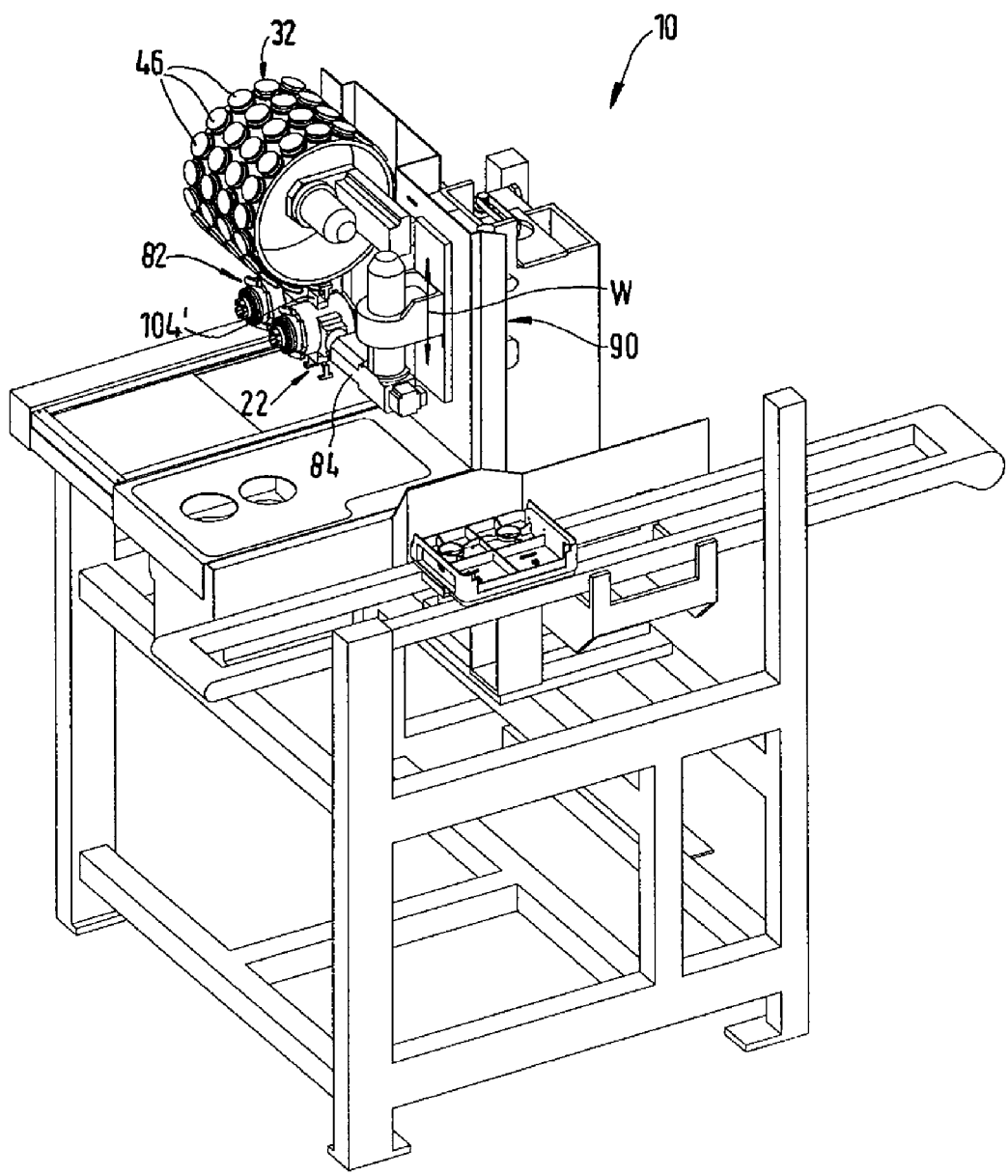

FIG. 20: The loading arm 84 together with loading head 82 was lifted by the actuator arrangement 90 out of its middle vertical position (vertical linear movement W at the loading system 22) in order to grip, by the parallel grippers 104, 104'—which here are at the top—at the loading head 82, two polishing tools 46 readied by the tool magazine 32.

Figure 21:
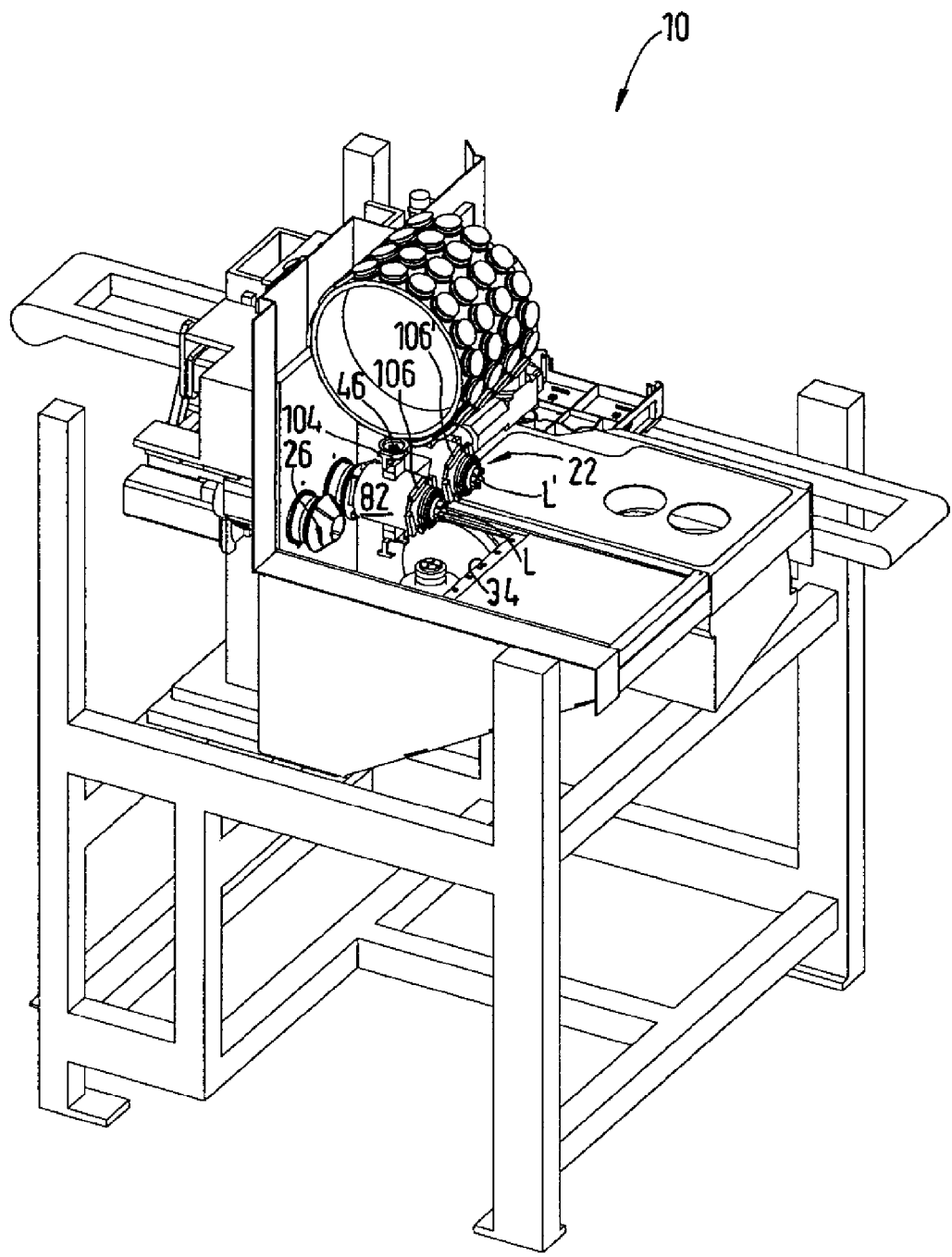

FIG. 21: The slide 34 covering the working space 26 was opened so as to allow access to the working space 26. The loading head 82 of the loading system 22 now carries two blocked lenses L, L' in one of the four-finger gripper pairs 106, 106' and two associated polishing tools 46 in one of the parallel gripper pairs 104, 104'.

Figure 22:
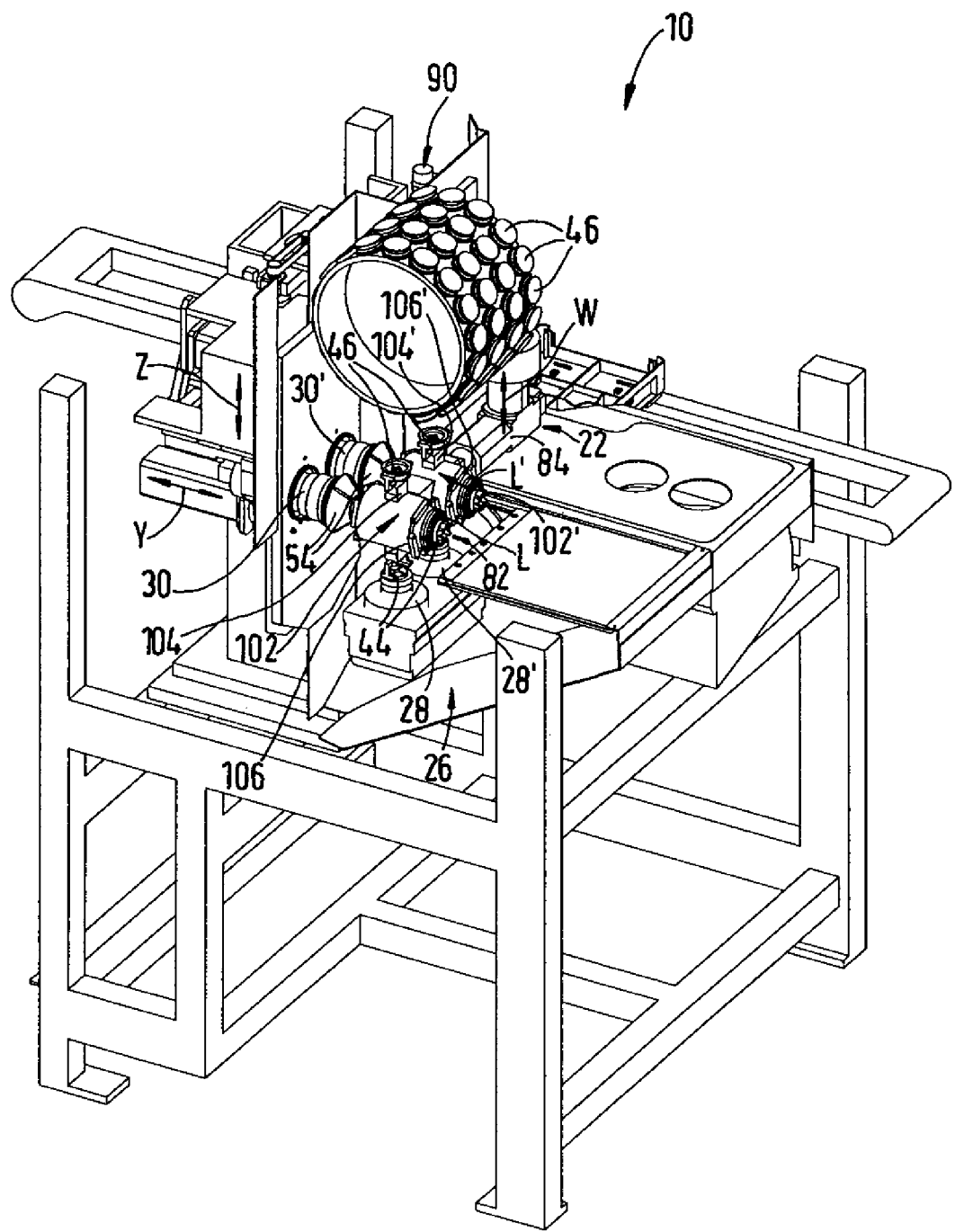

FIG. 22: The working space 26 is illustrated in this figure in broken-away form. The loading arm 84 together with loading head 82 was moved downwardly by the actuator arrangement 90 (vertical linear movement W at the loading system 22), the workpiece spindles 30, 30' were moved into the working space 26 (horizontal linear axis Y) and it was checked whether polishing tools are already located at the tool interfaces 44 of the tool spindles 28, 28' or blocked lenses are already located in the chucks 54 of the workpiece spindles 30, 30'.

Figure 23:
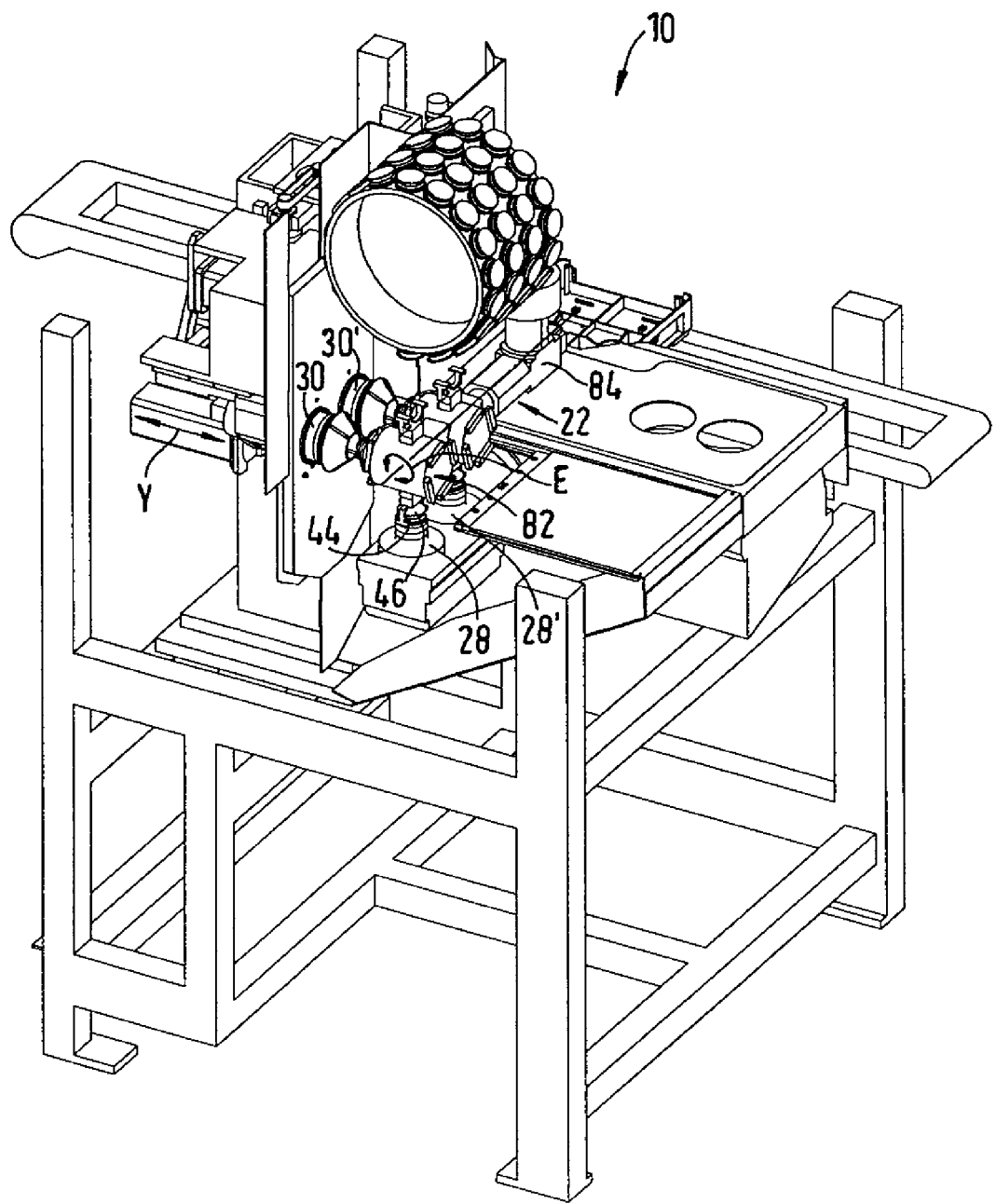

FIG. 23: The loading head 82 was pivoted with respect to the loading arm 84 through 180° (horizontal pivot axis E of the loading system 22) in order to place the polishing tools 46, which are gripped at the loading head 82, opposite the tool spindles 28, 28' and to transfer the polishing tools 46 to the tool interfaces 44. The workpiece spindles 30, 30' have moved back again (horizontal linear axis Y of the workpiece spindles 30, 30').

Figure 24:
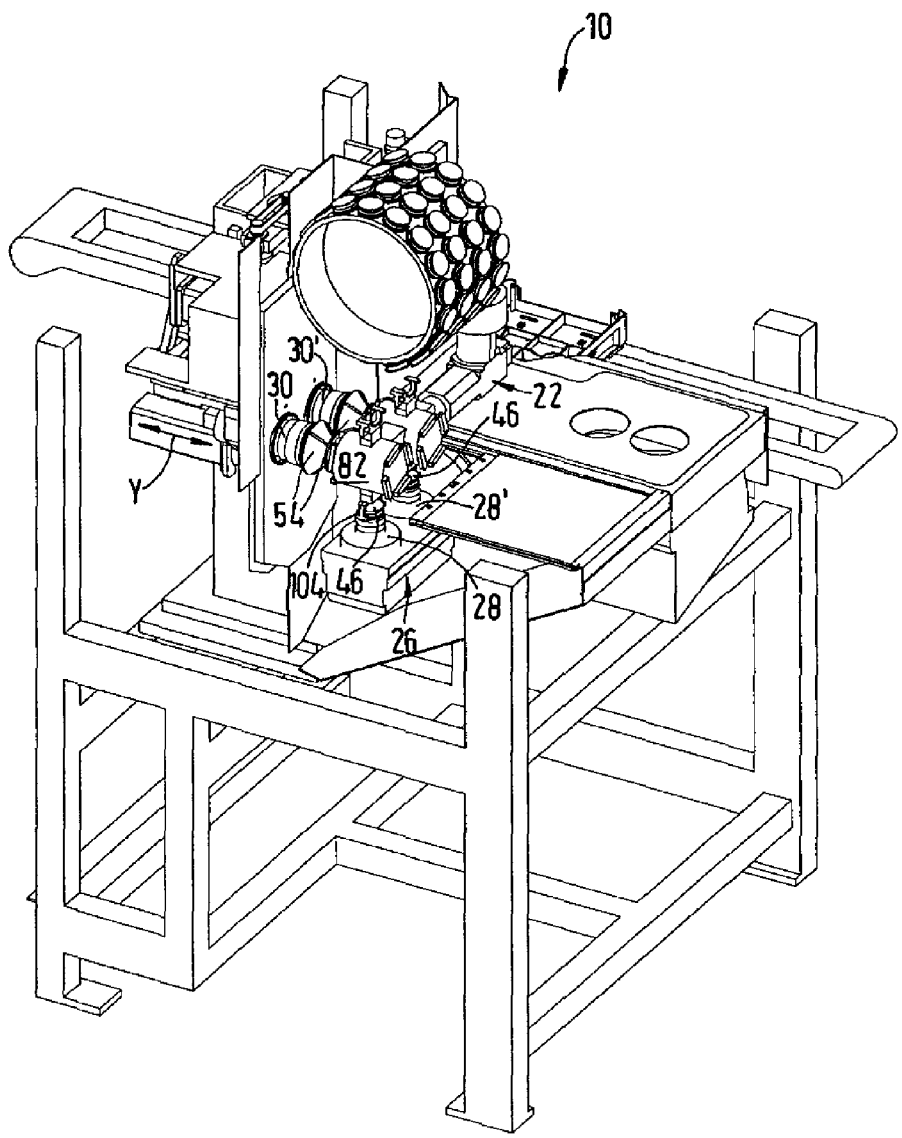

FIG. 24: The workpiece spindles 30, 30', with opened chucks 54, are moved forward into the working space 26 (horizontal linear axis Y) and the chucks 54 grip the blocked lenses L, L' at the blocking members, whereupon the corresponding four-finger grippers 106, 106' at the loading head 82 of the loading system 22 release the lenses L, L'. In addition, the tool interfaces 44 at the tool spindles 28, 28' were raised by pneumatic loading of the substructure so as to detent the polishing tools 46 at the tool interfaces 44, whereupon the parallel grippers 104, 104' release the polishing tools 46.

Figure 25:
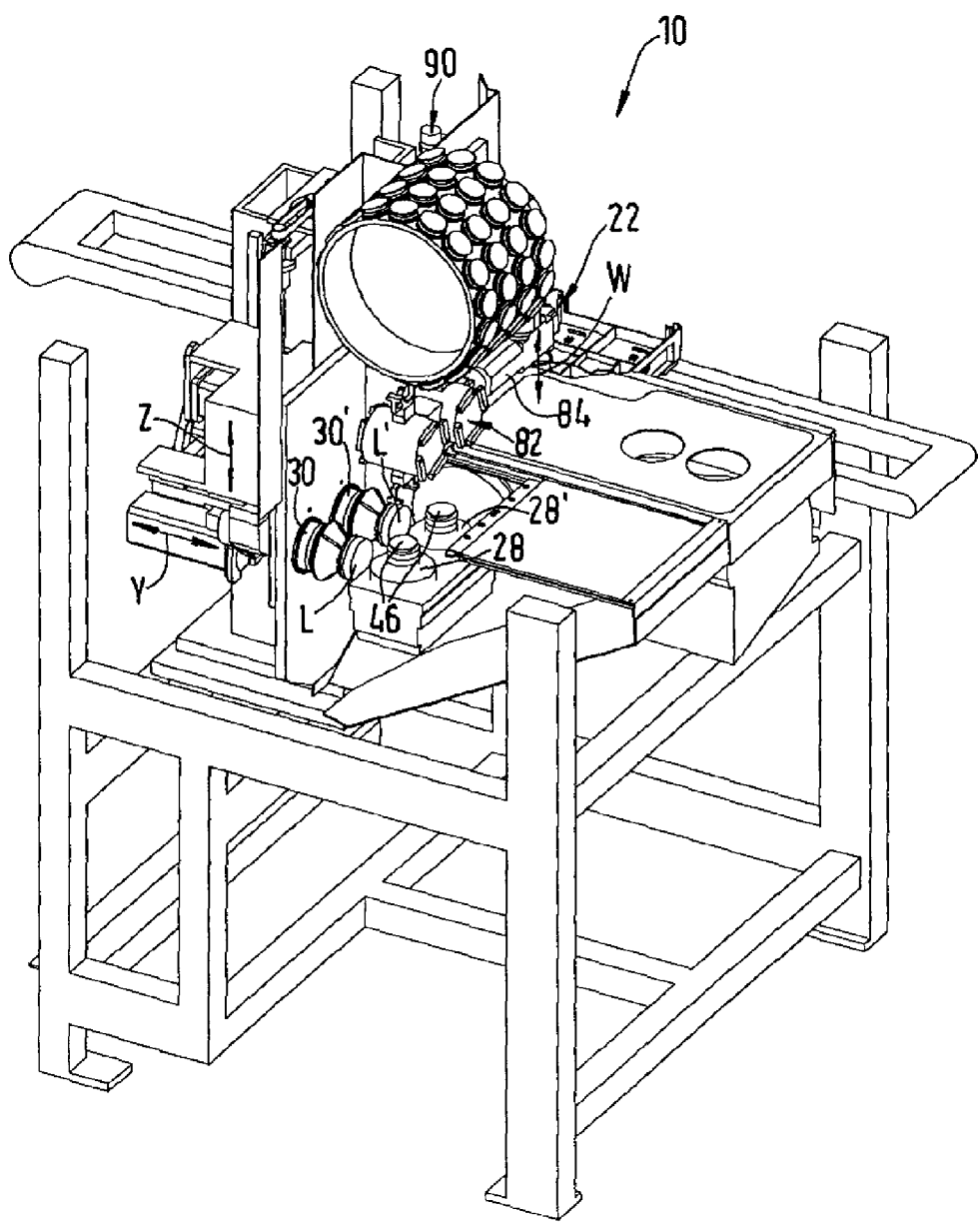

FIG. 25: The loading arm 84 together with the empty loading head 82 was raised by the actuator arrangement 90 into the middle vertical position (vertical linear movement W at the loading system 22). The tool spindles 28, 28' are now equipped with polishing tools 46, while the workpiece spindles 30, 30' are equipped with lenses L, L'. The workpiece spindles 30, 30' were moved into the illustrated rearward (Y), lower (Z) basic sitting by way of the movement axes of the actual polishing process (horizontal linear axis Y, vertical linear axis Z).

Figure 26:
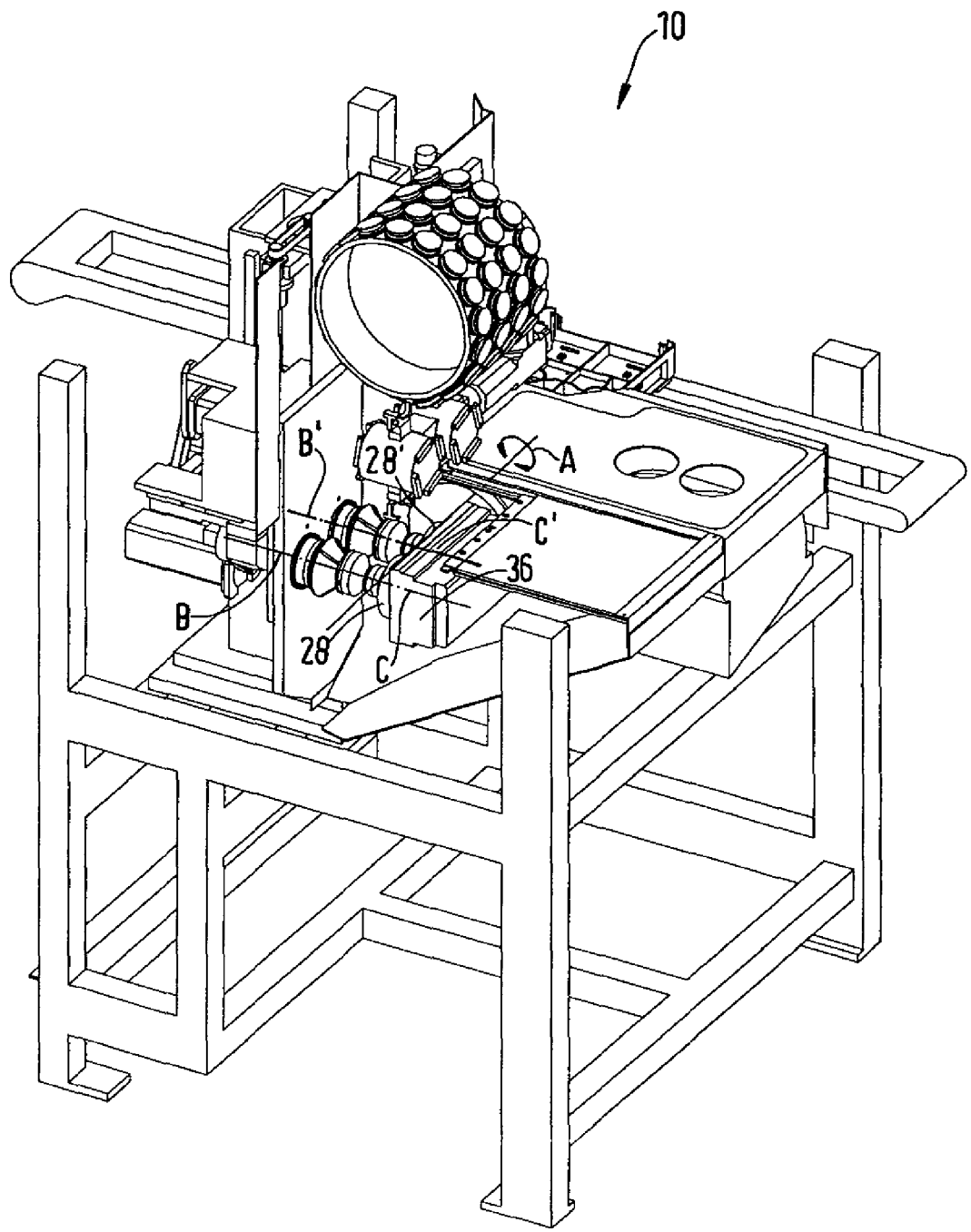

FIG. 26: The tool spindles 28, 28' were pivoted by the pivot yoke 36 into their working setting with a predetermined angular position of the tool rotational axes C, C' with respect to the workpiece rotational axes B, B' (pivot axis A of the tool spindles 28, 28').

Figure 27:
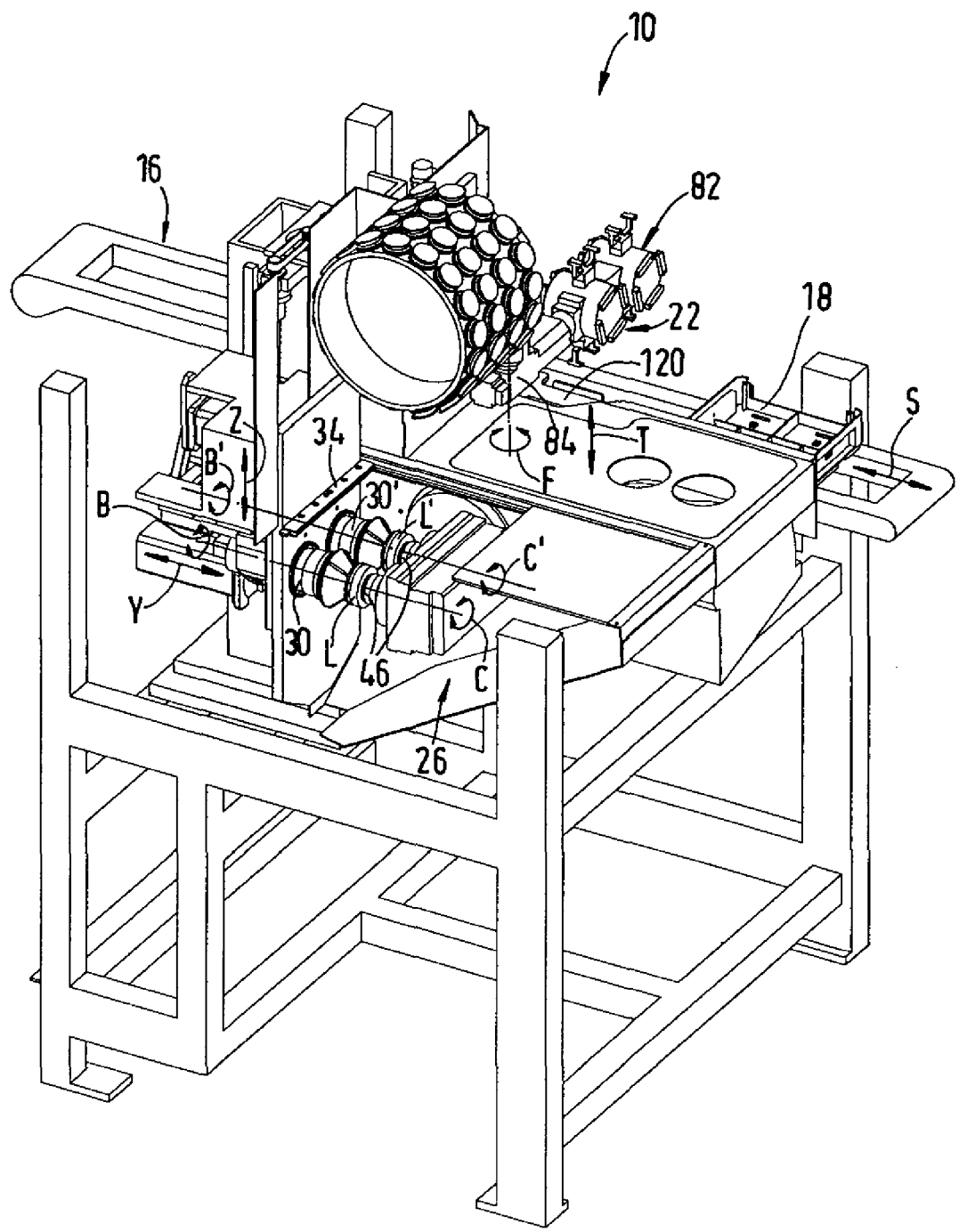

FIG. 27: The slide 34 (not fully illustrated here) is moved forward and closes the working space 26. The workpiece spindles 30, 30' were adjusted (horizontal linear axis Y of the workpiece spindles 30, 30'), whereupon the actual polishing process with rotationally driven lenses L, L' (workpiece rotational axes B, B') and rotationally driven polishing tools 46 (tool rotational axes C, C') as well as a linear working movement (vertical linear axis Z of the workpiece spindles 30, 30') as already briefly described above, thus a 'tangential process', begins. In addition, the loading arm 84 together with loading head 82 was pivoted back through 180° above the transport system 16 (vertical pivot axis F of the loading system 22). In the transport system 16 the plate 120 was moved down to its lower setting by the stroke/pivot device 118 (vertical linear movement T at the transport system 16) so as to free the path for the empty prescription box 18, which was thereupon moved forwardly to the right into a waiting position in FIG. 27 (horizontal linear movement S at the transport system 16).

Figure 28:
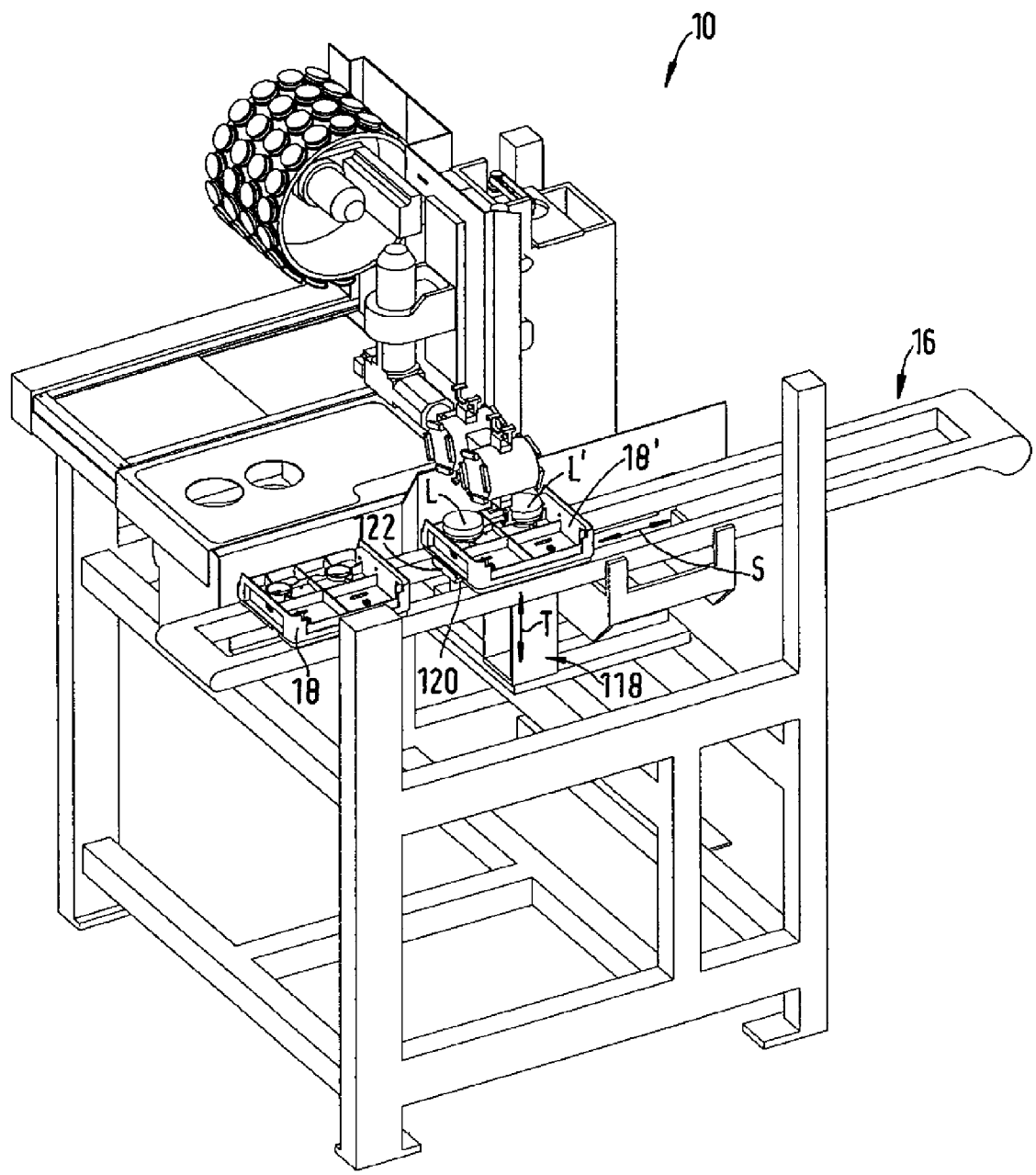

FIG. 28: The empty prescription box 18 stands on the transport system 16 in the waiting position (on the left). The plate 120 with abutment 122 was moved up by the stroke/pivot device 118 (vertical linear movement T at the transport system 16) in order to stop a further prescription box 18', which is equipped with new blocked lenses L, L', in its horizontal movement on the transport system 16 (linear movement S) in the horizontal loading position of the prescription box 18'.

Figure 29:
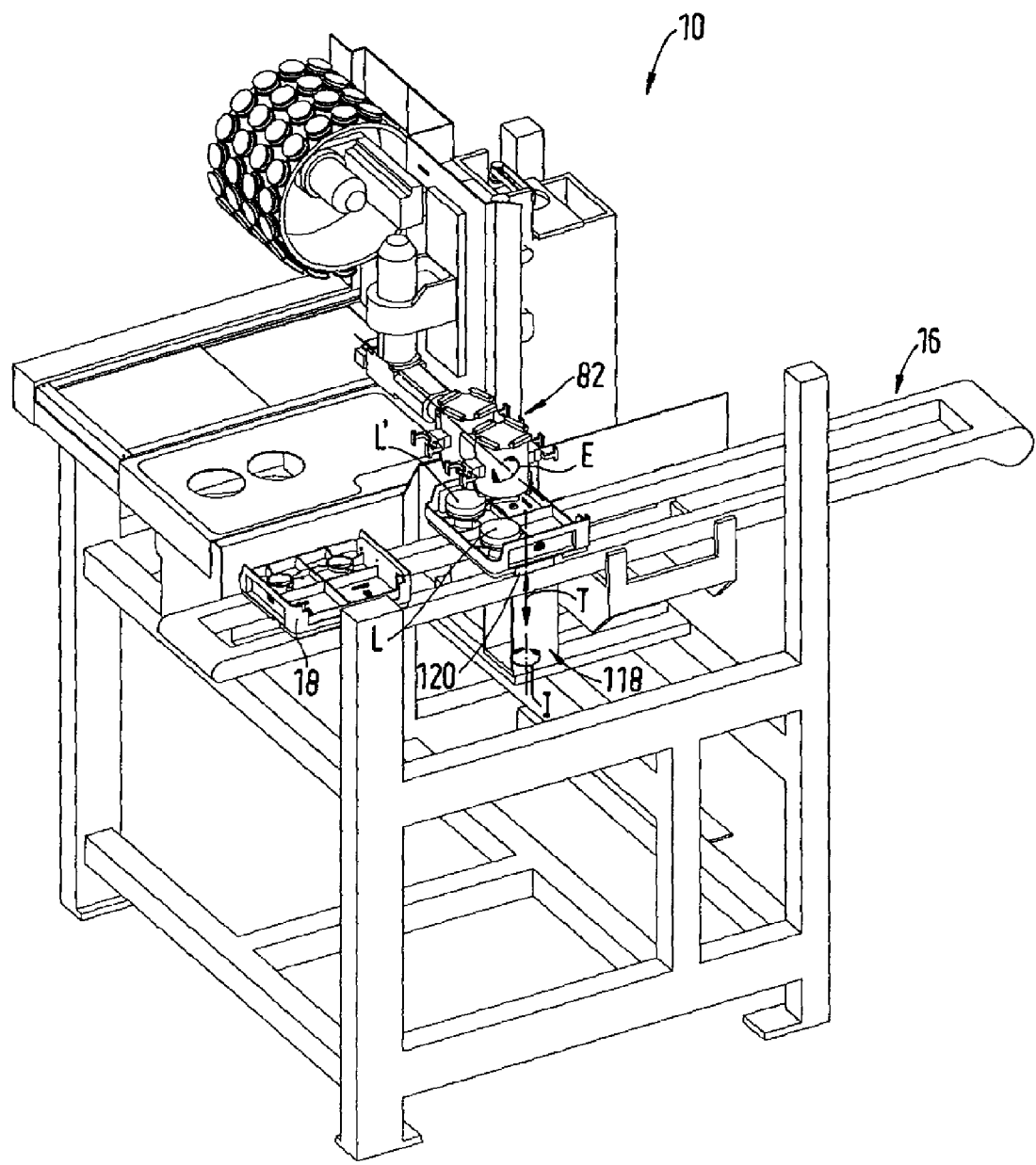

FIG. 29: As already described with reference to FIG. 15 for the first prescription box 18, the stroke/pivot device 118 has raised the plate 120 into its upper height setting (vertical linear movement T at the transport system 16) and rotated it through 90° in counter-clockwise sense (pivot movement I at the transport system 16) so that the new lenses L, L' in the further prescription box 18 stand transversely to the transport system 16. Moreover, the loading head 82 was pivoted through 90° about the horizontal pivot axis E of the loading system 22 so as to place a pair of the four-finger grippers 106, 106' at the loading head 82 (at the bottom in FIG. 29) opposite the new lenses L, L'.

Figure 30:
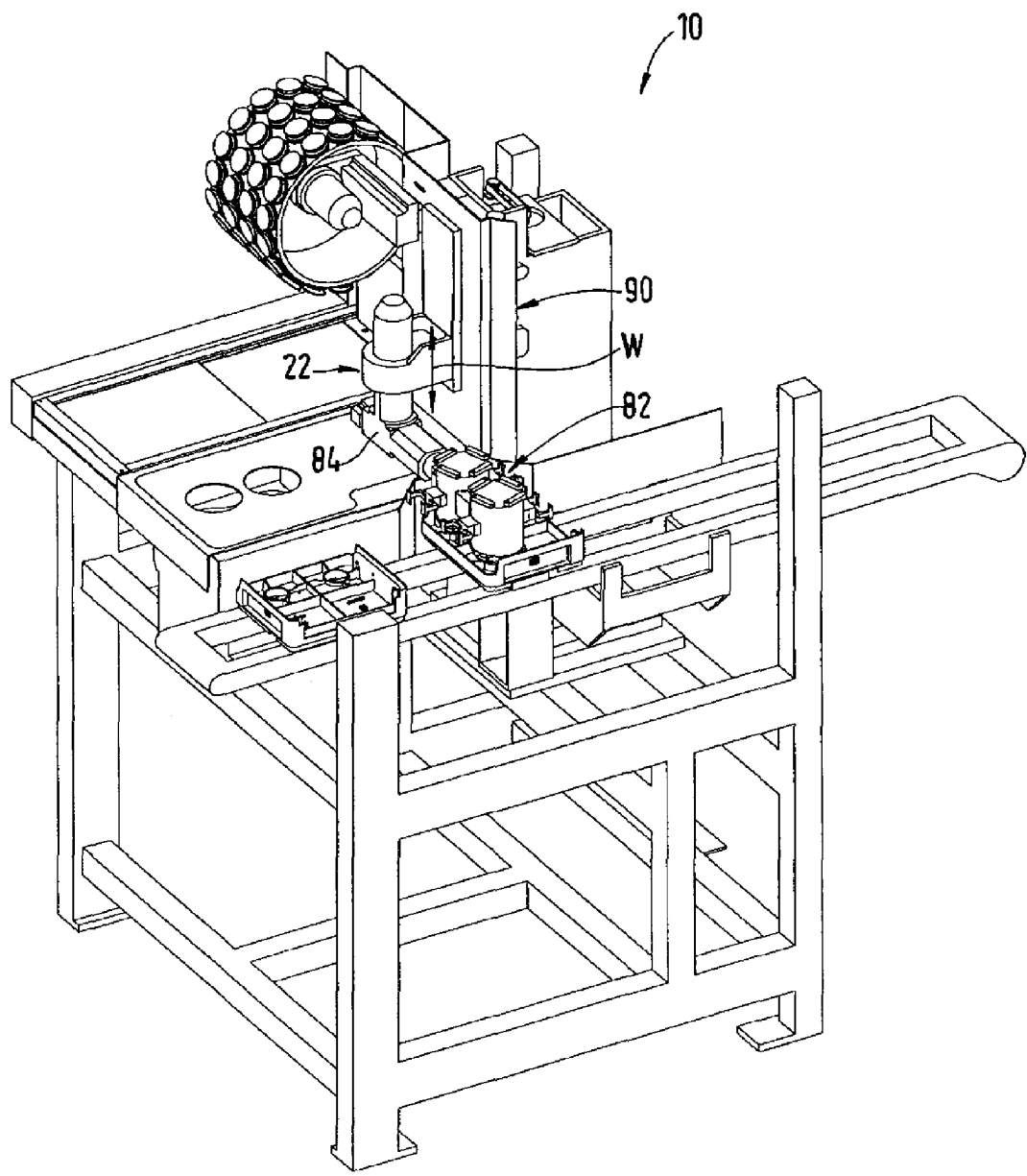

FIG. 30: As already described with reference to FIG. 16 for the old lenses L, L', the loading arm 84 together with loading head 82 was moved by the actuator arrangement 90 into its lower vertical position (vertical linear movement W at the loading system 22). The lower four-finger grippers 106, 106' at the loading head 82 grip the new lenses L, L' (not specifically able to be seen in FIG. 30).

Figure 31:
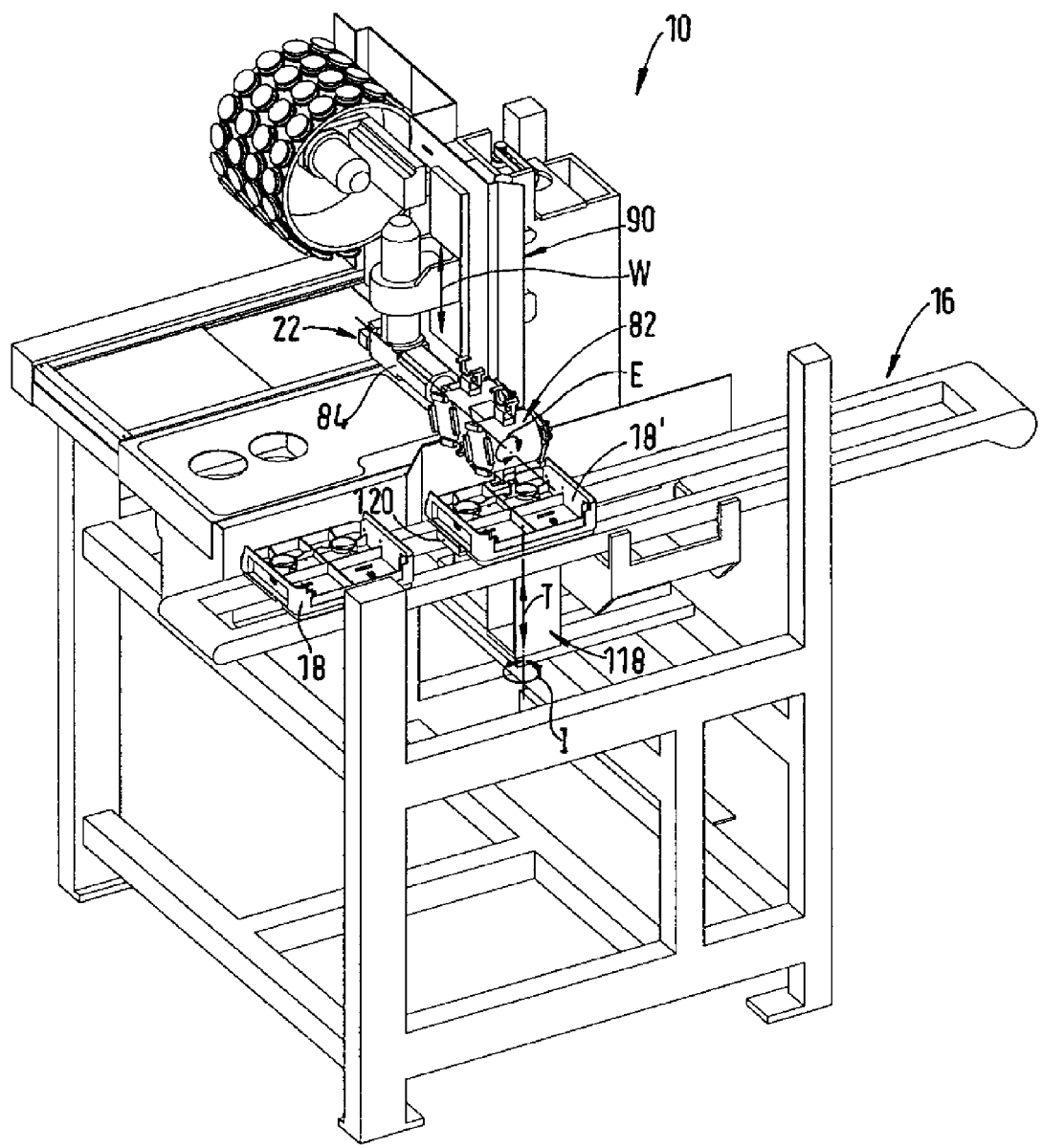

FIG. 31: Steps analogous to FIG. 17, only for the new lenses L, L' and the further prescription box 18'. The actual polishing process for the old lenses L, L' runs as before.

Figure 32:
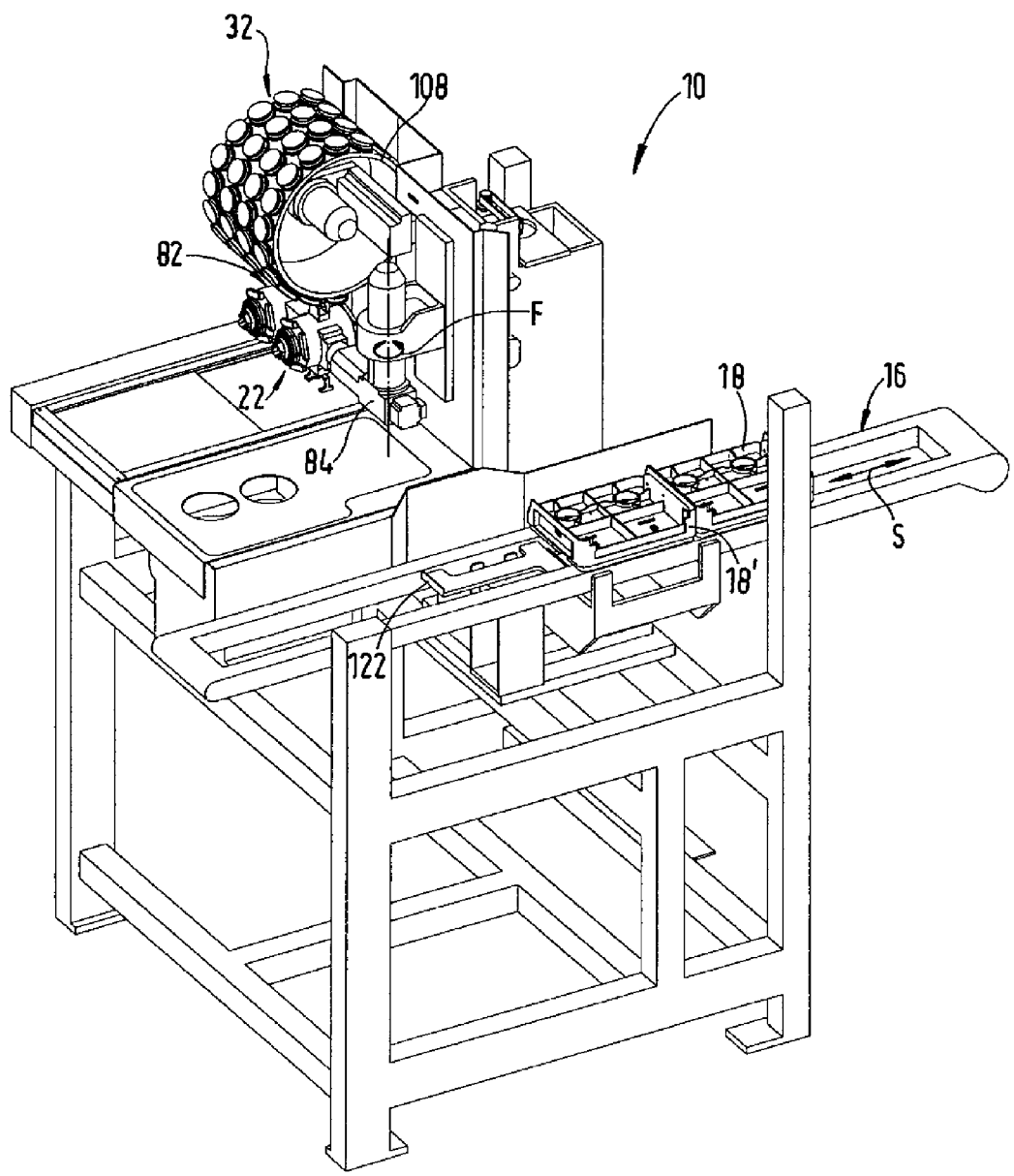

FIG. 32: Steps analogous to FIG. 18, only for the new lenses L, L'. Not only the first prescription box 18, but also the further prescription box 18' were moved back to the right in front of the abutment 122 in FIG. 32 (horizontal linear movement S at the transport system 16).

Figure 33:
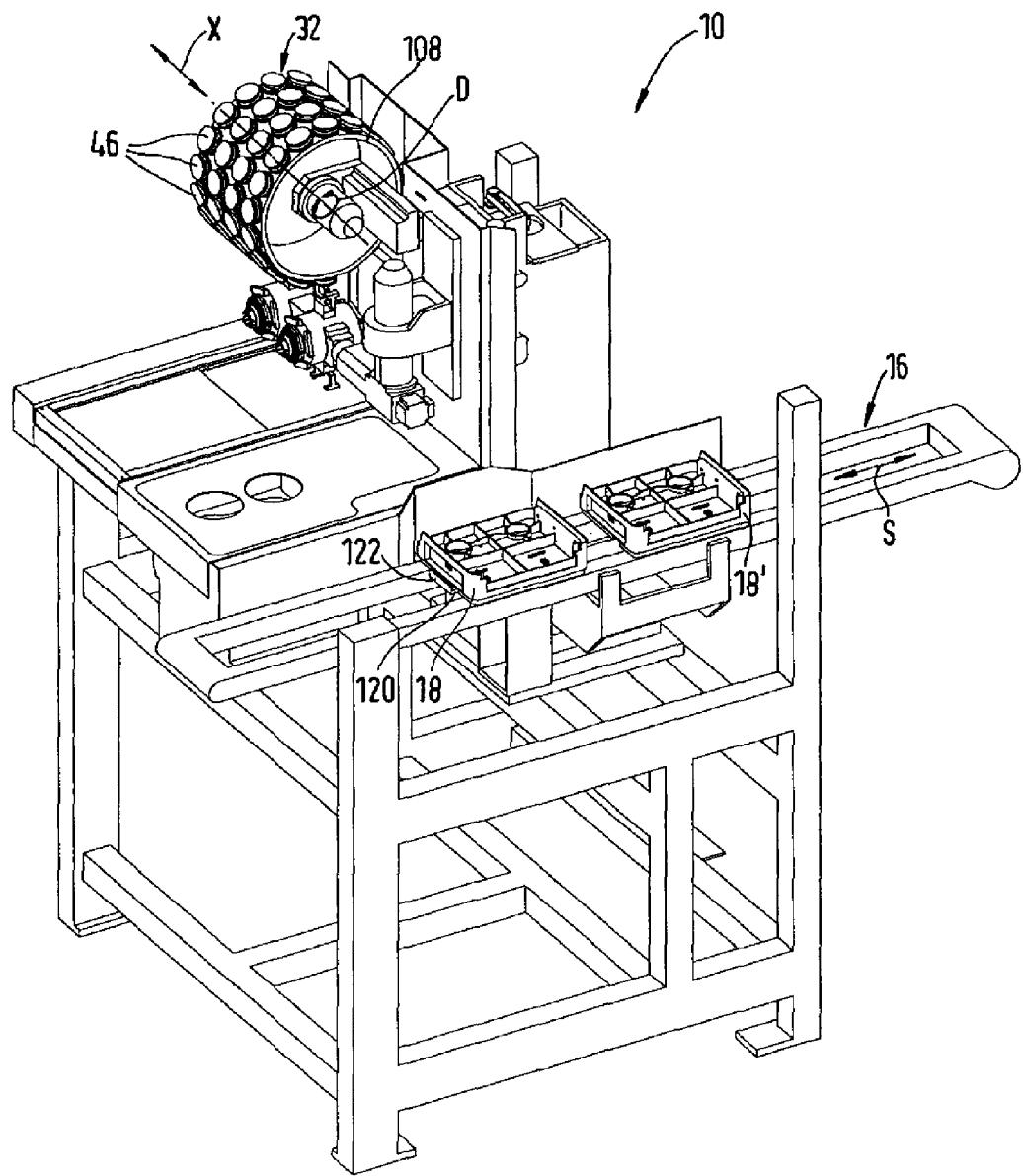

FIG. 33: Steps analogous to FIG. 19, this time only for a new set of polishing tools 46. The prescription boxes 18, 18' were again moved forwardly to the left in FIG. 33 (horizontal linear movement S at the transport system 16) so that the first prescription box 18 in the horizontal loading position abuts the abutment 122 of the plate 120.

Figure 34:
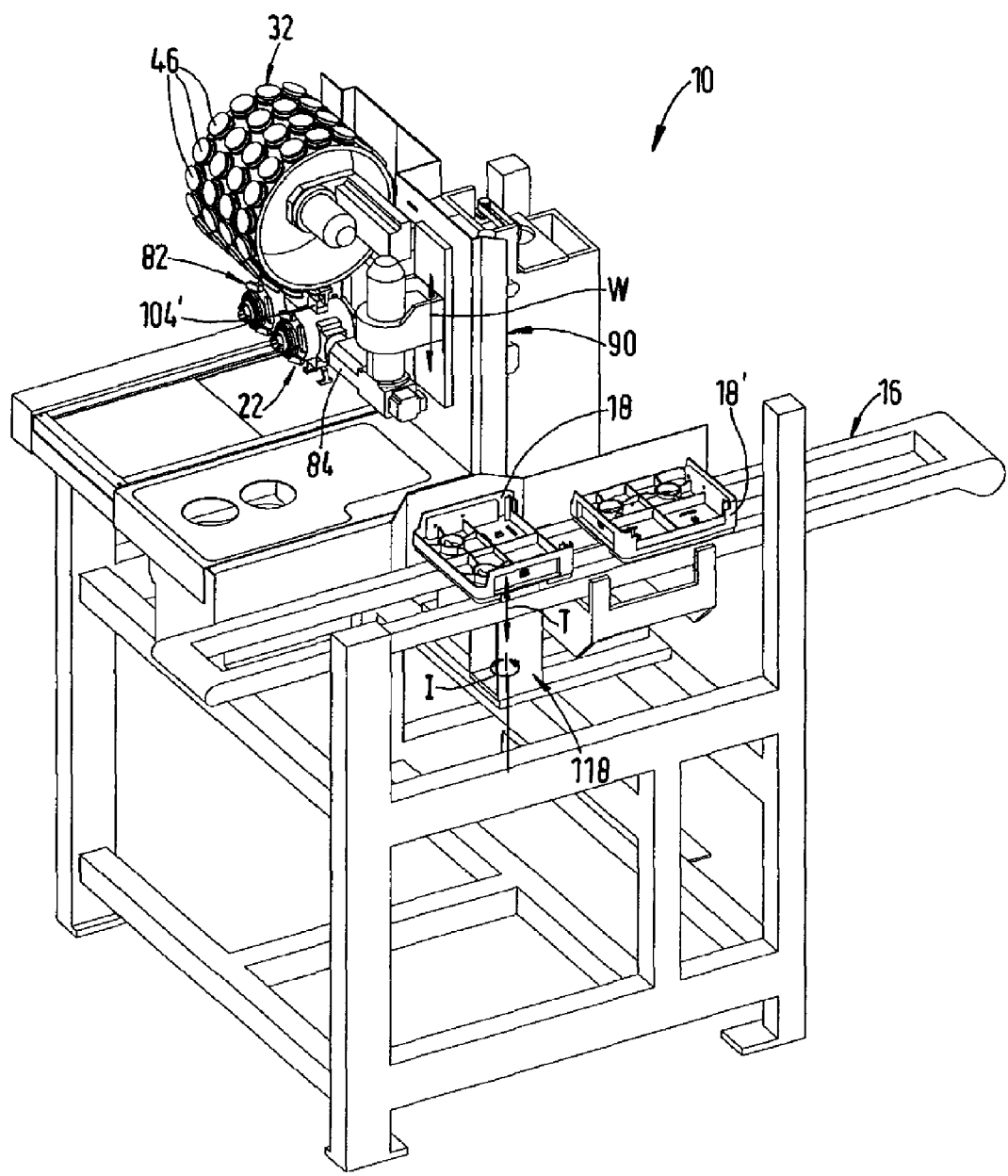

FIG. 34: Steps analogous to FIG. 20, only with a new set of polishing tools 46. In addition, the first prescription box 18 was raised by the stroke/pivot device 118 (vertical linear movement T at the transport system 16) and rotated through 90° (pivot movement I at the transport system 16).

Figure 35:
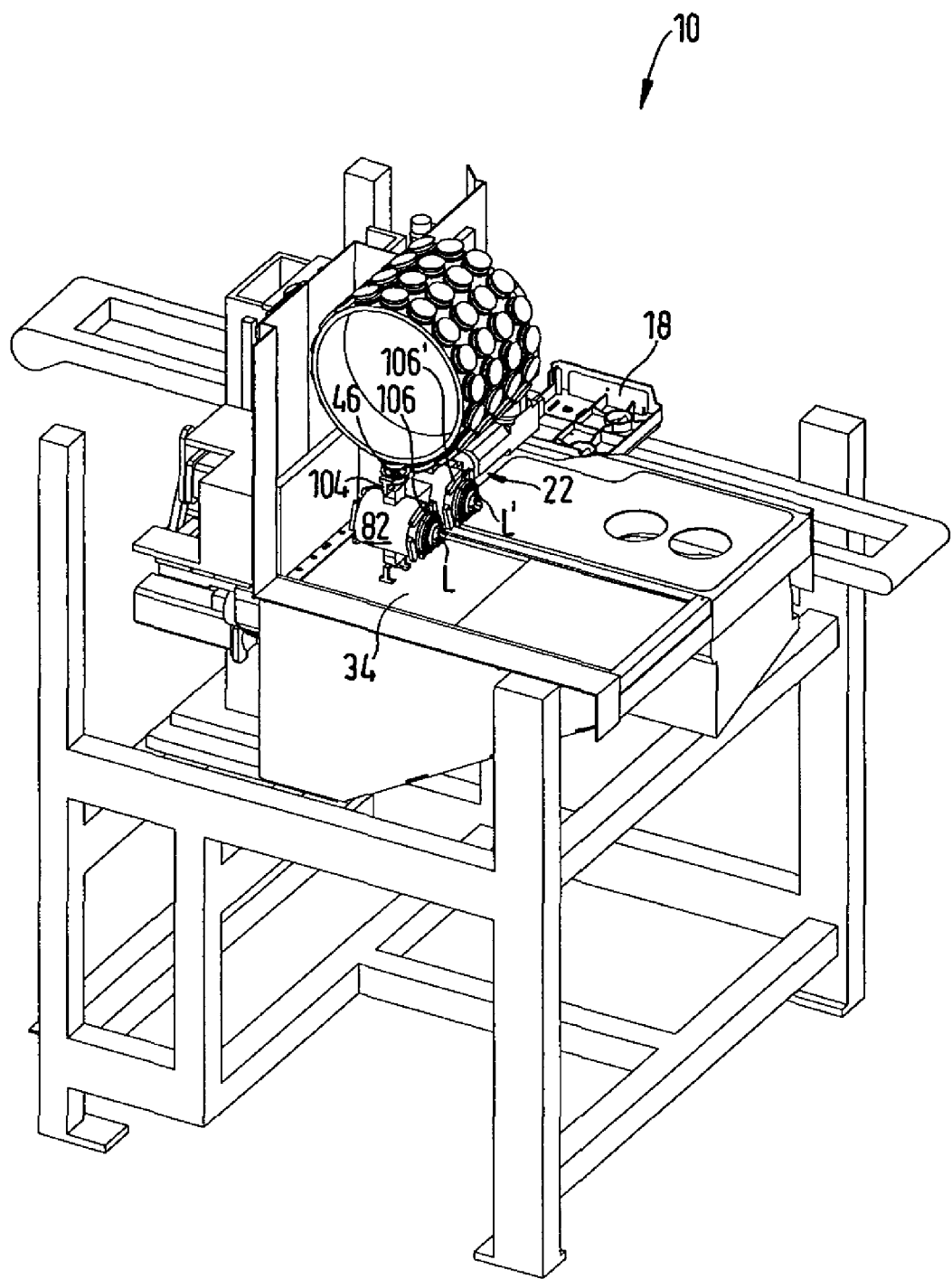

FIG. 35: Setting of the loading system 22 analogously to FIG. 21. The actual polishing process for the old lenses L, L' is as before; accordingly, the slide 34 closes the working space 26. The new lenses L, L' and the new polishing tools 46 are mounted on the loading head 82.

Figure 36:
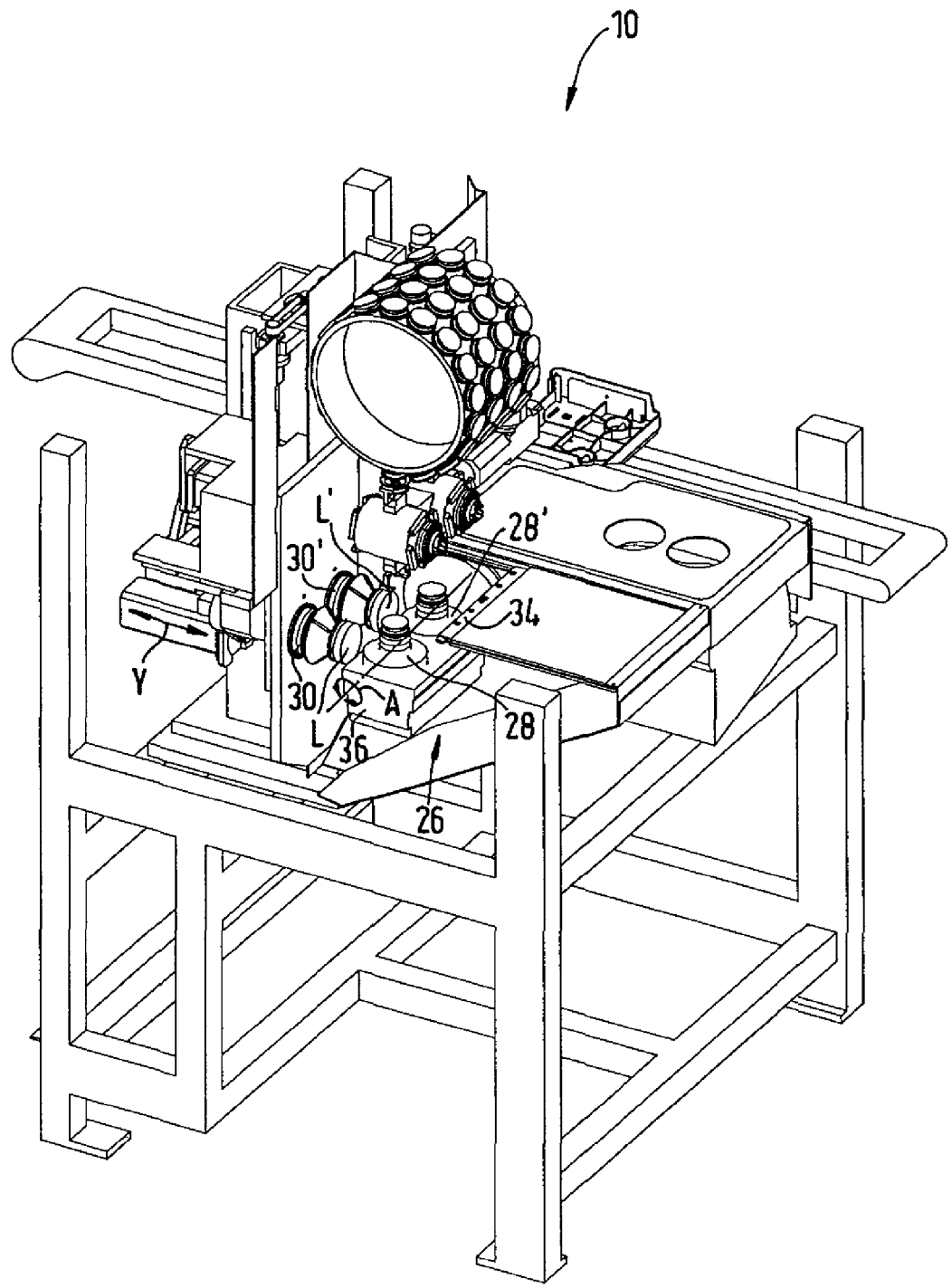

FIG. 36: The actual polishing process for the old lenses L, L' is concluded; the slide 34 frees the working space 26. The tool spindles 28, 28' were pivoted back into their loading position (horizontal pivot axis A of the tool spindles 28, 28') by the pivot yoke 36. The workpiece spindles 30, 30' were withdrawn from the working space 26 (horizontal linear axis Y of the workpiece spindles 30, 30').

Figure 37:
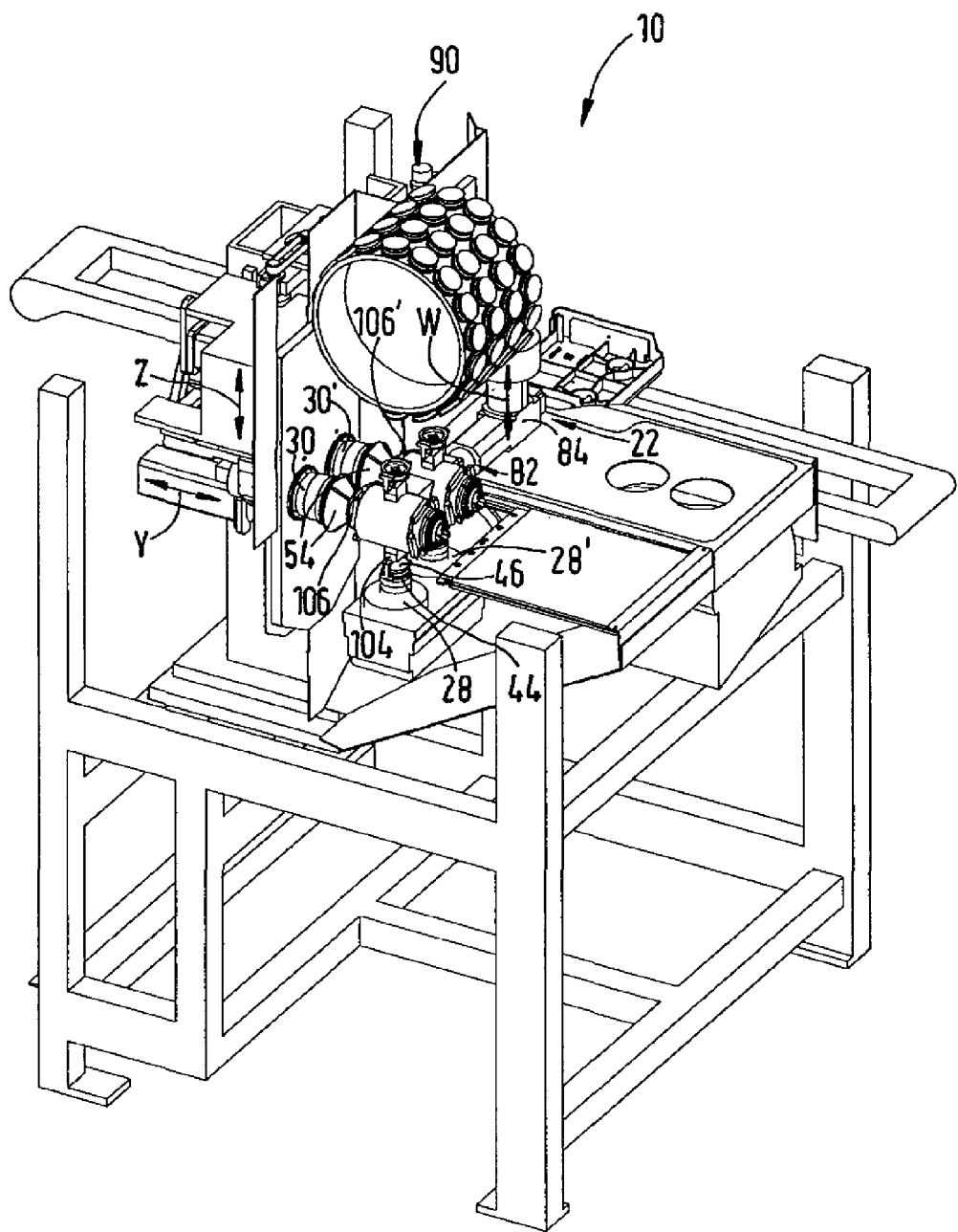

FIG. 37: The loading arm 84 together with loading head 82 was moved downwardly by the actuator arrangement 90 (vertical linear movement W at the loading system 22). The workpiece spindles 30, 30' were moved into their loading or unloading position (vertical linear axis Z and horizontal linear axis Y). The polished, old lenses L, L' are transferred from the chucks 54 at the free four-finger gripper pair 106, 106', which is at the left in FIG. 37, to the loading head 82, while the used polishing tools 46 are, with pneumatic loading of the substructure, transferred from the tool interfaces 44 of the tool spindles 28, 28' to the free parallel gripper pair 104, 104', which is at the bottom in FIG. 27, to the loading head 82.

Figure 38:
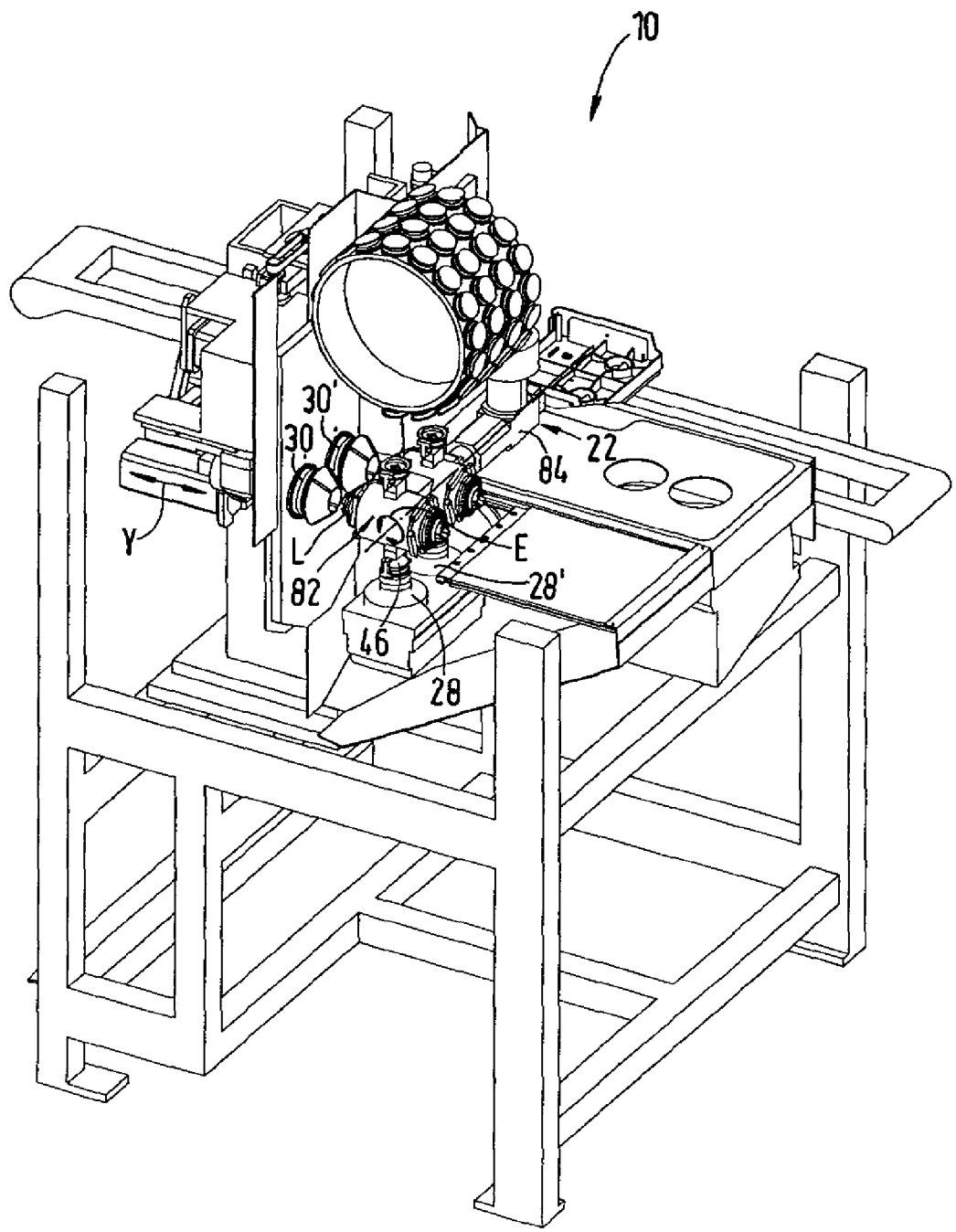

FIG. 38: The workpiece spindles 30, 30' were moved back (horizontal linear axis Y). The loading head 82 was rotated with respect to the loading arm 84 through 180° (horizontal pivot axis E of the loading system 22) so as to place the new lenses L, L', which are held at the loading head 82, opposite the workpiece spindles 30, 30' and the new polishing tools 46, which are similarly held at the loading head 82, opposite the tool spindles 28, 28'. The new lenses L, L' can now be transferred to the workpiece spindles 30, 30' and the new polishing tools 46 to the tool spindles 28, 28' analogously to the description with respect to FIG. 24.

Figure 39:
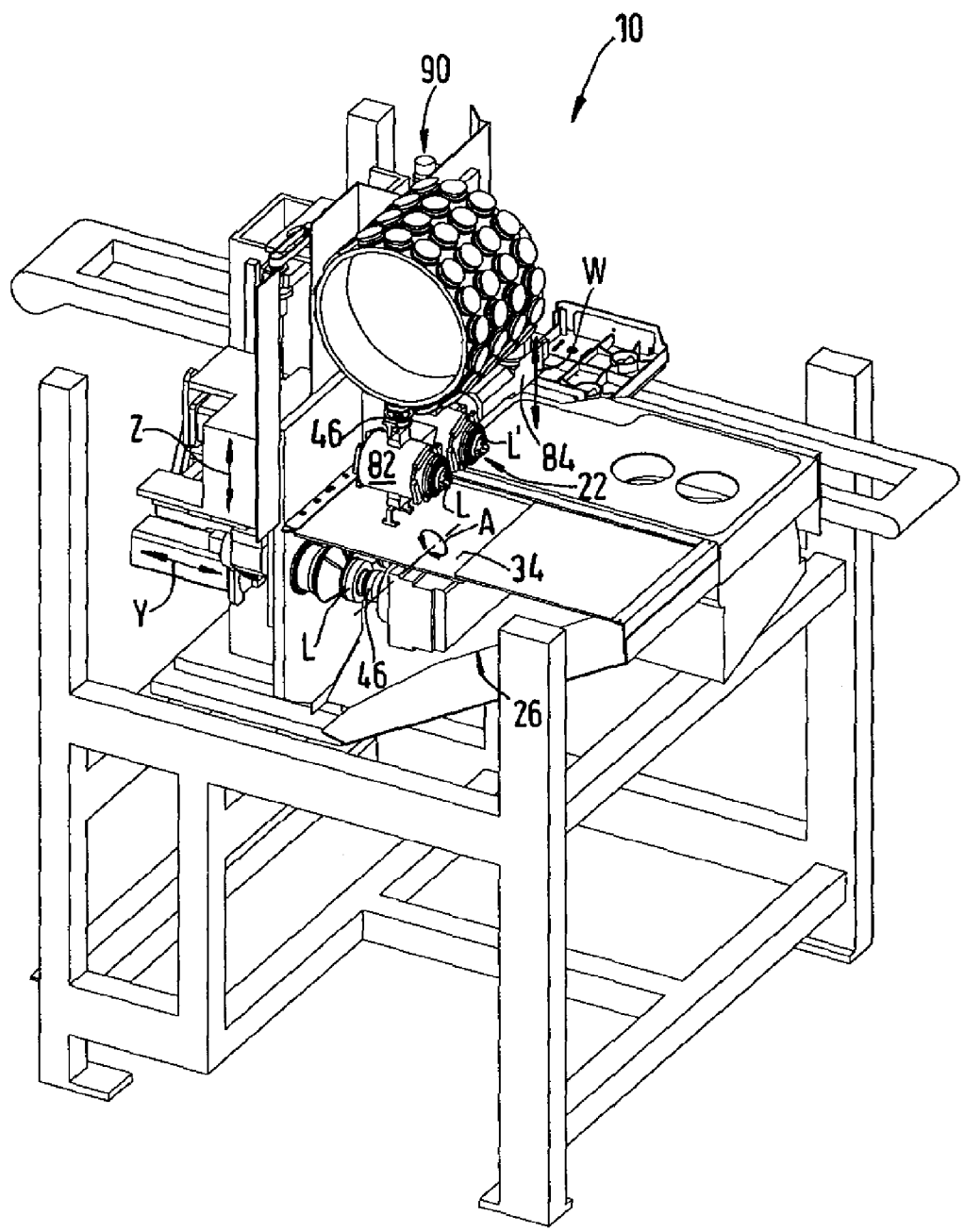

FIG. 39: The slide 34 closes the working space 26, in which the actual polishing process with the new polishing tools 46 begins for the new lenses L, L' (cf. the description with respect to FIGS. 25 to 27; horizontal linear axis Y, vertical linear axis Z, horizontal pivot axis A). The loading arm 84 together with loading head 82, which carries not only the machined, old lenses L, L' (at the right in FIG. 39), but also the used, old polishing tools 46 (at the top in FIG. 39) was moved upwardly by the actuator arrangement 90 into the middle vertical position of the loading system 22 (vertical linear movement W at the loading system 22).

Figure 40:
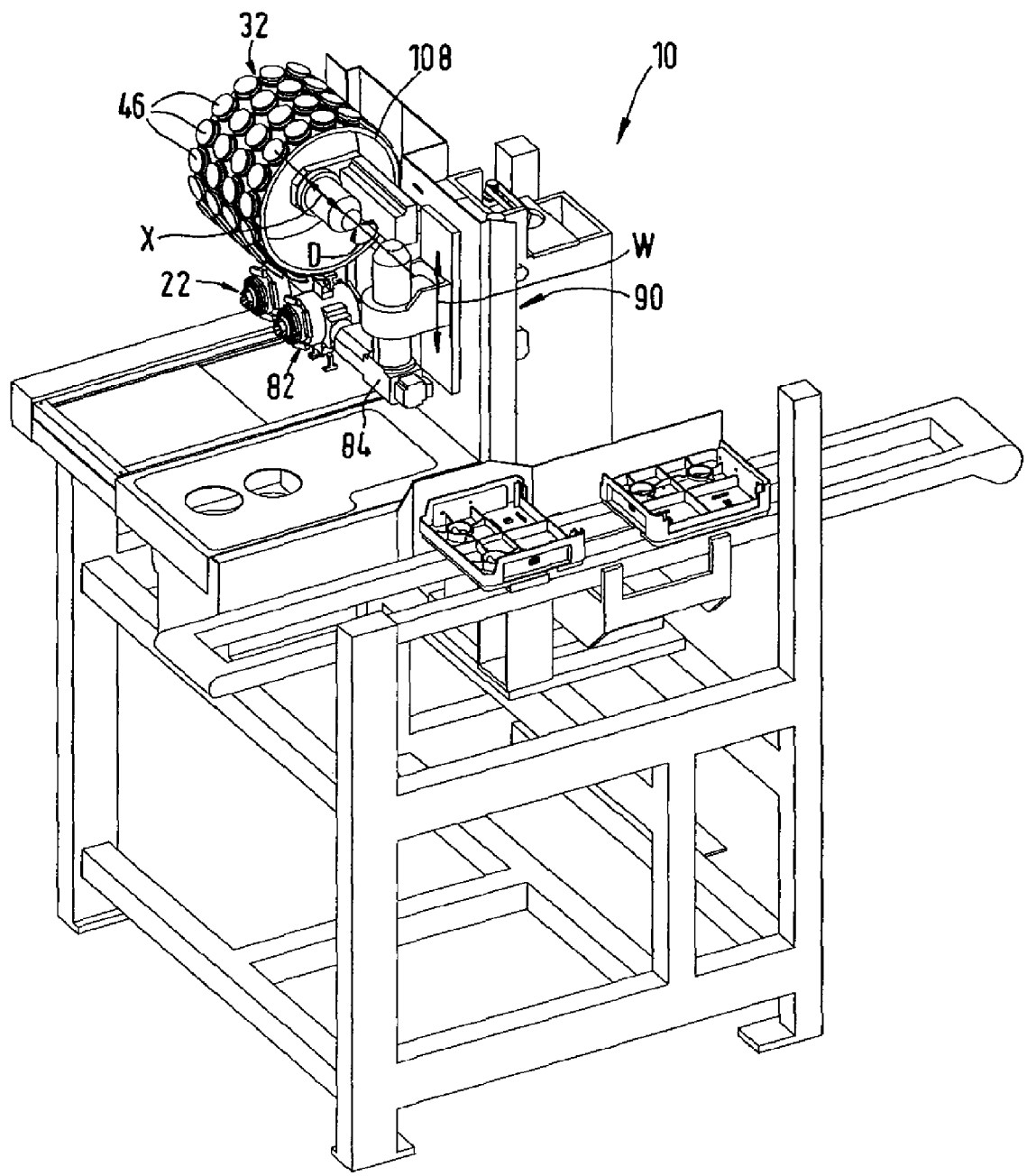

FIG. 40: The tool receiving drum 108 of the tool magazine 32 was suitably rotated and/or axially displaced (horizontal tool magazine rotational axis D, horizontal linear movement X of the tool magazine 32) so as to position two free tool receiving projections on the tool receiving drum 108 above the loading head 82. The loading arm 84 together with loading head 82 was then raised by the actuator arrangement 90 into the upper vertical position (vertical linear movement W at the loading system 22) in order to deposit the used, old polishing tools 46 in the tool magazine 32.

Figure 41:
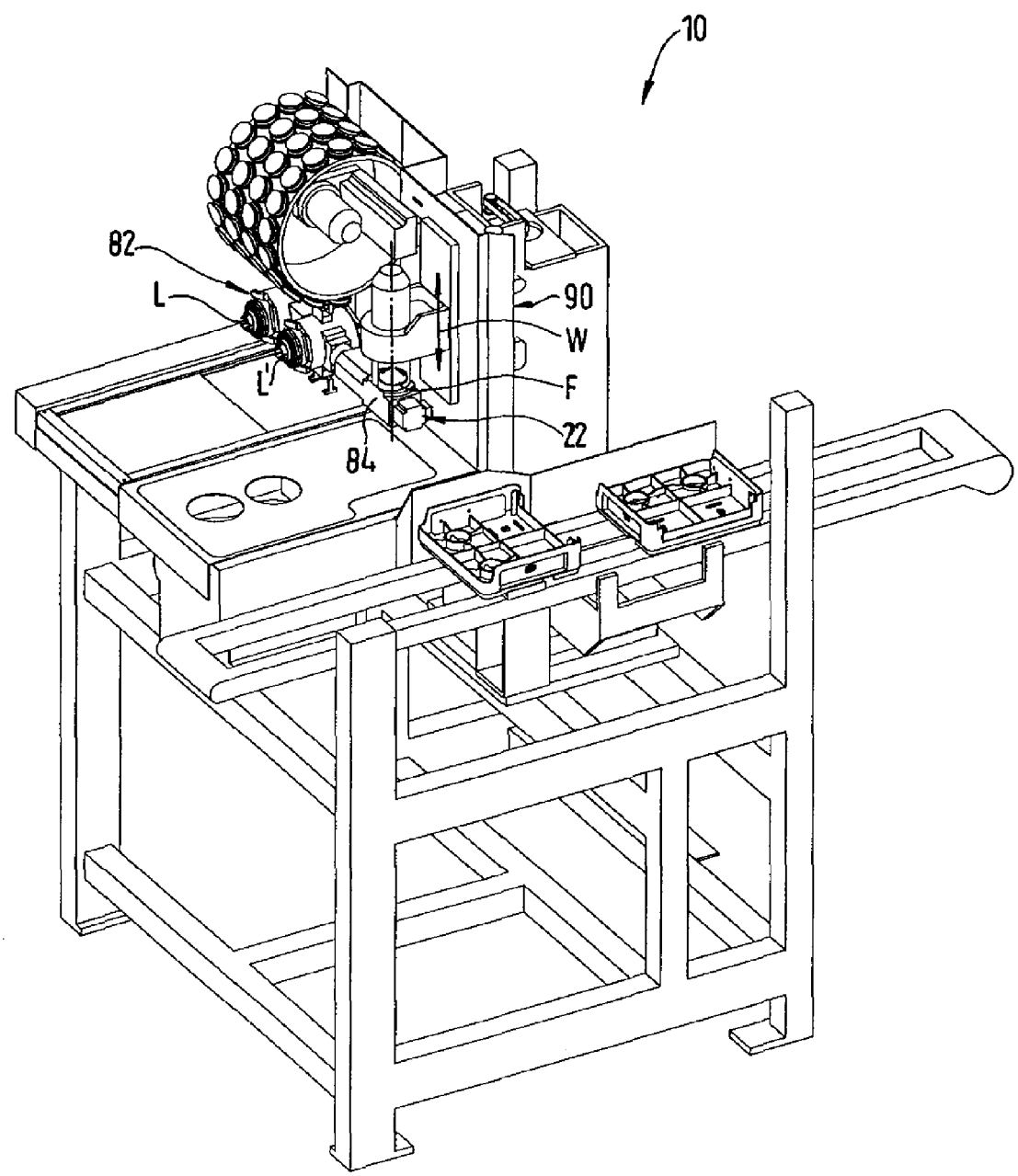

FIG. 41: The loading arm 84 together with loading head 82 was lowered by the actuator arrangement 90 into the middle vertical position (vertical linear movement W at the loading system 22) in order to be ready for pivoting about the vertical axis (vertical pivot axis F of the loading system 22). The loading head 82 still carries only the machined, old lenses L, L'.

Figure 42:
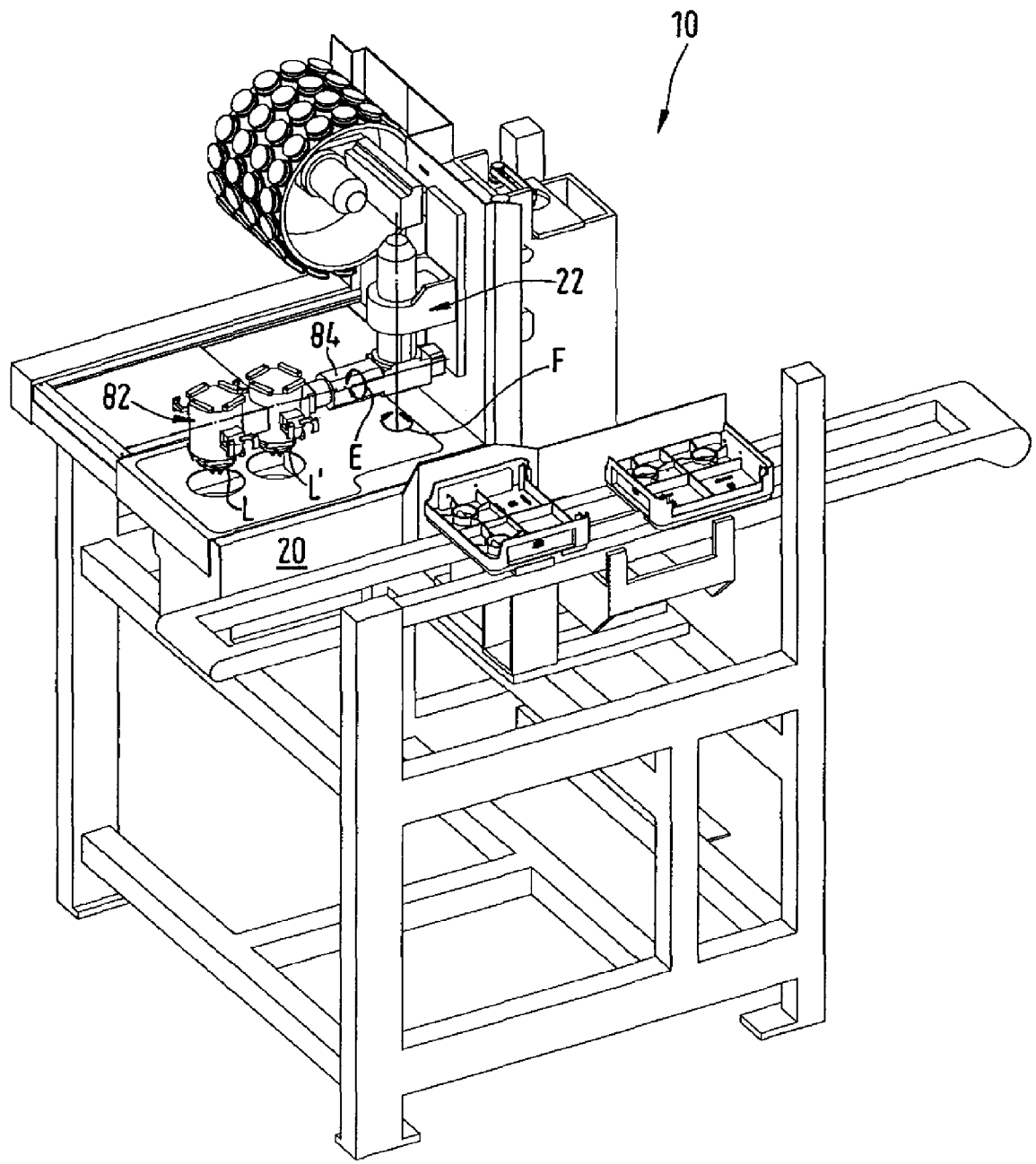

FIG. 42: The loading head 82 was pivoted through 90° about the vertical pivot axis F of the loading system 22. In addition, the loading head 82 was pivoted with respect to the loading arm 84 through 90° about the horizontal pivot axis E of the loading system 22 in order to position the machined lenses L, L' (at the bottom in FIG. 42), which are held at the loading head 82, above the washing station 20.

Figure 43:
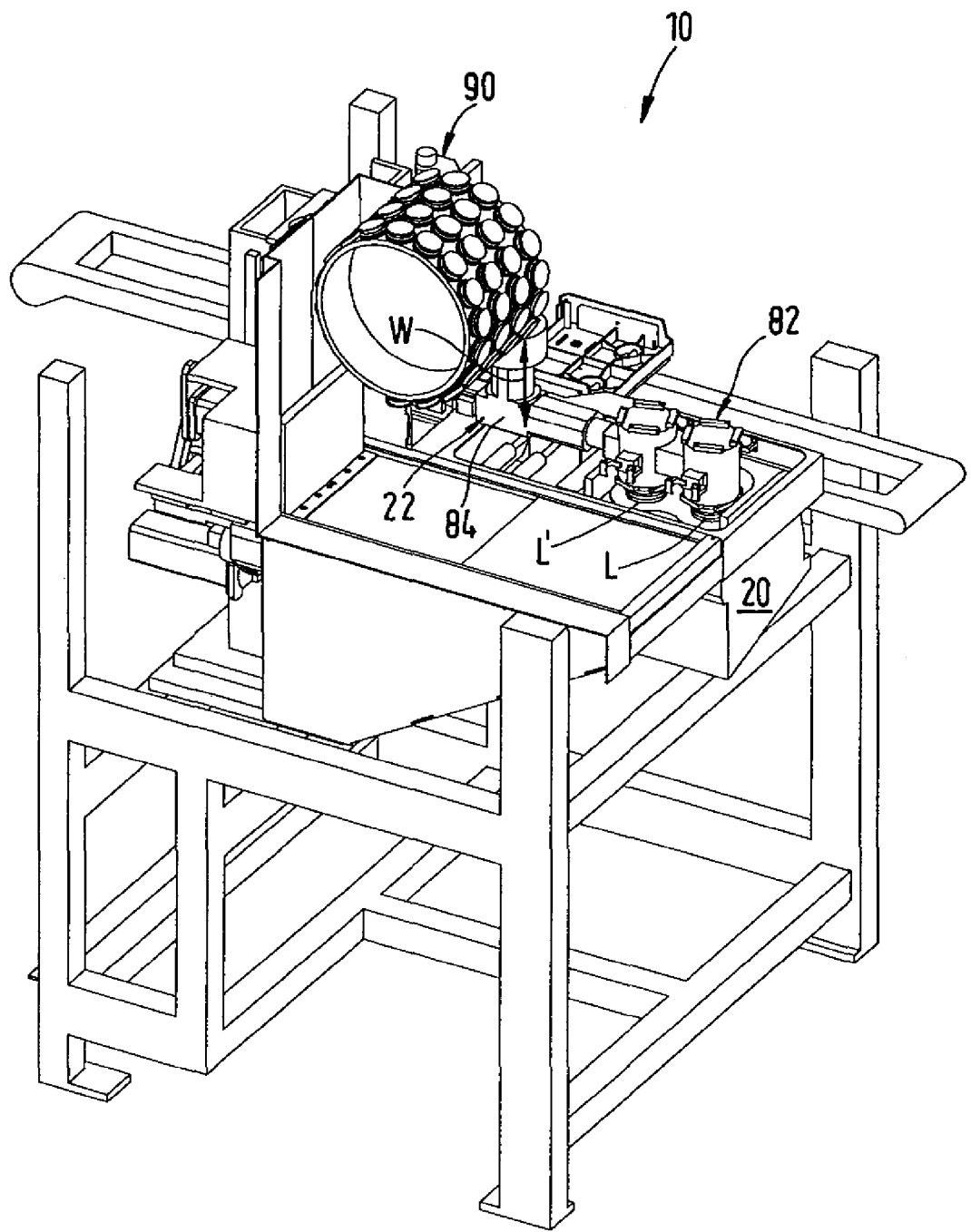

FIG. 43: The loading arm 84 together with loading head 82 was lowered by the actuator arrangement 90 into the lower vertical position (vertical linear movement W at the loading system 22) in order to place the machined lenses L, L' in the washing station 20.

Figure 44:
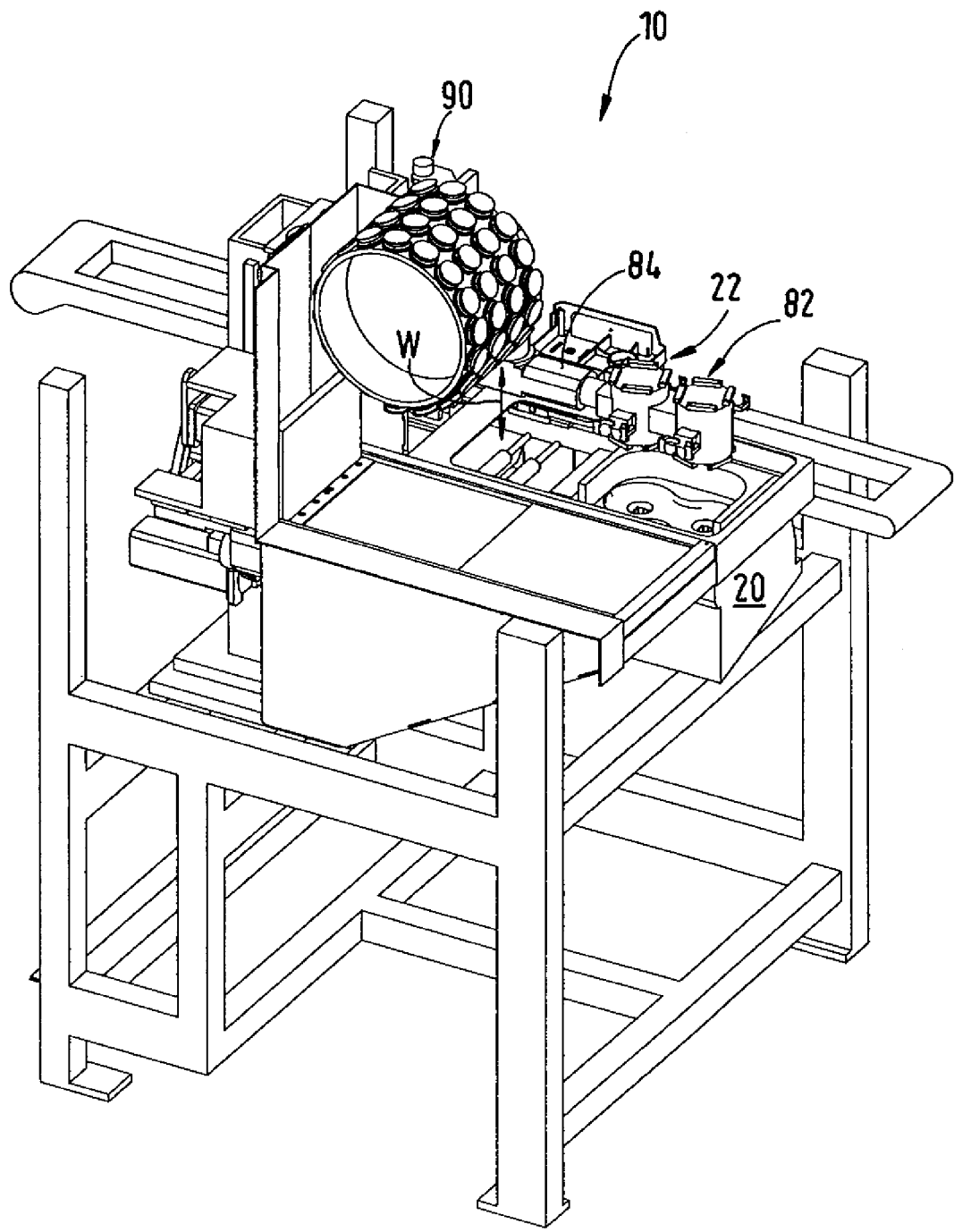

FIG. 44: The loading arm 84 together with loading head 82 was raised by the actuator arrangement 90 back into the middle vertical position (vertical linear movement W at the loading system 22) and the machined lenses L, L' are washed in the washing station 20 in a manner known per se and dried.

Figure 45:
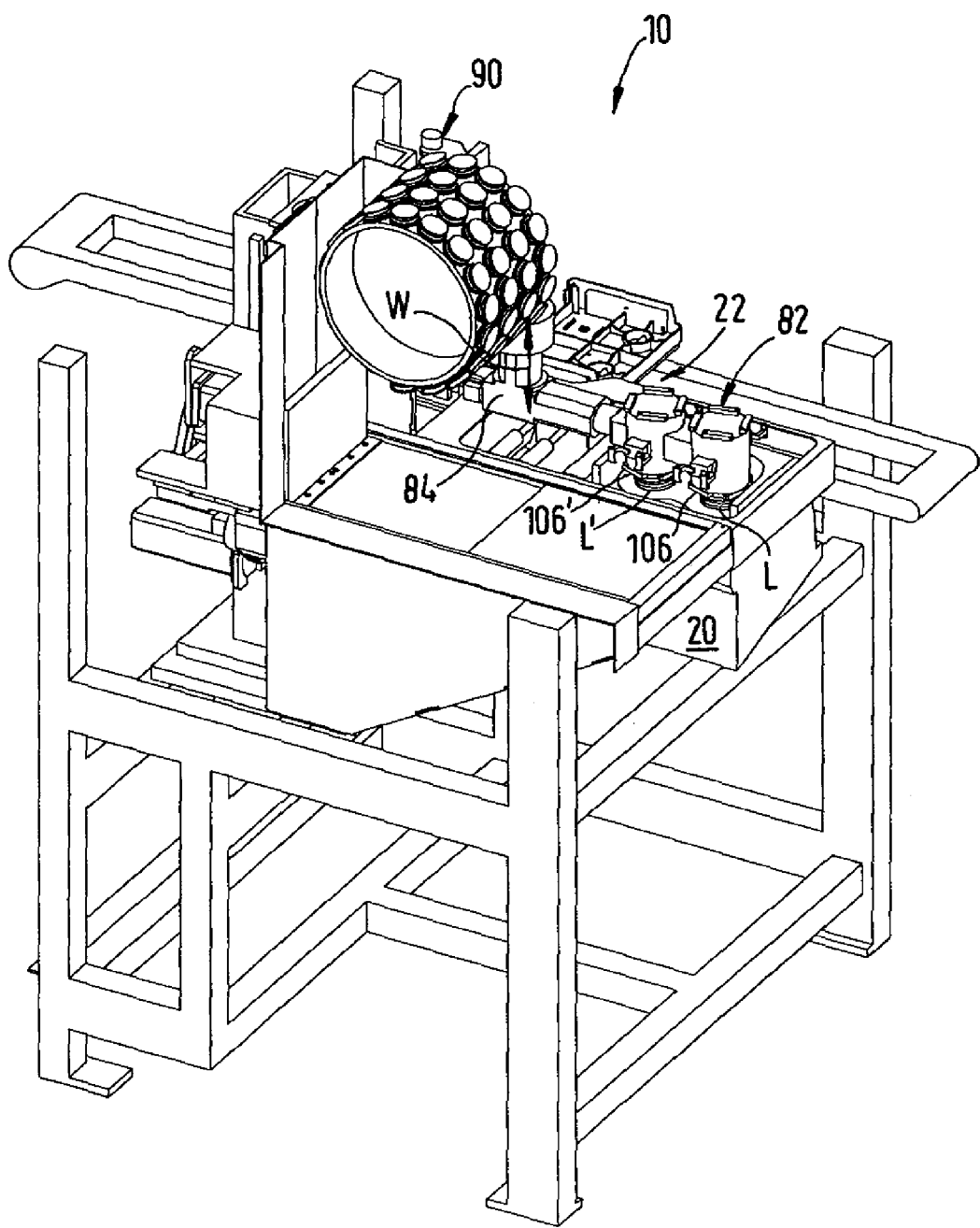

FIG. 45: The loading arm 84 together with loading head 82 was lowered by the actuator arrangement 90 back into the lower vertical position (vertical linear movement W at the loading system 22) in order to grip the machined, washed and dried lenses L, L' in the washing station 20 by the four-finger grippers 106, 106' at the bottom in FIG. 45 and to remove them from the washing station 20.

Figure 46:
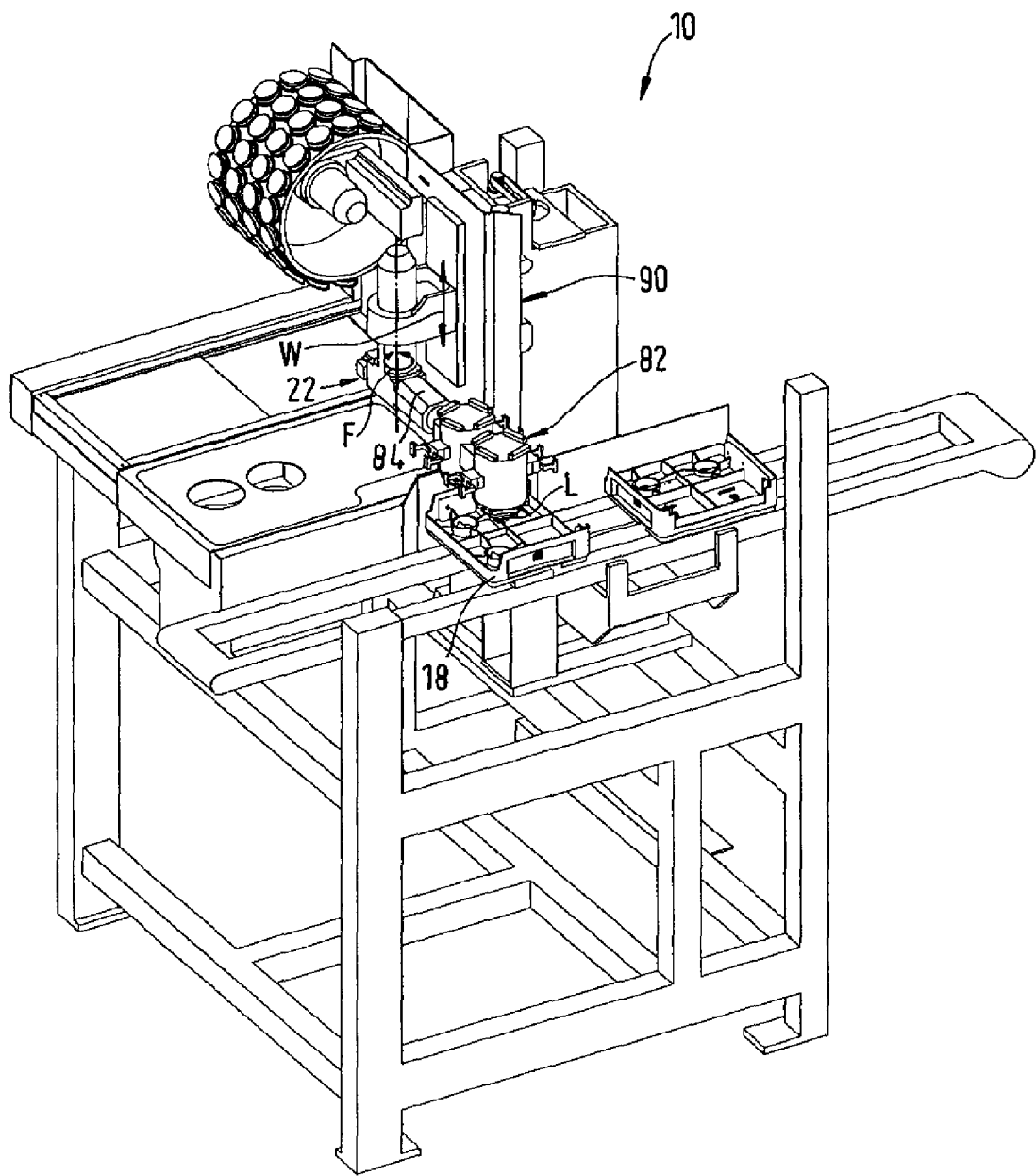

FIG. 46: The loading arm 84 together with loading head 82 was raised by the actuator arrangement 90 back into the middle vertical position (vertical linear movement W at the loading system 22) and the loading head 82 was pivoted through 90° about the vertical pivot axis F of the loading system 22 in order to position the machined, washed and dried lenses L, L', which are held at the loading head 82, above the first prescription box 18.

Figure 47:
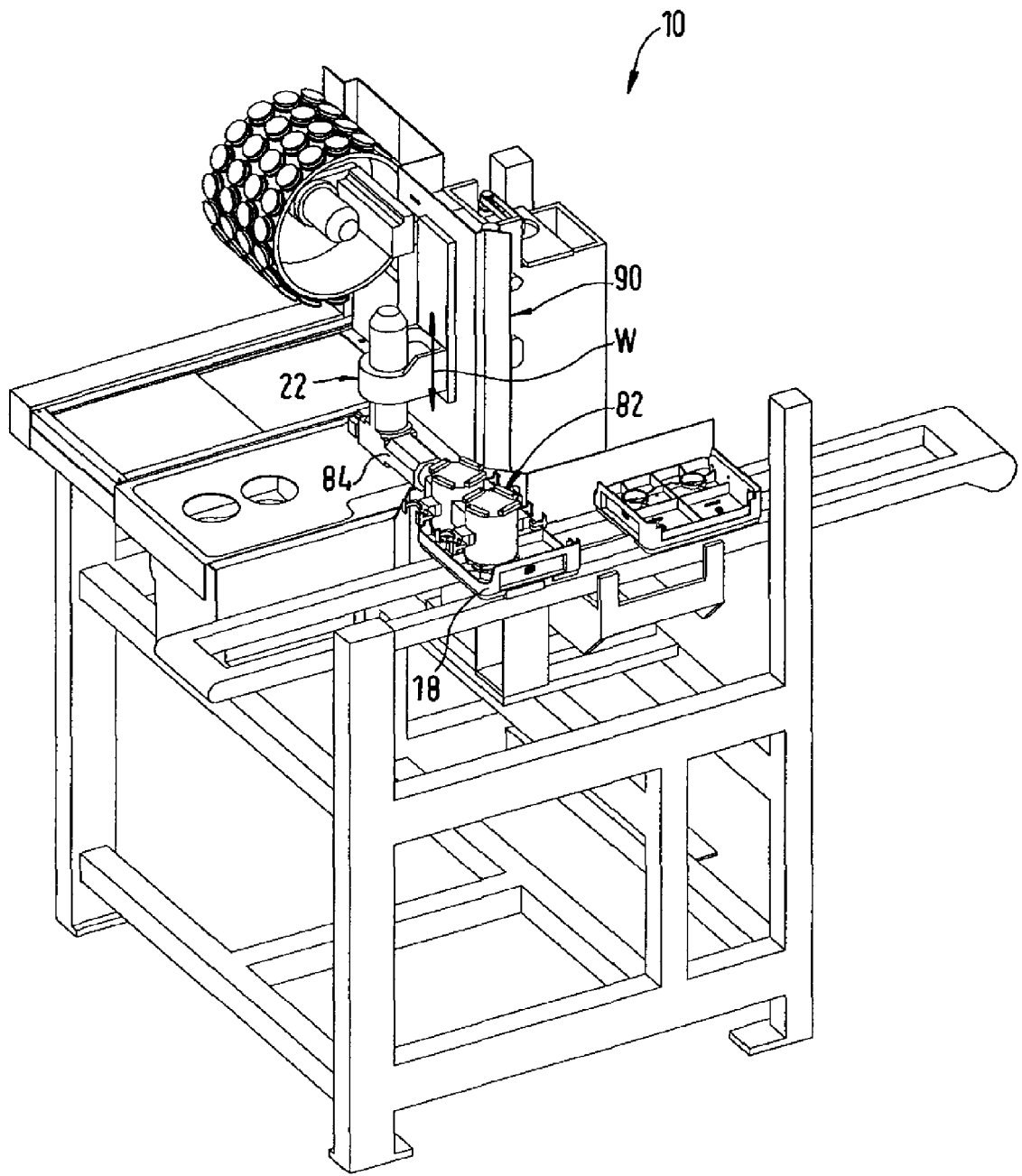

FIG. 47: The loading arm 84 together with loading head 82 was lowered by the actuator arrangement 90 into the lower vertical position (vertical linear movement W at the loading system 22) so as to deposit the finished lenses L, L' in the first prescription box 18.

Figure 48:
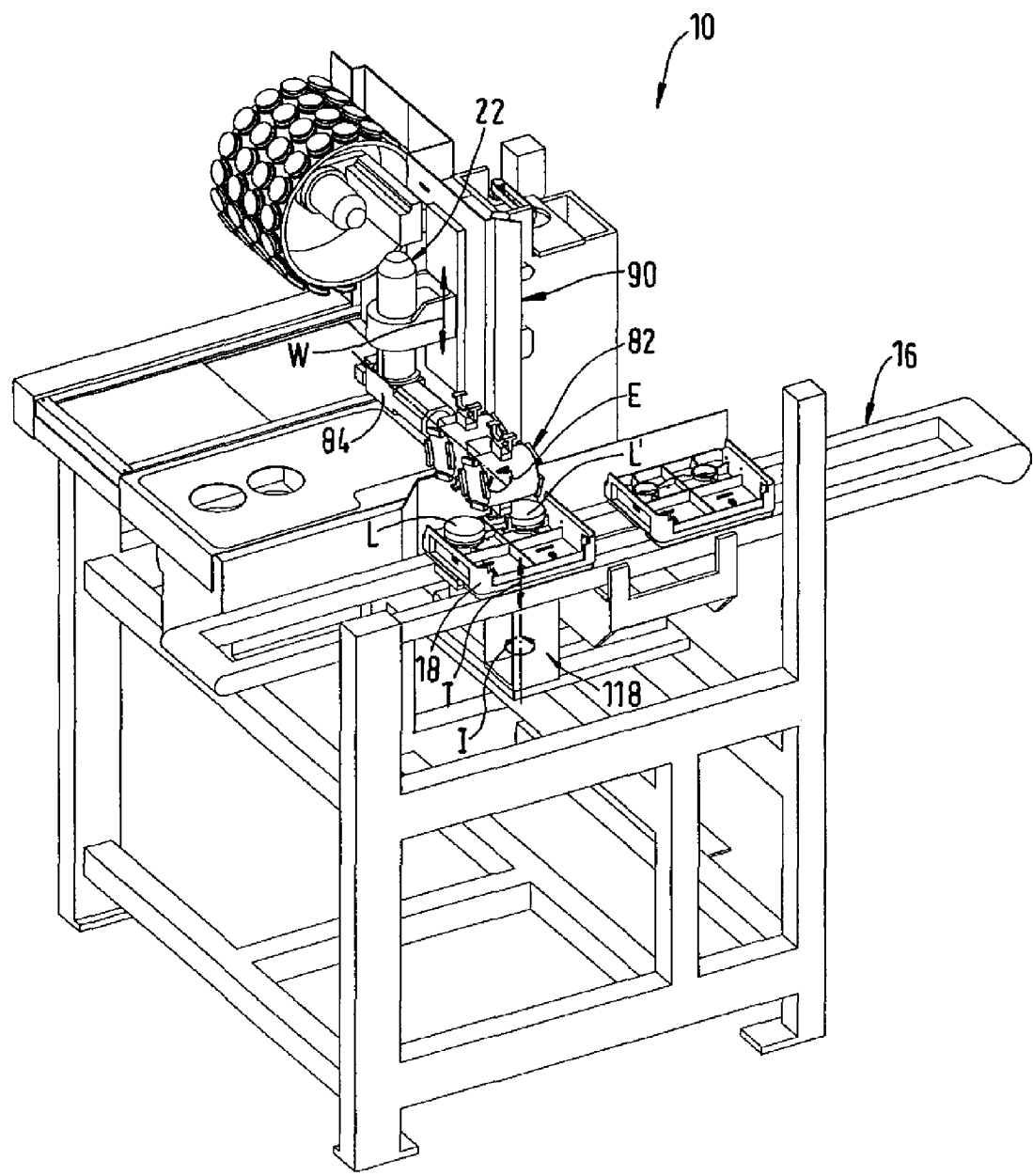

FIG. 48: The loading arm 84 together with loading head 82 was, after deposit of the lenses L, L' in the first prescription box 18, raised by the actuator arrangement 90 back into the middle vertical position (vertical linear movement W at the loading system 22) and the loading head 82 was pivoted with respect to the loading arm 84 through 90° about the horizontal pivot axis E of the loading system 22. The first prescription box 18 was similarly pivoted through 90° by the stroke/pivot device 118 and lowered onto the transport system 16 (pivot movement I and vertical linear movement T at the transport system 16).

Figure 49:
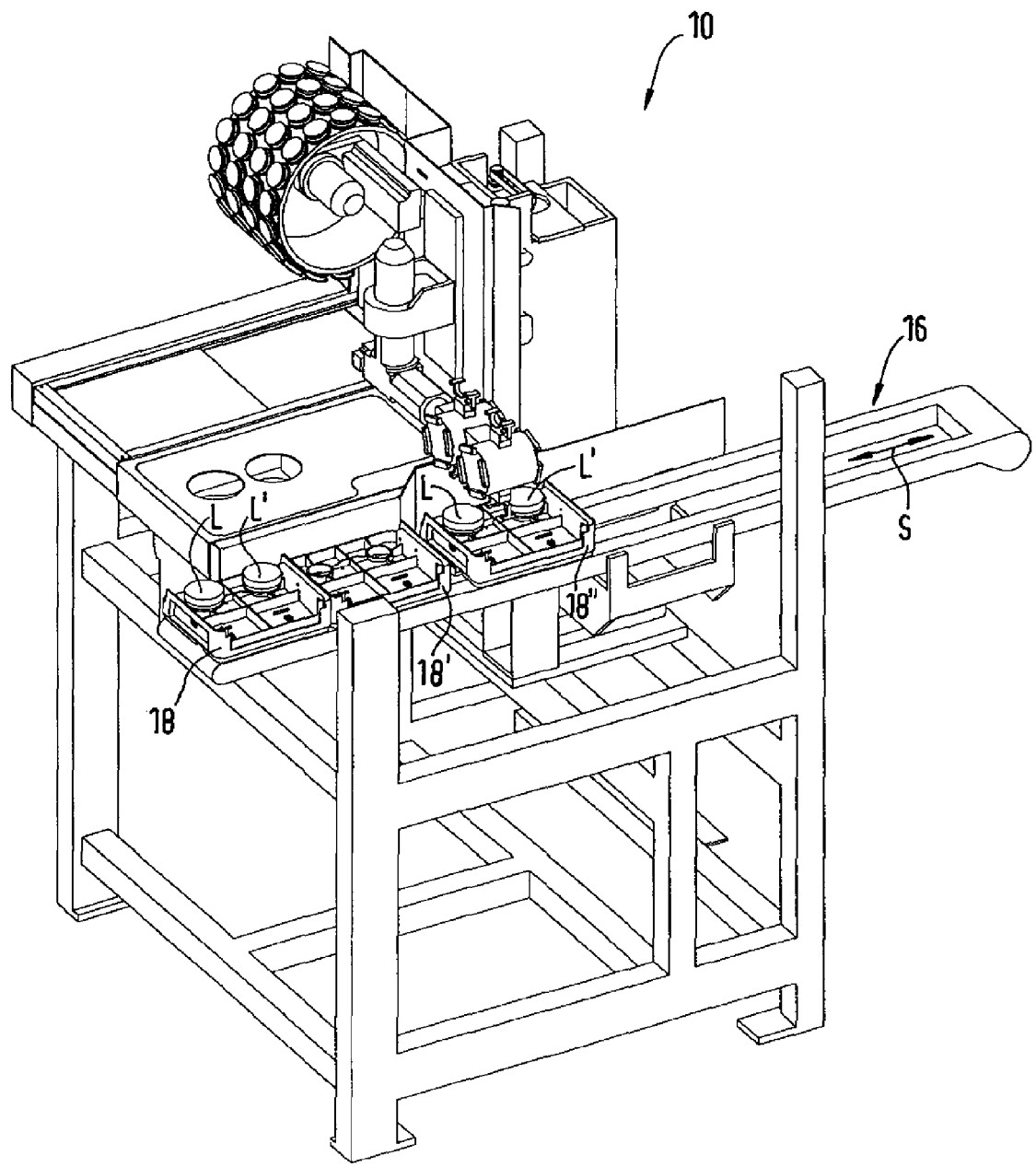

FIG. 49: In this figure, the prescription box 18 with the finish-machined lenses L, L' is finally shown on the transport system 16 on the left and can now be transported away. Disposed in the center is the further prescription box 18' for the lenses L, L° which are currently being machined in the device 10. Illustrated on the right thereof is a new prescription box 18" with further lenses L, L' to be machined, which box was moved on the transport system 16 into the loading position (horizontal linear movement S at the transport system 16).

The loading, machining and unloading sequence for old/new lenses L, L' or old/new polishing tools 46 is also repeated for the further lenses L, L'.

Although in the foregoing the entire sequence was described for a pair spectacle lenses L, L', it will be understood that obviously also only one spectacles lens L can be handled and machined as described, a case quite able to also be undertaken in RX workshops.

A device for finish-machining of optically effective surfaces of, in particular, spectacle lenses as workpieces is disclosed, comprising at least one workpiece spindle at which a workpiece can be clamped, at least one tool spindle, which is movable relative to the workpiece spindle and on which a tool for workpiece machining can be mounted, and a loading system, which serves the purpose of bringing a workpiece to or taking a workpiece away from the workpiece spindle and/or bringing a tool to or taking a tool away from the tool spindle. A feature of the device is that the loading system comprises a loading head, which is separate from the workpiece spindle and tool spindle, with at least one loading section, equipped not only with at least one mount for a workpiece, but also with at least one mount for a tool, so that both the tool and workpiece can be loaded in one loading process, which makes possible a comparatively high productivity of the device.

Variations and modifications are possible without departing from the scope and spirit of the present invention as defined by the appended claims.

We claim:

1. A device for processing optically effective surfaces of spectacle lenses, the device comprising:
at least one workpiece spindle constructed for mounting and releasably securing thereon a spectacle lens;
at least one tool spindle constructed for mounting and releasably securing a tool thereon for machining a spectacle lens mounted on the workpiece spindle, the at least one tool spindle being movable relative to the at least one workpiece spindle; and
a loading system including a machine arm that moves in rotational, planar, and axial directions constructed for taking a spectacle lens to and away from the at least one workpiece spindle and a tool to and away from the at least one tool spindle, the loading system comprising a loading head which is separate from the at least one workpiece spindle and at least one tool spindle and which has at least one loading section provided with at least one workpiece mount for a spectacle lens and with at least one tool mount for a tool whereby the at least one workpiece spindle and at least one tool spindle can be loaded in one loading process.

2. A device according to claim 1, wherein the loading section is provided with two workpiece mounts respectively for a spectacle lens to be taken to and a spectacle lens to be taken away from the workpiece spindle whereby a spectacle lens processed by the device can be exchanged by the loading head in one loading process for a spectacle lens to be processed by the device.

3. A device according to claim 1, wherein the loading section is provided with two tool mounts respectively for a tool to be taken to and a tool to be taken away from the tool spindle whereby a tool used in the device can be exchanged by the loading head in one loading process for a tool to be used in the device.

4. A device according to claim 1, comprising two workpiece spindles and two tool spindles to permit simultaneous machining of two spectacle lenses by two tools, the loading head having two parallel loading sections each provided with at least one workpiece mount for loading a respective one of the workpiece spindles and at least one tool mount for loading a respective one of the tool spindles.

5. A device according to claim 1, wherein the workpiece mount comprises a four-finger gripper.

6. A device according to claim 1, wherein the tool mount comprises a parallel gripper.

7. A device according to claim 1, wherein the loading system comprises a loading arm defining a loading head pivot axis, the loading head being mounted on the loading arm to be pivotable about the loading head pivot axis.

8. A device according to claim 7, wherein the loading system defines a loading arm pivot axis perpendicular to the loading head pivot axis and the loading arm is pivotable about the loading arm pivot axis.

9. A device according to claim 8, wherein the loading arm is linearly displaceable parallel to the loading arm pivot axis.

10. A device according to claim 8, comprising transport system for transporting workpieces, washing system for washing spectacle lenses, a processing zone for spectacle lenses to be processed, and a tool magazine for storing tools, the transport system, washing system, processing zone and tool magazine being disposed on a notional arc having a center of curvature coincident with the loading arm pivot axis and the loading arm being pivotable about the loading arm pivot axis to move the loading head between the transport system, washing system, processing zone and tool magazine.

11. A device for processing optically effective surfaces of spectacle lenses, the device comprising:

two workpiece spindles constructed for mounting and releasably securing spectacle lenses each defining a respective axis of rotation, two tool spindles constructed for mounting and releasably securing tools for machining of the spectacle lenses each defining a respective axis of rotation, the workpiece spindles being movable relative to the tool spindles at least in a first movement direction and in a second movement direction different from the first movement direction, a single workpiece spindle drive for driving both workpiece spindles to rotate about the respective axes of a rotation thereof, a single tool spindle drive for driving both tool spindles to rotate about the respective axes of rotation thereof, a single first movement direction drive for generating said relative movement of the spindles in the first movement direction, and a single second movement direction drive for generating said relative movement of the spindles in the second movement direction.

12. A device according to claim 11, wherein the tool spindles are movable relative to the workpiece spindles in a third movement direction different from the first and second movement directions and the device comprises a single third movement direction drive for generating said relative movement of the spindles in the third movement direction.

* * * * *